United States Patent
Baran et al.

(10) Patent No.: US 8,191,101 B2
(45) Date of Patent: May 29, 2012

(54) PACKET TIMING METHOD AND APPARATUS OF A RECEIVER SYSTEM FOR CONTROLLING DIGITAL TV PROGRAM START TIME

(75) Inventors: Paul Baran, Atherton, CA (US); Xu Duan Lin, Newark, CA (US); John Pickens, Newark, CA (US); Michael Field, Redwood City, CA (US)

(73) Assignee: Aurora Networks, Inc., Santa Clara, CA (US)

( * ) Notice: Subject to any disclaimer, the term of this patent is extended or adjusted under 35 U.S.C. 154(b) by 0 days.

(21) Appl. No.: 12/562,001

(22) Filed: Sep. 17, 2009

(65) Prior Publication Data

US 2010/0011397 A1 Jan. 14, 2010

Related U.S. Application Data

(60) Continuation of application No. 11/141,693, filed on May 31, 2005, now abandoned, which is a division of application No. 10/328,868, filed on Dec. 23, 2002, now abandoned.

(60) Provisional application No. 60/382,174, filed on May 21, 2002, provisional application No. 60/344,283, filed on Dec. 27, 2001.

(51) Int. Cl.
*H04N 7/173* (2011.01)

(52) U.S. Cl. .............................. 725/118; 725/88; 725/90
(58) Field of Classification Search .................. 725/118, 725/88, 90
See application file for complete search history.

(56) References Cited

U.S. PATENT DOCUMENTS

| 5,640,388 A | * | 6/1997 | Woodhead et al. | 370/468 |
| 5,650,994 A | * | 7/1997 | Daley | 370/259 |
| 5,805,602 A | * | 9/1998 | Cloutier et al. | 370/516 |

* cited by examiner

*Primary Examiner* — Nasser Goodarzi
*Assistant Examiner* — Jivka Rabovianski
(74) *Attorney, Agent, or Firm* — John Bruckner PC

(57) ABSTRACT

A system for the delivery of video on demand (VOD). A wireless remote control device generates keystroke signals for controlling a TV display and has a single button for restarting a selected program at a beginning of the selected program. A head-end unit supports separate downstream virtual channels for each separate TV set connected on a common TV feeder-cable; The head-end unit locally records and stores many programs, and transmits each program using a compressed digital format. The Compressed digital format may use MPEG-2 or MPEG-4. The head-end unit has means for protecting against signal theft. A set top unit encapsulates the keystroke signals and transmits the keystroke signals via a two-way channel to the head-end unit.

10 Claims, 28 Drawing Sheets

| MINI-SERVER (RETROVUE) | 1U |
|---|---|
| CONTROLLER (MGT) | 1U |
| CMTS | 1U |
| gigaQAM | 5U |
| STORAGE | 1U |
| DISK ARRAY | 5U |
| DISK ARRAY | 5U |

PACKET TIMING METHOD AND APPARATUS OF A RECEIVER SYSTEM FOR CONTROLLING DIGITAL TV PROGRAM START TIME

RELATED PATENT APPLICATIONS

This application is a continuation of U.S. application Ser. No. 11/141,693, filed May 31, 2005, by inventors Paul Baran, Xu Duan Lin, John Pickens and Michael Field, entitled "PACKET TIMING METHOD AND APPARATUS OF A RECEIVER SYSTEM FOR CONTROLLING DIGITAL TV PROGRAM START TIME", which is a divisional application of U.S. patent application Ser. No. 10/328,868, filed Dec. 23, 2002, entitled "METHOD AND APPARATUS FOR VIEWER CONTROL OF DIGITAL TV PROGRAM START TIME", by inventors Paul Baran, Xu Duan Lin, John Pickens and Michael Field, which claims priority to, U.S. Provisional Application No. 60/382,174, filed May 21, 2002, entitled "METHOD AND APPARATUS FOR VIEWER CONTROL OF DIGITAL TV PROGRAM START TIME", by inventors Paul Baran, Xu Duan Lin, John Pickens And Michael Field, and U.S. Provisional Application No. 60/344,283, filed Dec. 27, 2001, entitled "MINI STE TOP BOX", by inventor Paul Baran.

BACKGROUND OF THE INVENTION

This invention relates to digital cable television, and more particularly to placing viewer in command of when the viewer chooses to watch a television channel from the beginning of a program.

DESCRIPTION OF THE RELEVANT ART

Digital television (TV), when first adopted by the satellite broadcasters, offered a better quality picture and a larger number of channels, compared with convention broadcast TV or cable TV. The digital TV posed a competitive threat to the cable operators. Now, cable also is moving to digital TV, to match satellite delivery performance. Digital TV poses a major concern to the program content providers as the transmitted digital TV in the clear matches the quality of the original master, permitting ready high quality counterfeiting. While the digital signal for digital TV is transmitted in an encoded fashion, the decrypted digital signals are available on the printed circuit board of the legacy set-top units. To address this issue, the content industry formally is demanding to limit access to the digital signal in the clear—Digital Rights Management (DRM), otherwise the content of the digital signal will not be distributed as early nor as widely as for protected systems.

A pacing factor in the inevitable evolution of cable to an all-digital environment is the cost of the set-top unit. Current set-top units are expensive, especially in the United States. With a set-top unit required by each TV set, that displays digital signals, the cable industry faces an overly expensive investment unless an alternative is provided.

By the end of 2002, about 95% of the cable transmission in today's cable plant will be two-way. Over half of the homes passed by high speed cable are connected by cable systems operating at 550 MHz or above. Fiber cable increasingly will be used to connect clusters of users, decreasing in size over time to under 500 homes. Digital processing and storage are continuing historic price declines. Present MPEG-2 digital transmission can carry about 10 times as many channels per 6 MHz TV channel, as conventional analog transmission. MPEG-4 and other compression schemes soon may double this number in the longer-term future. This could make telephone Digital Subscriber Loop (DSL) economically attractive for competitive carriage of digital TV.

Customer demands are shifting. Digital transmission quality increasingly will be necessary to compete with satellite. More TV signals will be needed to match satellite's delivery capability. The desire for Video on Demand (VOD) is increasing, and now is an economically viable premium service for the cable operator. Time shifting technologies are able to charge $10 per month for service. Cable operators pay a far greater cost for set-top units than satellite TV providers; in part, because of the duopoly supplier situation in the U.S. prevents adequate competition. Satellite growth rates exceed that of cable.

Each TV user is capable of having their own channel. An 860 MHz cable system can carry about 128, 6 MHz analog TV channels. The cable system equivalently could carry about 1280, MPEG-2 channels. Since the expected number of houses on a single fiber is expected to decline to about 500, there is a surplus of channel capacity to provide each TV set with its own two-way channel to the cable head end.

SUMMARY OF THE INVENTION

A general object of the invention is to deliver new services to a viewer, which new services are not viable with satellite, either technically or financially, at a cost much less than that of current per-household costs, including set-top boxes and head-end infrastructure.

Another object of the invention is a demand TV system which uses existing plant without change, and co-exists with currently deployed cable system elements.

According to the present invention, as embodied and broadly described herein, a method and apparatus for viewer control of digital TV program start time is provided. The apparatus includes an input unit, a storage unit with a disk array, a gigaQAM unit, a controller, and a conditional access unit. The input unit receives digital channels from multiple constant bit rate and variable bit rate sources, e.g. HITS, Microwave, Satellite, RF Broadcast, and local video processing sources. The storage unit provides both capture and play-out of real time video streams. In addition, files can be stored and played out on demand, i.e. video-on-demand is one application of this feature. The disk array contains both disk controllers and a large number of IDE disk drives. The gigaQAM unit receives MPEG encoded digital channels over a 10 Gigabit Ethernet interface from the storage unit or other source. The gigaQAM unit routes and duplicates each digital channel. Program information is inserted. PCR correction is performed and null frames are inserted. The Controller 800 manages the switching set up of information pathways from the Input unit 400, Storage unit 300 and gigaQAM unit 200. It constructs valid Program Specific Information (PSI) and System Information (SI) for the output multiplexes created at the gigaQAM unit. The controller manages the switching set up of information pathways from the input unit, Storage unit and gigaQAM unit. The controller constructs valid Program Specific Information (PSI) and System Information (SI) for the output multiplexes created at the gigaQAM unit. The conditional access unit enables the operator to authorize subscriber access to digital program streams. The conditional access unit offers a cryptographically strong conditional access solution augmented with physical mechanisms to enhance security.

A video server divides the input video-streams up as they each separately enter the system and then sends the divided video-streams to a server that has a simple switch as it's first component. Each divided video stream is identified with a separate Ethernet address. A switch routes the appropriate piece of the video stream to the appropriate disk drive. When replaying the video stream the disk drive controllers co-operate together to send their portions of the video stream at the appropriate time back out through the switch. In this way the problem of a single bottleneck of a CPU and RAM is eliminated to provide a video-server in which many CPU's are working in parallel to produce a much larger number of video streams.

Another aspect of the invention is a high density radio frequency (RF) generation and quadrature-amplitude-modulated (QAM) system is provided. The high density RF generation and QAM system is for a multi-channel digital TV system head end. The high density RF generation and QAM system comprises a signal generator, a multiplicity of low-pass filters, a first combiner, a second combiner, a converter, and a distribution subsystem.

The signal generator generates a multiplicity of agile signals at any of 6 MHz and 8 MHz spacing. The multiplicity of agile signals are generated above the 50-860 MHz, TV band to avoid spurious signals within the 50-860 MHz, TV band. A modulator separately modulates each agile signal with digital modulation. The modulator thus generates a multiplicity of digitally-modulated signals.

A low-pass filter or a plurality of low-pass filters low-pass filters the multiplicity of digitally-modulated signals to maintain modulated sidebands of each digitally-modulated signal within an allowed channel spectrum. A first combiner combines the multiplicity of digitally-modulated signals into a plurality of ensembles of 2, 4, 8 or 16 digitally-modulated signals, respectively.

A converter heterodynes, with a common oscillator, each ensemble of the plurality of ensembles of digitally-modulated signals to fall within 50-860 MHz, TV band. A second combiner combines the heterodyned-plurality of ensembles of the multiplicity of digitally-modulated signals, into a plurality of groupings.

A distribution subsystem distributes portions of the plurality of groupings of digitally-modulated signals for multiple TV distribution zones.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figures 1, 2:
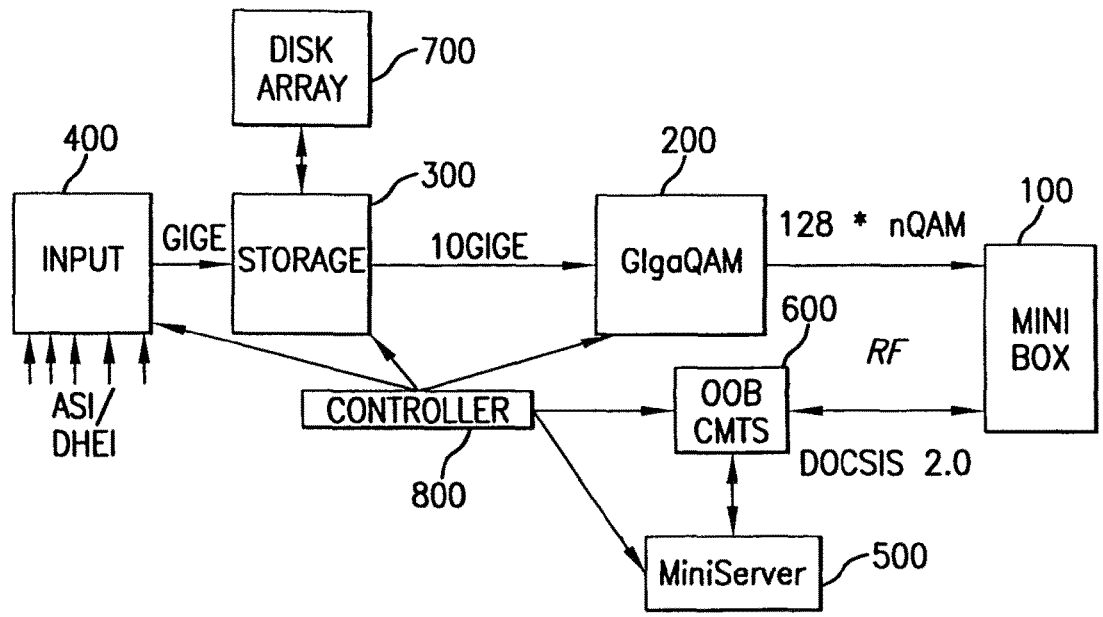
FIG. 1 is a system-configuration block diagram.
FIG. 2 illustrates a rack mount of the system for a head end.

Reference now is made in detail to the present preferred embodiments of the invention, examples of which are illustrated in the accompanying drawings, wherein like reference numerals indicate like elements throughout the several views.

Cable is the most successful last-mile technology for providing revenue-generating services to end-users, subscribers. The cable physical plant has evolved from a mostly one-way analog plant in the late 90's to today's two-way high-speed digital plant, with legacy analog support. The next major push within the cable industry is to enhance video service offerings and continue enhancing the two-way data environment. The ultimate target is the creation of the all-digital network, in which convergence of video, data, and voice and capacity are key attributes. The present invention is directed toward enabling the all-digital network with all-digital headend products, including high-speed data, Cable Modem Termination System (CMTS) and Cable Modem (CM), and voice Media Terminal Adapter (MTA). The present invention details technology and product offerings for the enhancement of video services. Video service is the bread-and-butter of the cable industry.

Many challenges and opportunities exist as the Multiple Service Operators (MSOs) strive to continually enhance their video service, attract new customers, and retain current customers.

Three key video networking challenges exist for the MSO: (1) Increasing the selection of video content, to compete with satellite. (2) Defining new services and service revenue. (3) Increasing the efficiency of use of the HFC spectrum (n*6 Mhz, n*8 Mhz).

The present invention addresses these challenges by providing both a quantum improvement in density/cost for digital video and a personalized per-TV on-demand service with network-based caching and user-directed caching controls. Broadcast can be viewed live or time-delayed. Video-on-demand files can also be accessed/ordered, and individually played, paused, and rewound. The system transports only those video streams that are being actively viewed. The present invention enables an unlimited number of digital channels and digital videos to be carried over HFC infrastructure, translating to increased service revenue. Satellite cannot achieve this level of service over its one-way broadcast infrastructure.

Deployment of a complete present invention enables the operator to fully optimize the facilities of his HFC physical plant for the deployment of revenue generating services. Since the present invention is based upon standards and standard interfaces it is also possible for the operator to deploy subsets of the complete systems solution, as shown in FIG. 1: (1) The MiniBox unit 100 as a low cost, high performance vehicle for deployment of broadcast TV, personal TV, and time shift services. (2) The GigaQAM dense modulator unit 200 for cost effective and rack-space effective delivery of video services from an IP/GIGE backbone to HFC. (3) The Storage unit 300 for use as a time shifted real time video caching function and local repository for video-on-demand MPEG files. (4) The Input unit 400 for conversion of MPEG video from ASI/DHEI to Ethernet backbone transport. (5) The MiniServer unit 500 for thin-client computing as a vehicle for deployment of new applications while future proofing the MiniBox or other deployed settop box CPE equipment. (6) The CMTS/INA 600 for an out-of-band (OOB) communication channel for digital settop boxes and concurrent offering of data and voice services. The storage unit 300 may employ a disk array 700. The system is controlled by controller 800.

One embodiment of the present invention is a collection of units, plug-in modules, and software functions that enable a wide variety of video processing options and configurations for the MSO. The present invention may be deployed either in a centralized network configuration, collocated with encoders and digital receivers, or in remote hub locations. FIG. 1 details each of the units and shows their interconnectivity. Each unit fits within a standard 19 inch rack mounted chassis, as shown in FIG. 2. The units range from 1 U to 5 U (a U equals 1.75 inches of a 19 inch rack mounted panel) and depth up to 26 inches. Up to two complete 1280 channel systems, minus Input, can be fit into a standard seven feet high equipment rack.

Headend and System Overview

System Headend Physical Configurations are designed to be rack mounted. A typical configuration for a hub with 1280 subscriber digital channels, with a Gigabit Ethernet link for broadcast video, is shown in FIG. 2. The 1280 subscriber digital channels, a typical number of subscriber digital channels, assumes 128 QAM channels, with ten digital channels per QAM channel. The total number of streams could be much higher. For example, twenty-five 2 Mbps channels per QAM at 8 MHz, gives 3200 subscriber digital channels. Up to two combinations of Storage/gigaQAM units can be installed in a seven-foot high rack for a total capacity of 2560 subscriber digital channels. At a take-rate of 1:5 for advanced Retrovue time-shifted viewing service, a single rack can support 12,800 digital video subscribers.

System in End-to-End Network redefines cable and backbone network architecture for delivery of broadcast-on-demand and video-on-demand service.

Legacy cable network architectures for video, audio and video, are inflexible tree topologies. Video program streams, audio/video, are collected from multiple sources, encoded analog and digital, in digital MPEG format at the headend. Individual program streams are selected based upon management and provisioning configuration information for delivery to subscribers. The selected video streams are then groomed for delivery over narrowband transport pipes over branches, selection, multiplexing, rate shaping. From the root narrowband transport streams are delivered over a fixed bandwidth narrowband interface to narrowband tributaries. The delivery methods vary from local delivery across short-distance cable industry standard interfaces, e.g. ASI, to local HFC modulators to long-distance encapsulation in constant bit rate synchronous delivery vehicles such as SONET.

Legacy cable network architectures have the following issues: (1) Low backbone networking flexibility. (2) Does not leverage the cost and functionality curves for Ethernet and IP. (3) Limited equipment supplier options. (3) Limited network topologies.

The present invention, in contrast, leverages IP and Ethernet wideband technologies for distribution of video within the core. High speed communications technologies utilizing internetworking protocols can be utilized to drive cost lower, carry multiple services over a single converged networking infrastructure, and leverage the technology innovation curve for backbone equipment. Because every subscriber has his own personal TV channel the operator can economize on configured bandwidth and deliver just that content that the subscribers are viewing. Alternate approaches require all channels to be broadcast at all times, and therefore require bandwidth to be over-provisioned.

Figure 3:
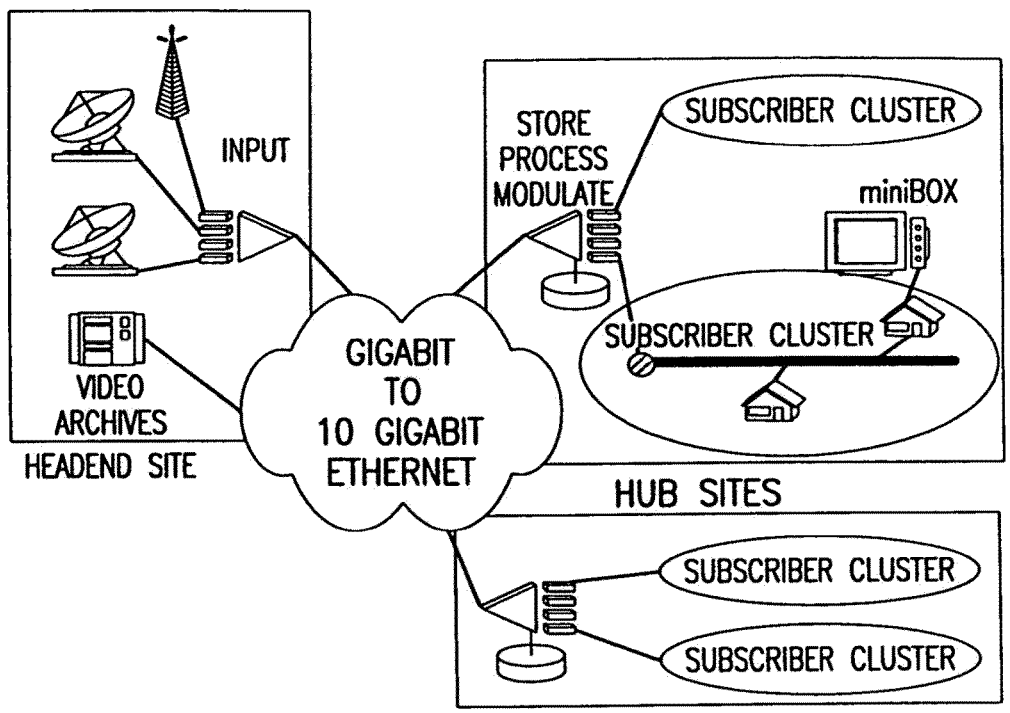
FIG. 3 depicts a distributed system from a head end to various subscriber clusters.

FIG. 3 is an overview of a distributed end-to-end system. In the distributed network configuration the input unit is located in one or more centralized locations and the Server is located in remote hubs.

Figure 4:
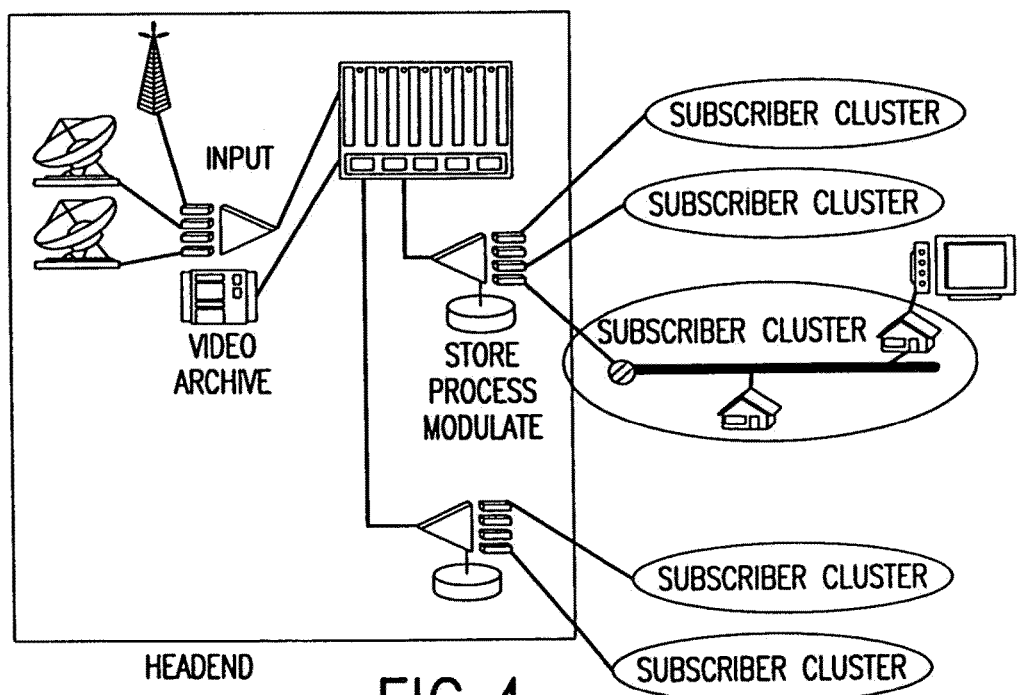
FIG. 4 shows a centralized system of the head end to various subscriber clusters.

Other configurations are also possible. FIG. 4 shows a centralized configuration that reflects a type of topology often seen in legacy physical plants. The present invention is flexible enough to support either a centralized or distributed topology, or combinations of centralized and distributed.

Key Assumptions

Key assumptions driving the design of the present invention are: (1) Input capacity is approximately 150 digital channels and 150 video-on-demand files. (2) The nominal digital channel rate is 4 Mbps per channel (audio and video) (3) Digital channels streams are stored and processed as combined Audio/Video elemental MPEG streams together in memory and on disk. Each digital channel is stored independently on disk. (4) Digital channels are received in the clear, not a requirement if encryption scheme is not sensitive to time shifting. (5) Modulator output scales from 16 QAM channels to 128 QAM channels depending upon configuration. At 256QAM (40 Mbps) each 6 MHz QAM channel carries 10 digital channels. Thus the output capacity of the system scales from 160 digital channels to 1280 digital channels. (6) 64QAM, 256QAM, 512QAM, and 1024QAM modulations are supported. (7) Server components are serviceable and swappable while live with no disruption of service.

Input Unit

As illustratively shown in FIG. 1, the Input Unit 400 receives digital channels from multiple constant bit rate and variable bit rate sources, e.g. HITS, Microwave, Satellite, RF Broadcast, and local video processing sources. Each source is received as a digital transport stream through a common interface for processing digital transport streams such as ASI. These digital channels are selected and multiplexed together into an MPEG-over-IP/Ethernet packetized transport stream. The transport stream is multicast using Ethernet technology to downstream video units.

The Input Unit 400 can connect to the Storage Unit 300, gigaQAM Unit 200, or other video units with Ethernet input options. On the order of 150 digital channels can be processed.

A single input unit 400 can serve multiple Storage/gigaQAM units or more than one Input Unit 400 may be configured if input were desired from more than one location. These extensions are not shown in the figure.

The Input Unit 400 has a variety of interface and processing options: (1) Video interfaces—Asynchronous Serial Interface (ASI), Digital Head-End Interface (DHEI); (2) Decryption of video content if encrypted; (3) Remove null frames to decrease the data rate; (4) Mapping of individual digital channels to one or more MPEG-IP/Ethernet transport streams. (5) transmission of MPEG-IP/Ethernet transport streams via unicast and multicast service over Ethernet interface, future IEEE Standard 802.17 Resilient Packet Ring and Sonet.

Figure 5:
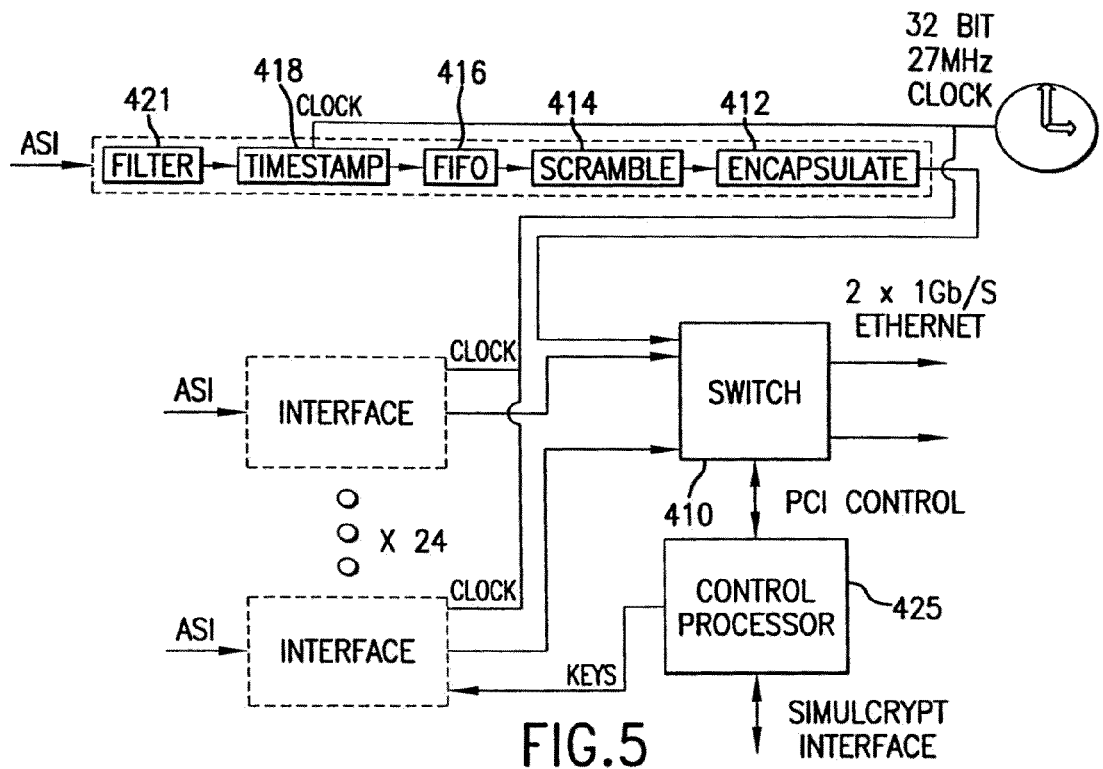
FIG. 5 illustrates input processing.

The input unit 400, as shown in FIG. 5, and as controlled by control processor 425, performs the following operations: (1) ASI to Ethernet encapsulation 412; (2) DHEI to Ethernet encapsulation 412; (3) Scrambling 414; and (4) Aggregation 416. The diagram in FIG. 5 outlines the system. In this diagram the "Switch" element is used to aggregate input from many streams into Ethernet output interfaces. The device does not have to handle a full load from the ASI or DHEI ports as these interfaces usually supply data at either a 27 Mb/S or 38.8 Mb/S rate.

Although the Ethernet switching device is capable of filtering it is desirable that the Encapsulation logic filter 421 unnecessary packets before transmission to the Ethernet switch to reduce the bit rate to be processed and in the scrambling stage.

In order to measure jitter through the switching network each transport packet is tagged with a timestamp 418.

In order to reduce encapsulation and interrupt overhead, several MPEG transport packets are collected together before encapsulation in Ethernet and IP frames. A first-in-first-out (FIFO) memory 416 allows up to 7 MPEG transport packets plus timestamps 418 to be accumulated before encapsulation 412. Data accumulated in the FIFO memory 416 should be flushed after aging for a maximum of 90 mS.

For each selected PID in the input transport multiplex an encryption key and cipher feedback state should be maintained. The framing device should also set the appropriate value in the scrambling control bits in the MPEG transport header to indicate whether and odd or even key is currently in use.

Each MPEG transport stream packet received at the ASI or DHEI interface is encapsulated into an IP Ethernet packet.

Figure 6:
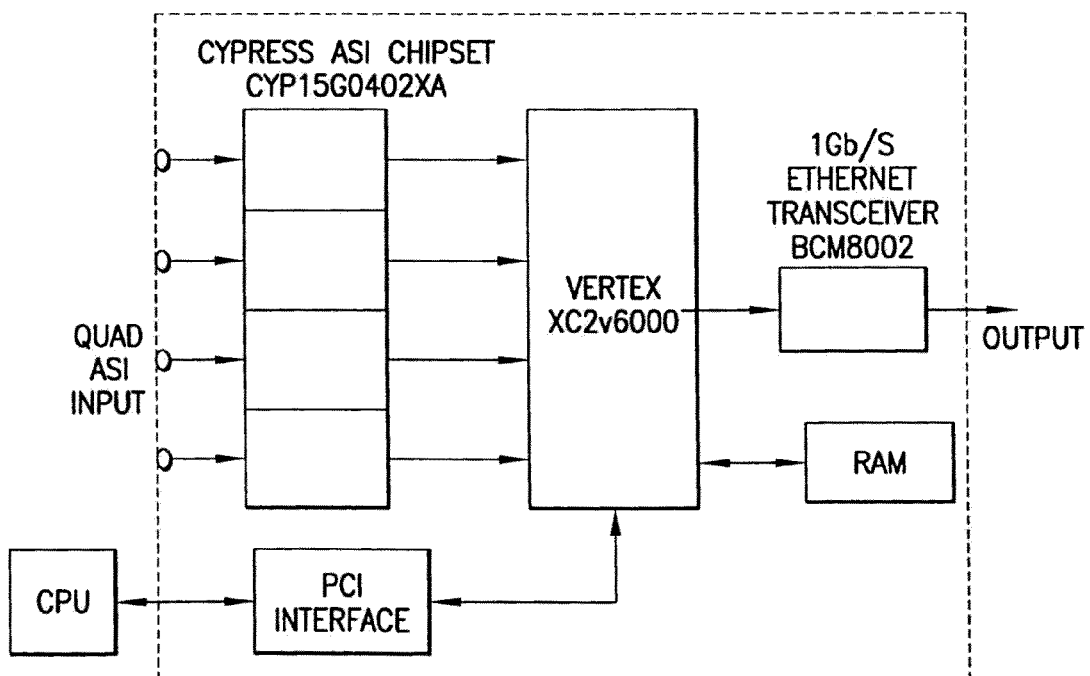
FIG. 6 shown encapsulation techniques.

FIG. 6 shows encapsulating techniques.

Occasionally an even larger number of physical input sources will be present although the total number of programs or input rate will not increase. This situation is likely to occur when a large number of inputs from single channel encoders need to be combined. In such a situation, Input Units possibly can be cascaded through a spare Gigabit Ethernet port. Notice that this requires the implementation of a bi-direction Gigabit Ethernet port. In normal operation the ASI and DHEI ports need only be unidirectional.

For the Input Aggregation Module (IAM), there are 8 daughter cards to support all 32 multi-program transport stream (MPTS) inputs processing. Each daughter card after filtering delivers some portion of it's input transport packets encapsulated in Ethernet frames to the switching device on the motherboard. MPTS inputs to the daughter card are delivered by 4 ASI or 4 DHEI interfaces. The on card ASI or DHEI receivers send the MPTS to the FPGA for the input processing.

A XILINX FPGA Virtex-II XC2V6000, by way of example, can be used for the MPTS inputs processing, which includes single program transport stream filtering, transport stream decryption, time re-stamping and Ethernet frame encapsulation. The encapsulated SPTS is delivered, by way of example, to the IAM BCM5632 based GE switching card through BCM8002 1 GE transceiver. The daughter card can direct access the GE switching card CPU and memory through a PCI interface. The PCI interface also provides all required input processing card control and the power supply.

Figure 7:
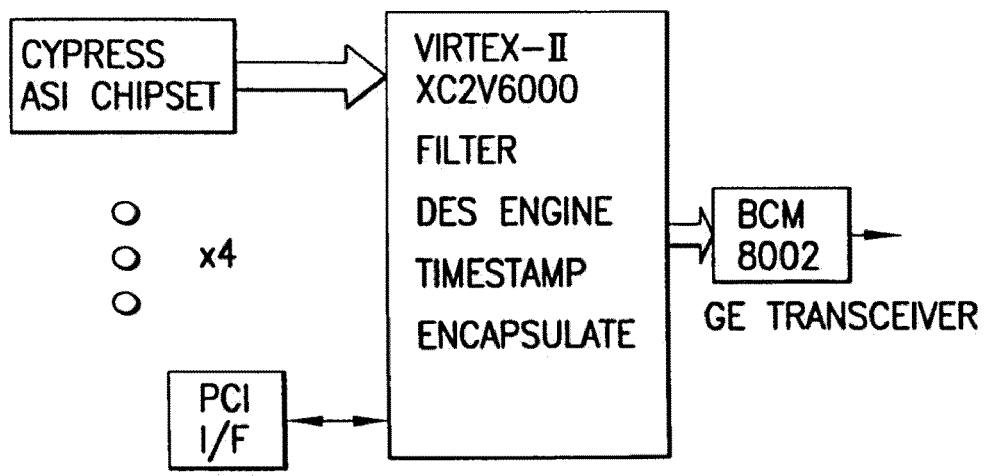
FIG. 7 is a block diagram of daughter cards for the input processing module with ASI inputs.
Figure 8:
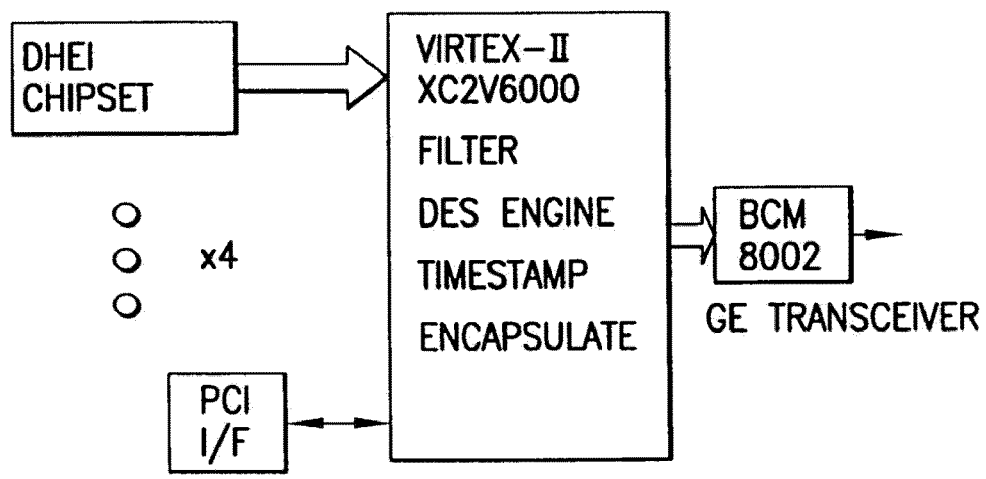
FIG. 8 is a block diagram of daughter cards for the input processing module with DHEI inputs.

FIG. 7 shows the block diagram of one IAM input processing daughter card with ASI input interfaces. FIG. 8 shows the block diagram of one IAM input processing daughter card with DHEI input interfaces.

The key components, for example, on the daughter card may include: One 1 GE transceiver IC BCM8002; One FPGA Virtex-II XC2V6000; Four Cypress ASI receiver chipset, or 4 DHEI Receiver chipset; PCB with PCI interface and power module.

Storage Unit

The Storage Unit 300, also called the Caching unit, provides both capture and playout of real time video streams. In addition, files can be stored and played out on demand, i.e. video-on-demand is one application of this feature.

For broadcast video the Storage Unit 300 receives one or more MPEG-over-IP/Ethernet packetized transport streams via a Gigabit Ethernet interface from one or more Input Units 400, or equivalent. Gigabit Ethernet can carry from 200 to 300 digital channels, at 3 Mbps to 4 Mbps. The targeted capacity, however, is 150 channels. The transport streams are separated into individual program streams, also called digital channels, and the streams are spooled onto disk storage. Sufficient disk storage is available to store an average of two or more live hours for each and every digital channel, although the storage allocated per channel is configurable.

The Storage Unit 300 also stores a collection of video files for a Video-on-Demand (VOD) play out service. If the requested video were located on local storage, then the requested video is played out in real time with the same sorts of processing, encryption, and time-shifted controls offered for live broadcast channels. If the requested video were not on local storage, then the control function within the Server dynamically requests that the video be delivered from an external video library. The external video is distributed over the GIGE backbone into local disk storage via unicast or multicast file transfer. The external video may originate from another Storage Unit 300 or a video-server provided by a 3rd party supplier.

The Storage Unit 300 contains one or two Disk Array modules that are connected to the main chassis via Gigabit Ethernet.

The Storage Unit 300 de-spools digital channels and video-on-demand files from disk and transmits the digital channels as Ethernet frames over a 10 Gigabit Ethernet interface to the gigaQAM Unit.

Figure 9:
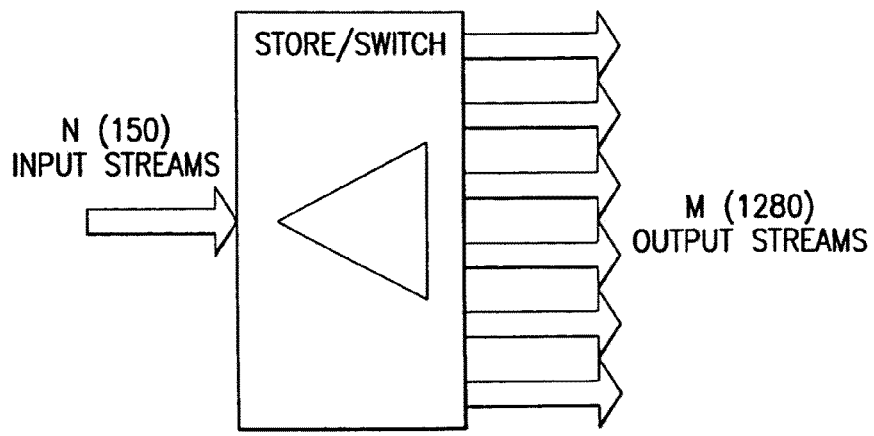
FIG. 9 Shows a storage switch.

The storage unit 300 of the present invention is responsible for accepting input for N MPEG-2 program streams and creating M output streams. The initial target is for N=150 MPEG-2 programs at a peak rate of 4 Mbits/S each and for M=1280 output MPEG-2 program streams at a peak rate of 4 Mbits/S each, as shown in FIG. 9. The input and output bandwidth managed by this device in Mega-bytes per second is therefore:

|        | Streams | Rate MB/S | Total MB/S |
|--------|---------|-----------|------------|
| Input  | 150     | 0.5       | 75         |
| Output | 1280    | 0.5       | 640        |
| Total  |         |           | 715        |

The data flow has several interesting characteristics: Output data flow is significantly higher than input; Video data can be stored and retrieved in a sequential fashion; All output streams might be derived from a single input stream; Video data cannot be delivered late. Since the sustained data transfer rate from a single disk drive is much lower than the required data transfer rate it is clear that the load must be spread across several disk drives in a way that ensures a uniform distribution of the load.

Most disk drives have a stack of disk platters with a single voice-coil actuated arm moving a set of heads that read or write data on the platters. Typically only one of the heads can be active at a time. The following picture depicts an IBM drive, typical of those available.

Figure 10:
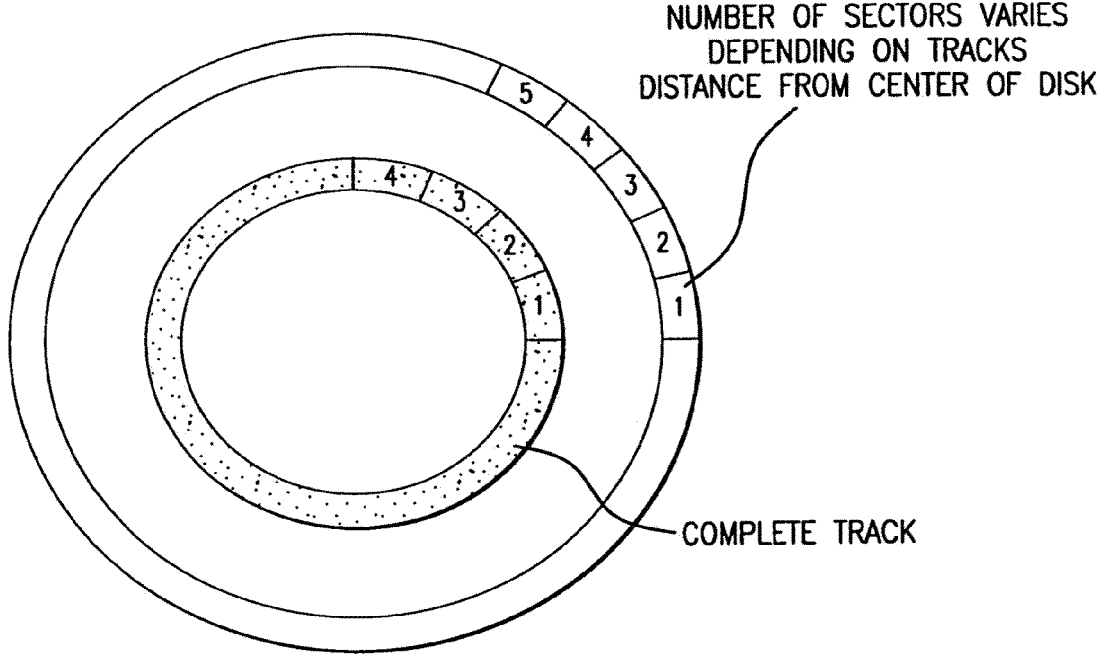
FIG. 10 illustrates tracks and sectors.

Data, as shown in FIG. 10, are store on concentric tracks. The recording density is the same across the whole surface, therefore tracks at outer edge of the disk contain a larger amount of data than track near to the center.

Calculating the data transfer rate that can be expected from a single disk depends upon three factors: (1) The number of sectors per track; (2) The seek time—time spent moving the head to a new track; and (3) The rotation speed of the disk.

Reading all the data from a track during a single rotation of the disk is preferable in order to achieve a high transfer rate per read operation. If possible, reading the same track number on another of the surfaces can be used to improve overall transfer rate.

Each of the factors effecting transfer rate improves with each generation of disk drives. At present, an average transfer rate of approximately 30 M bytes per second is possible.

Figure 11:
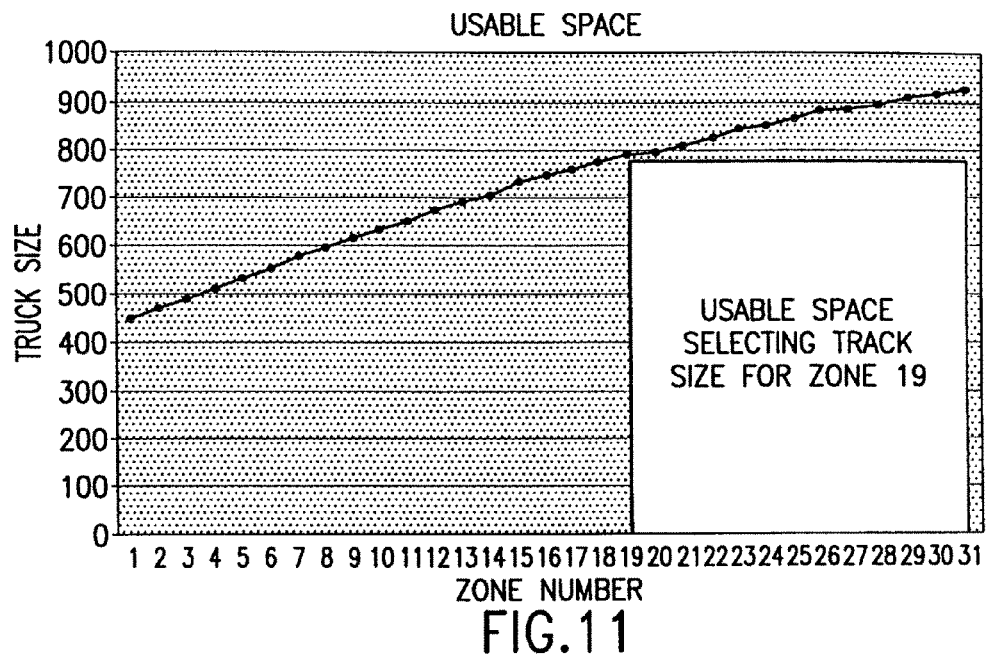
FIG. 11 shows usable space with uniform track size.

In order to simplify the management of disks it is desirable to transfer fixed amounts of data to the disk. The disk has a variable track size depending on its distance from the center of the disk we can create a uniform track size by ignoring small tracks at the center of the disk and not filling larger tracks at the edge of the disk. Fixed sized tracks, however, could simplify tracking of disk space and improve read/write time. FIG. 11 depicts how much disk space is available if this technique is used for various track sizes for a particular IBM disk drive. Using information on the number of sectors available in each track we can determine the optimal fixed track size to use to maximize disk space. However, because track size in part determines data transfer rate it is also useful to calculate the optimum fixed track size that will yield just enough overall disk capacity to meet the Retrovue requirements for 150 programs stored for 2 hours at an average bit rate of 4 Mb/S (540 GB.)

In order to minimize the cost of the Retrovue storage unit 300, a minimal number of disk drives are used. This means the minimum requirements are met for storage capacity and for data transfer rate. Determining this value for a particular disk drive model is quite straightforward but requires knowledge of the performance characteristics and geometry of the disk drive in question.

Figure 12:
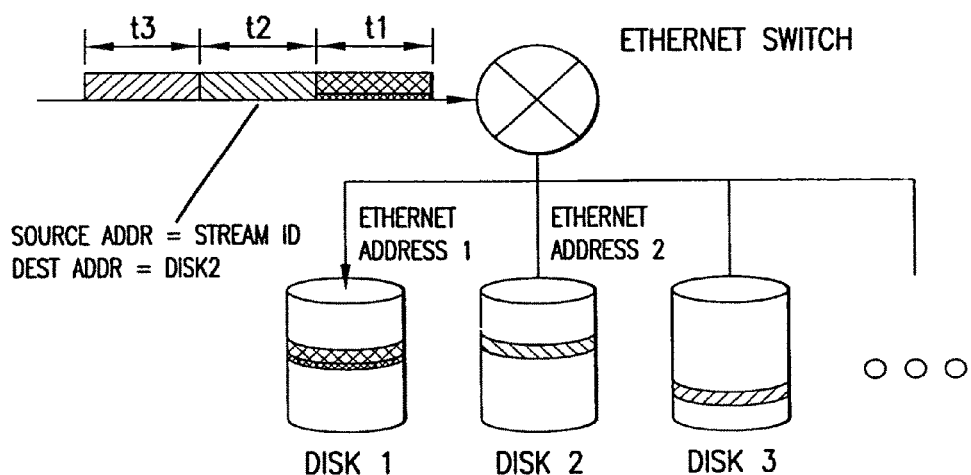
FIG. 12 shows stream distribution over disks.

Retrovue requires that all output MPEG2 program streams may be derived from a single input program (a data rate of 640 MB/S). Since the maximum output data rate from a single disk is approximately 64 MB/S Taking advantage of the relatively constant rate of digital video and the sequential nature of access to the data the design outline in FIG. 12 is used to distribute an incoming stream across an array of disks. In this diagram data collected over a fixed time period is transferred to a particular disk. In the next fixed time period the same amount of data is collected and transferred to the next disk in the array. This process continues in a round-robin fashion until all disks have been used, then first disk is re-used. In order to keep transfers to the disk efficient the transfer to the disk is a multiple of the track size of the disk.

The video server of this invention divides the input video-streams up as they each separately enter the system and then sends the divided video-streams to a server that has a simple switch as it's first component. Each division is identified with a separate Ethernet address. A switch routes the appropriate piece of the video stream to the appropriate disk drive. When replaying the video stream the disk drive controllers co-operate together to send their portions of the video stream at the appropriate time back out through the switch. In this way the problem of a single bottleneck of a CPU and RAM is eliminated to provide a video-server in which many CPU's are working in parallel to produce a much larger number of video streams. FIGS. 13 through 21 describe this process.

Figure 13:
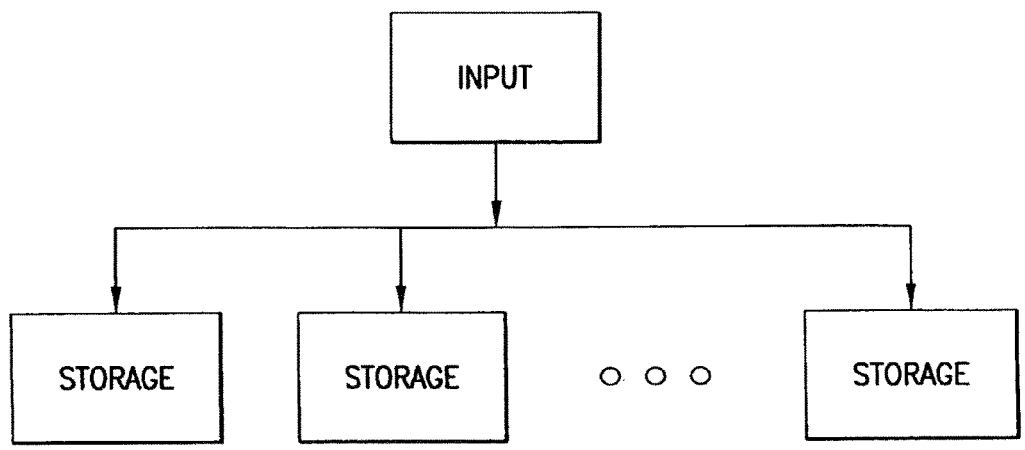
FIG. 13 illustrates storage devices at the hub.

In the present invention, a single input point, as shown in FIG. 13, is desirable for all video streams. This input point usually is located at a cable headend and fed from a variety of satellite sources and other transport multiplexes from local encoders. The selected input streams are then distributed to hub level storage and QAM generation complexes.

An obvious way to distribute each video stream, MPEG2 Single Program Transport Multiplex, over the connecting gigabit Ethernet is to assign a single multicast Ethernet Media Access Control (MAC) address or multicast IP address to each stream so they can be differentiated at the storage box and assigned to the correct set of tracks on each disk. The assignment of an address requires the storage unit to demultiplex each stream from the gigabit stream and assign portions of that stream to each disk.

Figure 14:
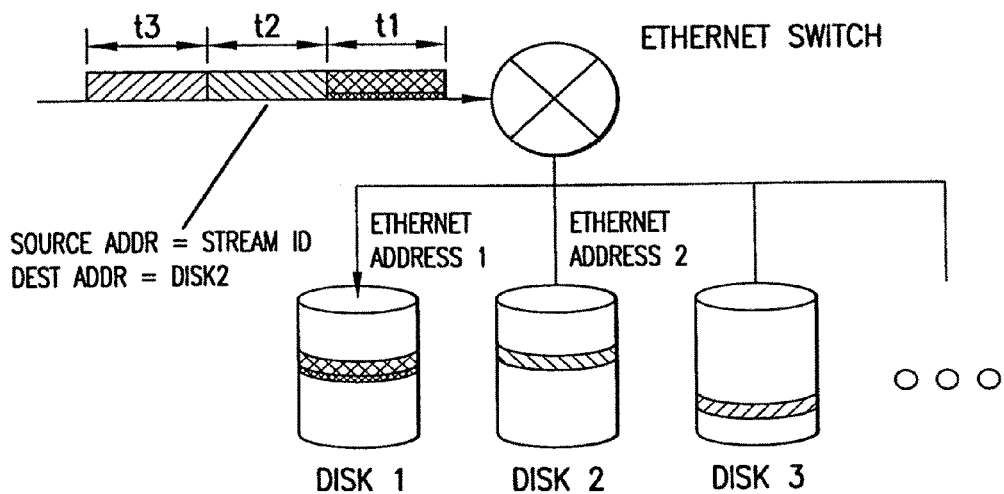
FIG. 14 illustrates Ethernet addresses to device packets to disk.

Another method of directing the appropriate portions of the video stream to the appropriate disk is to have the Input Unit 400 assign the destination disk and encode that destination disk address as part of the destination Ethernet address for a chunk of the input video stream. FIG. 14 depicts this process with a packet of video directed to a disk. Note that using this scheme the destination Ethernet address is used to direct a switch to forward the packet to a particular disk. In addition the source address can be used to identify the MPEG2 program to which the packet belongs. This scheme has the advantage that a simple Ethernet switch can be used to demultiplex the incoming stream and direct it to the correct disk very economically.

The Storage Unit/Input Unit Interaction provides a large number of video streams required in Retrovue a special video-server has been devised. In the prior art, a conventional video-server uses a number of disk drives to store a single video stream, often in a RAID array to provide protection against a disk failure. A single processor is used to assemble data from the collection of disks and provide an MPEG-2 SPTS (Single Program Transport Multiplex) for each required output stream. In this prior-art arrangement the single processor and its RAM inevitably become a bottleneck through which all streams must pass.

Using the scheme described above to direct packets to the appropriate disk controller is very powerful but has a drawback. In FIG. 13 a single input unit 400 is shown broadcasting, or multicasting, data to several hubs that contain Storage units 300. If the scheme suggested above were used, then it will work perfectly if each storage module had the same number of disks and the usable track size is the same. In practice it is desirable to allow each of the storage modules to be of a different size, possibly because disk technology has improved since the installation of early modules to late modules.

Figure 15:
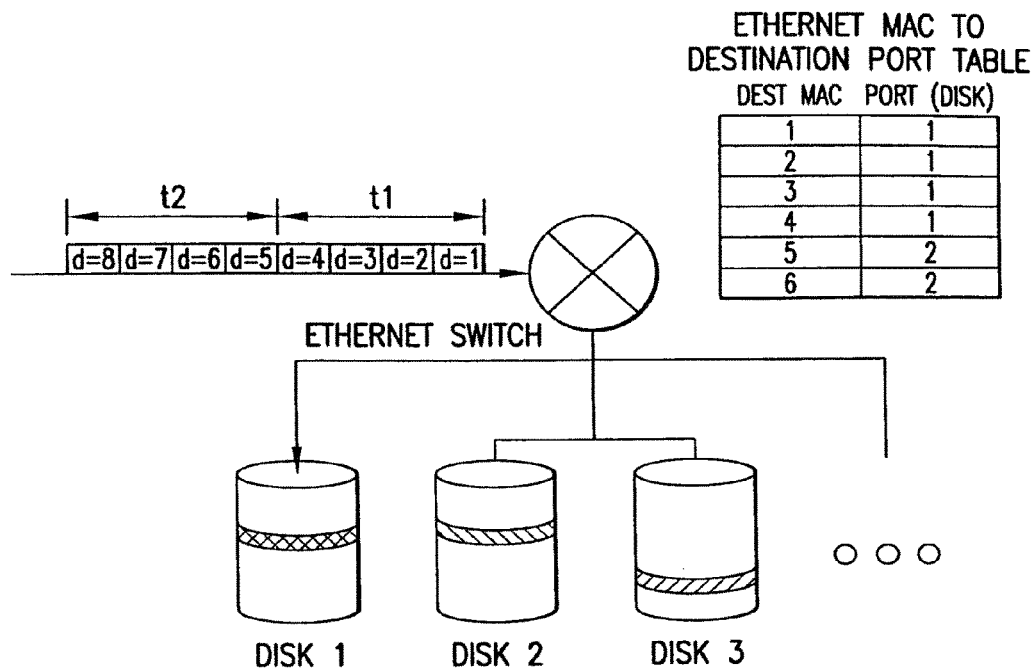
FIG. 15 illustrates partitioning Ethernet address.

Building on the previous scheme we use multiple Ethernet destination addresses for packets belonging to a data stream. The Ethernet switch at the storage unit is configured to partition groups of Ethernet addresses, as shown in FIG. 15, to direct them to different disks in accordance with the track size for disks used in that particular storage module.

One simple analogy that may help to explain this concept is that of a beer bottling plant that creates a conveyor belt with a long line of bottles that are the same size. At the end of the conveyor belt is a machine that fills up a box full of bottles. This machine will grab six bottles and pack them into a box before moving on to another box. If the plant manager decided that a new type of box containing twelve bottles were to be produced, then it is a simple matter to switch box sizes and the adjustment of the packing machine. The individual size of bottles does not have to change even though the new package size contains twice as much beer.

For each hub-storage module in the network the switch at the hub is configured to direct a collection of destination addresses to the appropriate disk.

Given a peak bit-rate, it is possible to accommodate VBR video in the storage system. The input unit 400 is responsible for forwarding MPEG packets arriving within a time period even if the encapsulating Ethernet packet is not filled. The easiest option for the storage unit is to accumulate data for the a period of time equal to the average bit-rate for the track size of the disk and then output that data to the track even if the track is only partially filled.

Figure 16:
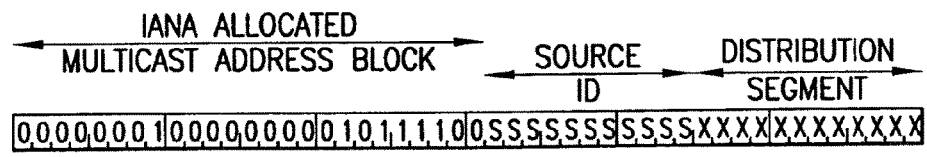
FIG. 16 shows an Ethernet destination address.

In order to direct incoming packets to the correct location on the correct disk the 48 bit Ethernet destination addresses is used. Destination address is encoded as shown in FIG. 16. This allocates 11 bits (SSSSSSSSSSS) to identify the source MPEG-2 single program transport stream identifier and 12 bits (DDDDDDDDDDDD) to segment the stream, groups of these segments are directed to a particular disk.

In order to create thousands of output video streams from a single input stream the stream must be striped across a number of disks so seek and transfer time do not become a bottleneck.

Figure 17:
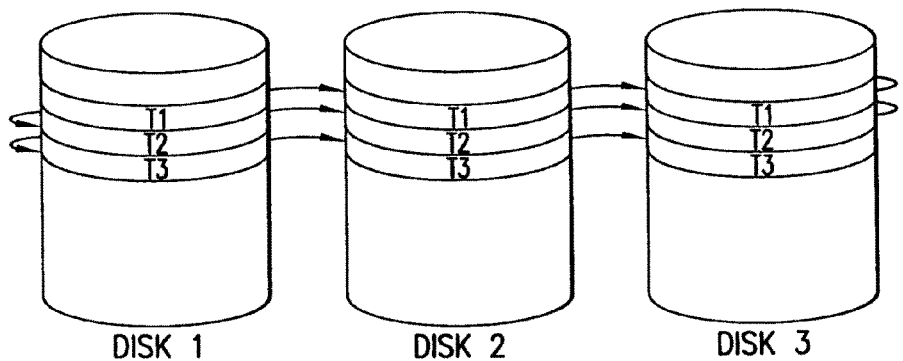
FIG. 17 shows circular buffers spaced over disks.
Figure 18:
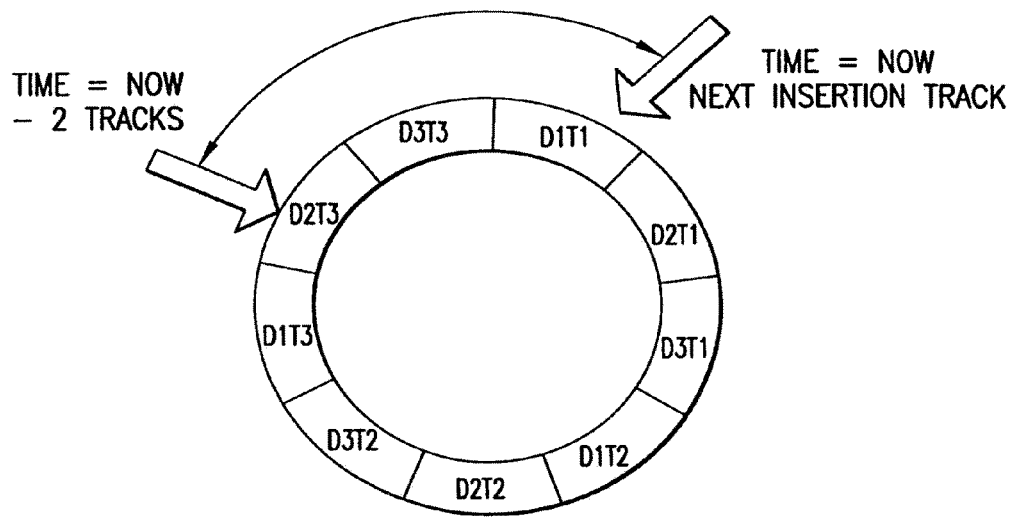
FIG. 18 illustrates seek to previous time in video stream.

Since a collection of circular buffers distributed across a collection of disks is created, as illustrated in FIG. 17, several output streams can be generated from those buffers. Notice that given knowledge of the current insertion point in the buffer and knowledge of the time represented by a buffered unit, disk track, then the disk and track can be determined that represents a particular time in the past in a video stream. In the example circular buffer in FIG. 18 the circular buffer is formed of 9 tracks spread over three disks, see FIG. 17. Blocks are labeled with the Disk and Track number. Notice that the distance to which we can seek is limited by the size of the circular buffer and the resolution is limited by the size of the disk track size and peak stored data rate. In the above example with a track size of 400,000 bytes and a peak data rate of 4 Mbits/S block D2T2 represents 1.6 seconds in the past.

When video data, at a constant bit rate, by padding video that is below a peak rate, is striped across a collection of disks we expect that for a single stream the disk it will be drawn from will sweep across a set of disks. For example if a single drive could deliver data at approximately 160 Mb/S and a single stream were 4 Mb/S, then the drive might be expected to service 40 service requests per second.

Figure 19:
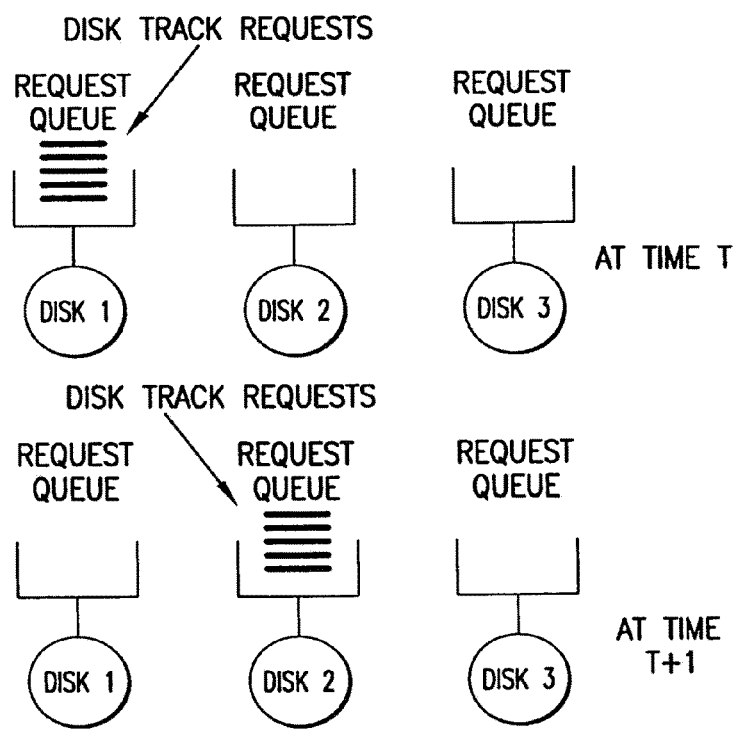
FIG. 19 illustrates disk request queue.
Figure 20:
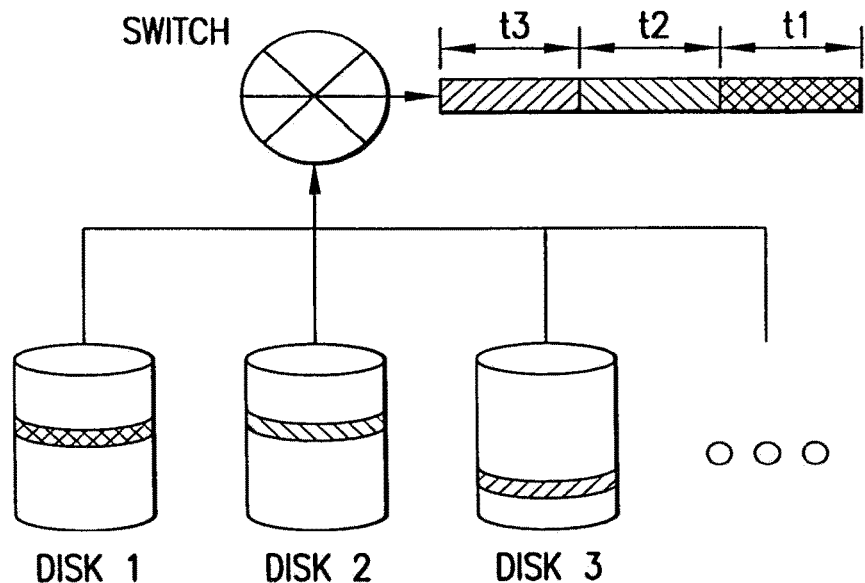
FIG. 20 illustrates coordination of output stripes.
Figure 21:
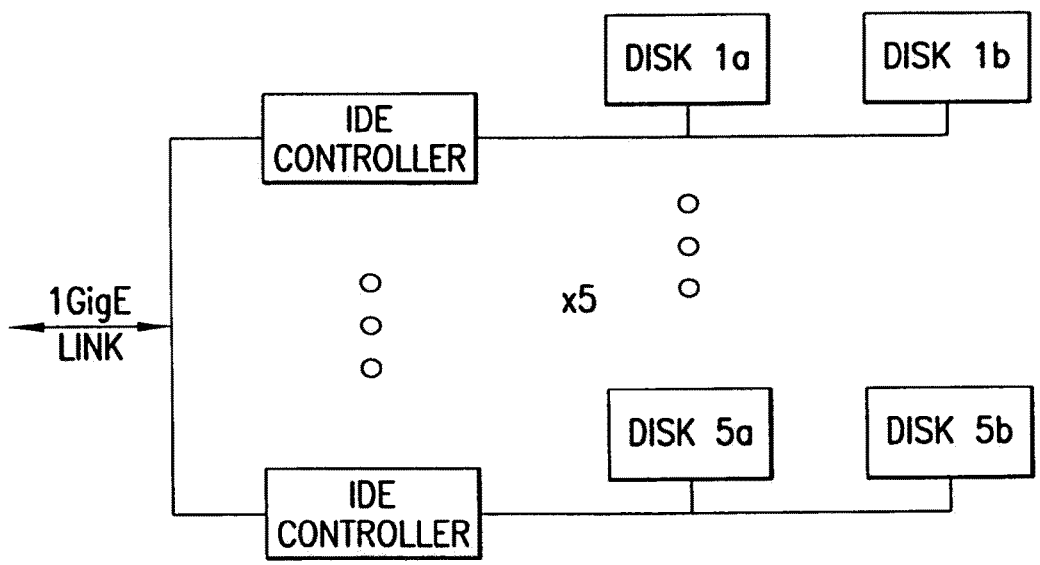
FIG. 21 illustrates disk controller subsystem.

In order to allow a single drive to deliver the required number of streams by the required deadline the number of requests on a single drive must not exceed a certain level, in the above example 40 requests per second. To make sure that each disk is not overloaded the play-out can be delayed of a video stream until the request queue for the disk that contains the initial block of data required is below the maximum threshold for that disk. The request queue, as shown in FIG. 19, for each is balanced to the same level to allow maximum jitter in the delivery of each requested block.

Assuming that all the disk subsystems have the same performance, the threshold can be computed for the time period T equal to data D stored on a track played at a rate of R.

$$T=D/R$$

Assuming each disk request is for a track of data the time required to satisfy the request is:
Request=Seek Time+Latency Time+Read Time
Seek Time varies between 0 and Smax
Latency varies between 0 and Lmax
Read time is fixed by the rotation speed of the disk.

Several algorithms for re-ordering the queue of requested tracks are possible that change the order in which tracks are retrieved to minimize time wasted seeking from one edge of the disk to the other. As long as deadline for retrieving a track is maintained these algorithms can improve the overall performance.

During ingestion of a video stream, incoming data will enter the storage box in the order the data are received and can then be distributed to the appropriate disc. During output, the playback of this data is coordinated so that stripes of data from each disk are played out sequentially. Even though the video stream is spread over several disks, the video stream is easy to compute the sequence of transfers that must take place and send this information to the logical disk drive controllers. However the disk controllers must be coordinated, for example in FIG. 20, disk 1 must complete the transfer of all packets from its track before disk 2 commences transmitting packets. In order to perform this coordination the first disk controller sends a packet to the second controller via the switch when it has completed sending information for the first track, the second disk controller in turn informs the third controller and so on. An alternative scheme involving a shared clock is potentially possible but is difficult to coordinate accurately, especially if the disk controllers are located in different chassis.

Play-out of a video stream must begin at a certain time, for example the start of a television program. The disk track that contains that time can be calculated within the circular buffer to an accuracy of approximately a tracks worth of data, about 0.9 of a second with current disk density. This means that play-out must start on a particular disk.

Since the number of disk requests that can be services in time T is known, play-out possibly may not be able to start immediately. In order to balance the load across all disks we delay start of play for a video stream until the request queue is below a threshold. This scheme is analogous to people waiting to get onto a moving carousel until a open space passes them, or cars waiting to get onto a roundabout.

The switching element used to direct packets to the Disk Arrays shares a design with the GigaQAM unit 200 and input unit 400.

Disk Array

The disk array contains both disk controllers and a large number of IDE disk drives.

The disk controller subsystem is responsible for converting data over a 1 Gbit/S Ethernet connection into data over 5 IDE connections. Each pair of disk drives is a unit with disk (b) backing up disk (a). Two write commands are required to mirror contents on both disks but only a single active disk is read. Due to the nature of Retrovue read transfers outnumber write transfers by about 4:1. Typical sustained IDE disk transfer rates are computed to be about 20 Mbytes/s, hence 5 IDE controllers are combined to feed a 1 Gbit/S interface.

The disk array consists of 32 standard height drives with 4 controllers packages in a 5RU enclosure. Four copper gigabit Ethernet connectors connect the disk array to the storage/switch module.

OAM Unit

The gigaQAM Unit 200 receives MPEG encoded digital channels over a 10 Gigabit Ethernet interface from the storage unit or other source. Each digital channel is routed, duplicated, when directed to multiple destinations, remapped, and encrypted. Program information is inserted. PCR correction is performed and null frames are inserted. Each subscriber receives private conditional access encoding and key management. Per subscriber conditional access provides a very strong content control and access control mechanism. Each digital channel has its own timing. One subscriber can view a live digital channel while a neighboring subscriber can views the same digital channel, but perhaps delayed by 20 minutes; and yet another subscriber can have the same digital channel paused.

The gigaQAM unit 200 receives single program transport streams and generates multi program transport streams. Modules are contained which convert the MPEG streams into QAM channels. Up to 128 QAM channels can be provided in a cost effective and rack space effective manner.

The gigaQAM unit 200 accepts an asynchronous 10 Gbps input stream of MPEG-over-Ethernet traffic from the STORAGE unit or other upstream source and delivers 128 QAM channels to a bank of RF output connectors.

Figure 22:
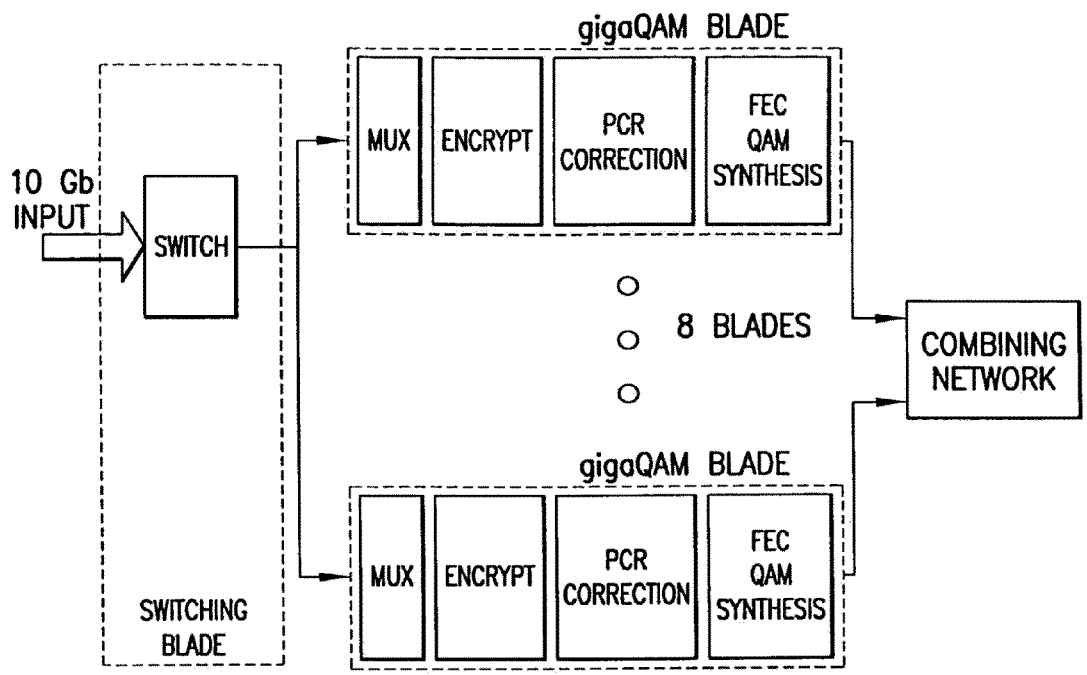
FIG. 22 shows a gigaQAM card.

FIG. 22 illustrates a gigaQAM card. The gigaQAM unit 200 maps into a switching card located at the end of the chassis. The gigabit switching element on gigaQAM unit card is at the center of a star network of point-to-point gigabit Ethernet connections to each of the GigaQAM cards. The switching card has 4 external ports, connected via a rear transition module to connectors on the back of the chassis. These ports are 3×1 gigabit Ethernet connectors and 1×10 gigabit Ethernet connector. Each gigaQAM card is connected to the switching element via the gigabit Ethernet carried over the cPCI mid-plane. The gigaQAM card outputs via a number of RF connections that lead from the mid-plane to a combiner board that forms the rear of the chassis.

The gigaQAM unit 200 performs the following stream processing functions: Stream arrival is asynchronous, MPEG framing vs. output clock; Multiplexing N programs per output channel; Encryption; PSI generation for output multiplexes SI generation for inband; Auxiliary data streams; Authorizations; Self Installation; Interactive Applications; Set top firmware updates; Null packet generation; PCR correction Stream departure is synchronous.

The conceptual flow through the gigaQAM unit 200 is as follows: Receives the asynchronous serial stream from Transport Input and Storage; Maintains a per-program-stream flow control state and buffer; Performs all stream processing functions specified under the Process step; Receives per-transport-stream and per-program-stream conditional access from Host (TBD which interface this arrives from); Multiplexes and create synchronous Transport Streams for QAM synthesis.

Figure 23:
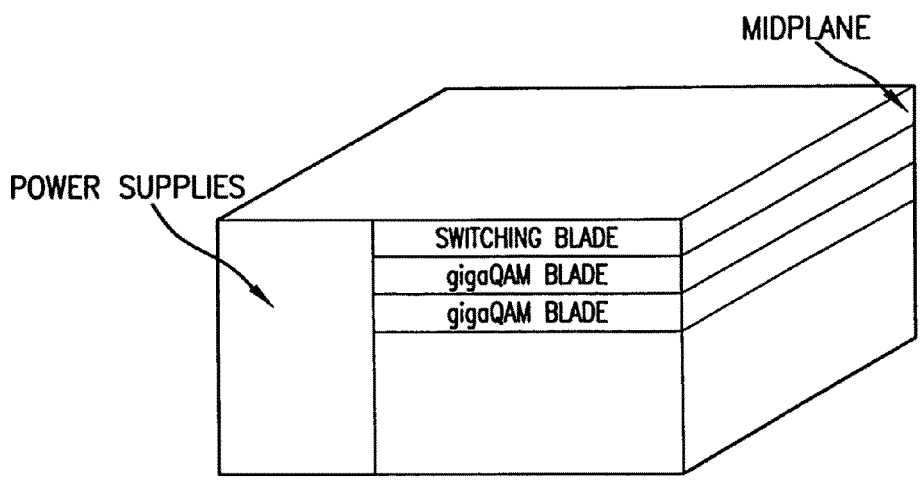
FIG. 23 shows horizontal orientation of gigaQAM cards.

In FIG. 23, the chassis contains a switching card and 8 GigaQAM cards oriented horizontally. These cards plug into a midplane which provides connectivity between the cards.

There are 8 GigaQAM cards that support processing of all 1280 program streams. The GE switching card delivers 160 program streams to each daughter card through 1 GE interface.

Figure 24A:
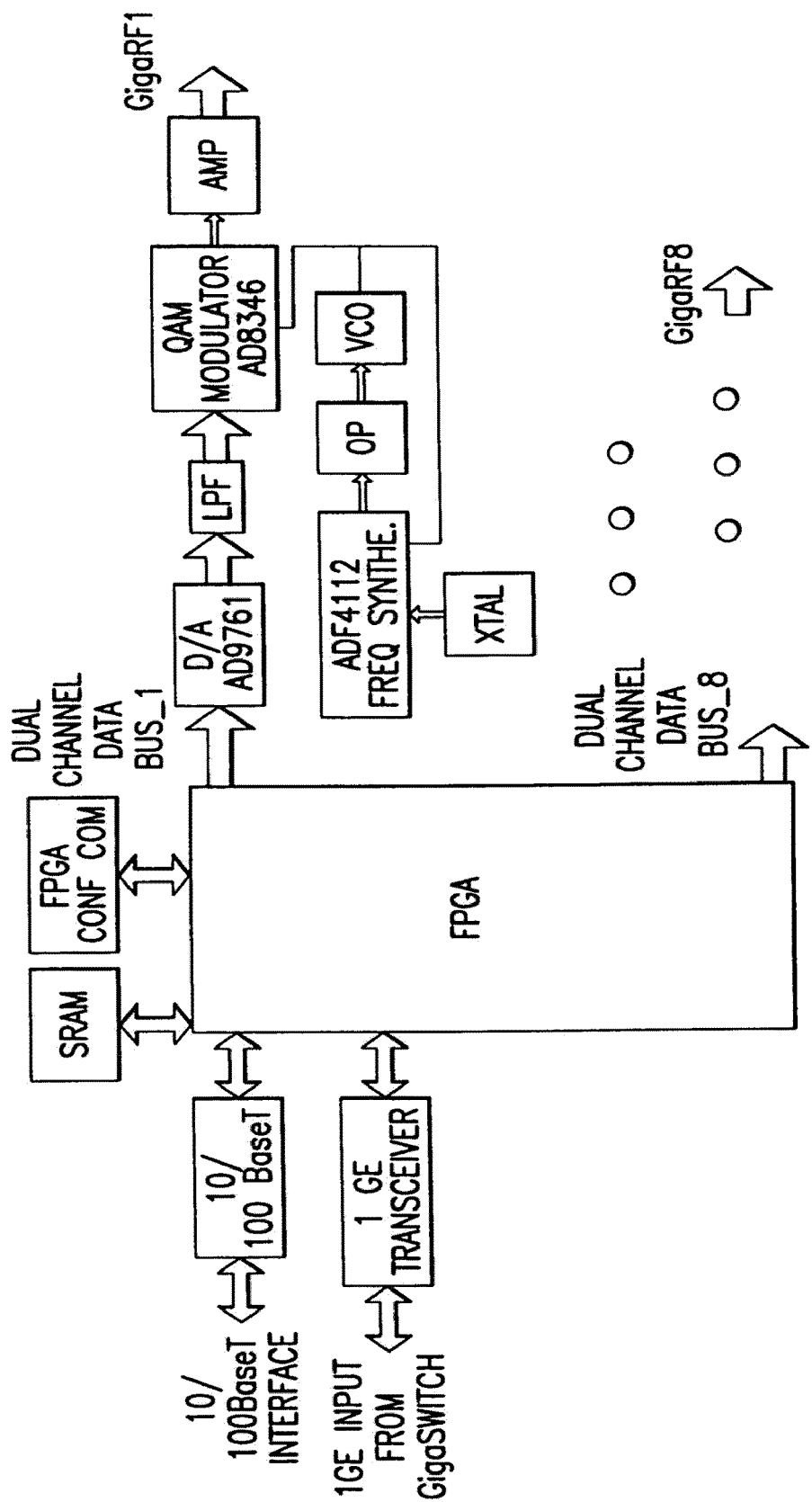
FIG. 24 illustrates one of eight gigaQAM cards for the gigaQAM unit.
Figure 24B:
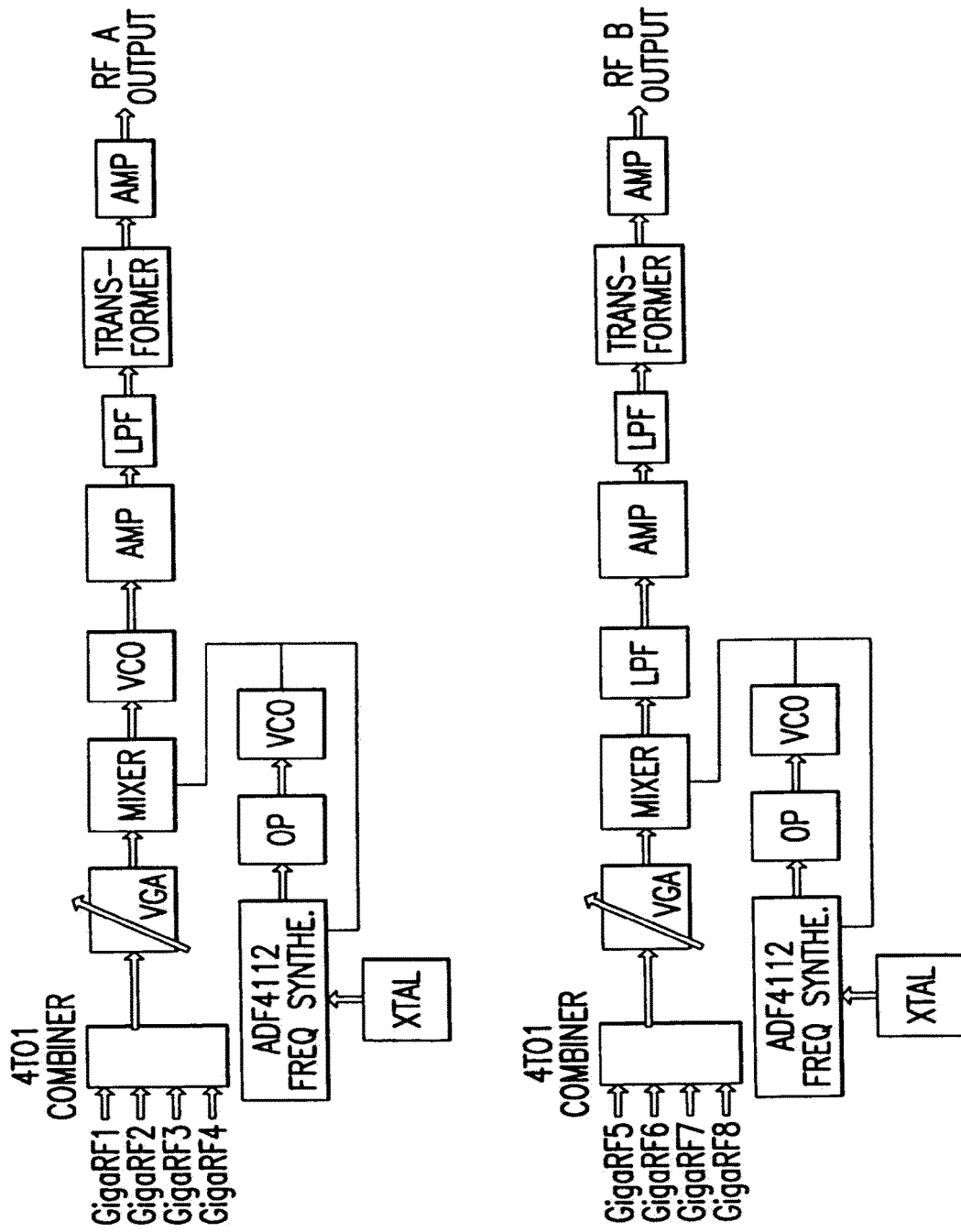

On each GigaQAM card there is one FPGA. Each gigaQAM card performs DES encryption through the control signal from PCI bus, routes the single program streams to the proper FIFO memory, and calculates the rate of delivered program streams. Each gigaQAM card also performs the 16 multiple program transport stream multiplexing in parallel, PID re-mapping and PCR correction. Then all 16 MPTS outputs are multiplexed together inside the FPGA for QAM digital processing including FEC and Nyquist filtering. FIG. 24 shows the block diagram of one processing GigaQAM card.

The gigaQAM unit 200 includes: (1) One GE switching card with BCM5632 and IDT processor. (2) One processing and modulator card with one 6 Mgates FPGA Virtex-II XC2V6000, 8 16 M×16 SDRAMs, 16 DACs, 16 quadrature modulators and 4 RF converters. (3) 8 cards. One cPCI middle plane, dual power modules and unit case.

The on-board IDT processor runs VxWorks and has device drivers for the 10 Gbps interface, processing card interfaces, and 100 BT interface with Controller. The software performs the following management and control functions: (1) Download software from Server. (2) Gather and report management statistics on traffic, rates, errors, and faults from the processing cards. (3) Process control functions from the Controller including routing table set up, configuration of PID remapping, PID routing, encryption table key manipulation, stream output rate setting, and insertion of program information tables.

The 10 Gbps Ethernet interface receives Ethernet-encapsulated MPEG frames. Details of the packet structure are contained in section 18. The 100 BT management interface supports a management protocol with the server. Functions supported include software download, statistics gathering, enabling and disabling of processing functions, and dynamic stream processing configuration.

Figure 25:
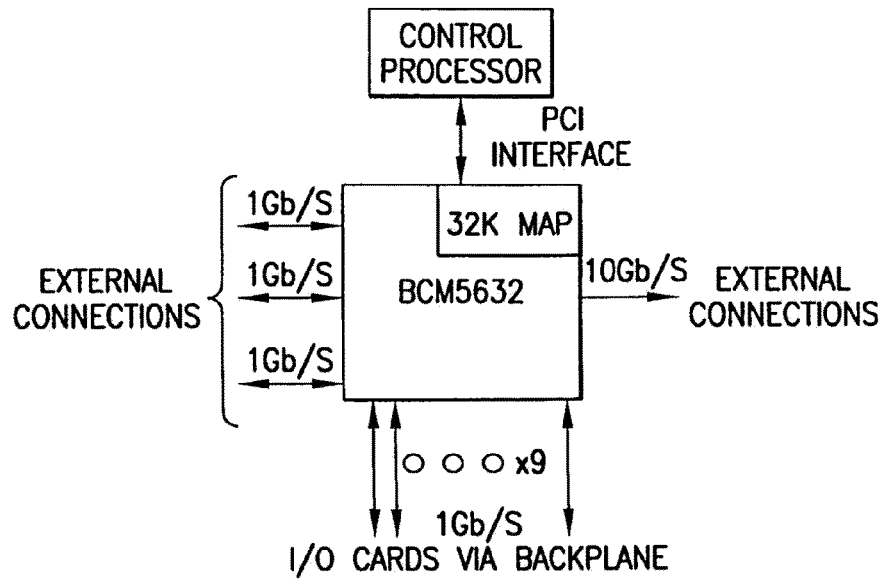
FIG. 25 shows a logical switch element.
Figure 26:
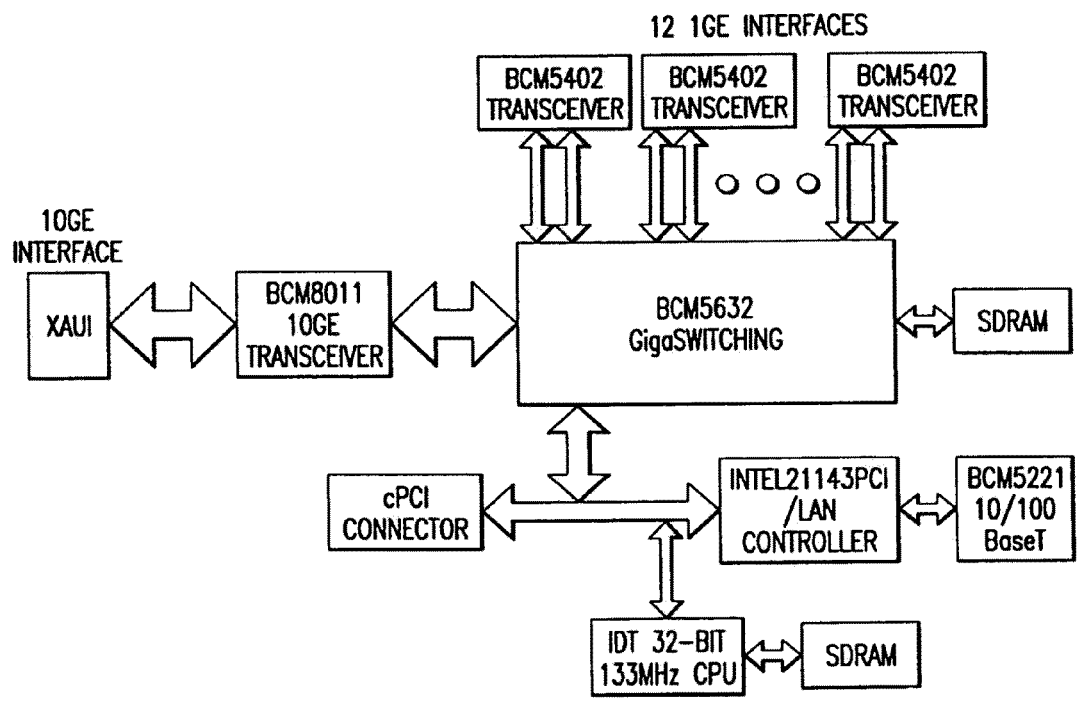
FIG. 26 shows physical elements of switching card.

The gigabit switching card is a common component whose design is shared between the INPUT, STORAGE and GigaQAM units. The gigabit switching card is based on the Broadcom BCM5632 switching device. The Broadcom 5632 is an Ethernet switching element, as shown in FIG. 25, that manages 12 1-Gbit input ports and 1 10-Gbit Ethernet port. It contains a 32K row mapping-table directing packets based on destination address to the appropriate output port. FIG. 26 shows the physical elements that make up the switching card.

The stream processing and QAM synthesis of each gigaQAM Synthesizer Module has the following characteristics: (1) 1280 constant bit rate MPEG QAM streams multiplexed into a 5.2 Gbps stream; (2) 128 6 Mhz channels (10 program streams per channel; (3) Future, 96 8 Mhz channels, 10-15 streams per channel, depending upon MPEG resolution; (4) FPGA does the re-multiplexing, encryption and PCR correction; (5) All QAM streams are same data rate; (6) Performs FEC and digital QAM processing; (7) QAM modulator and RF conversion circuit; and (8) QAM demodulator feedback loop for modulator calibration and performance monitoring. The tunable spectrum from 50 Mhz to 860 Mhz.

Figure 27:
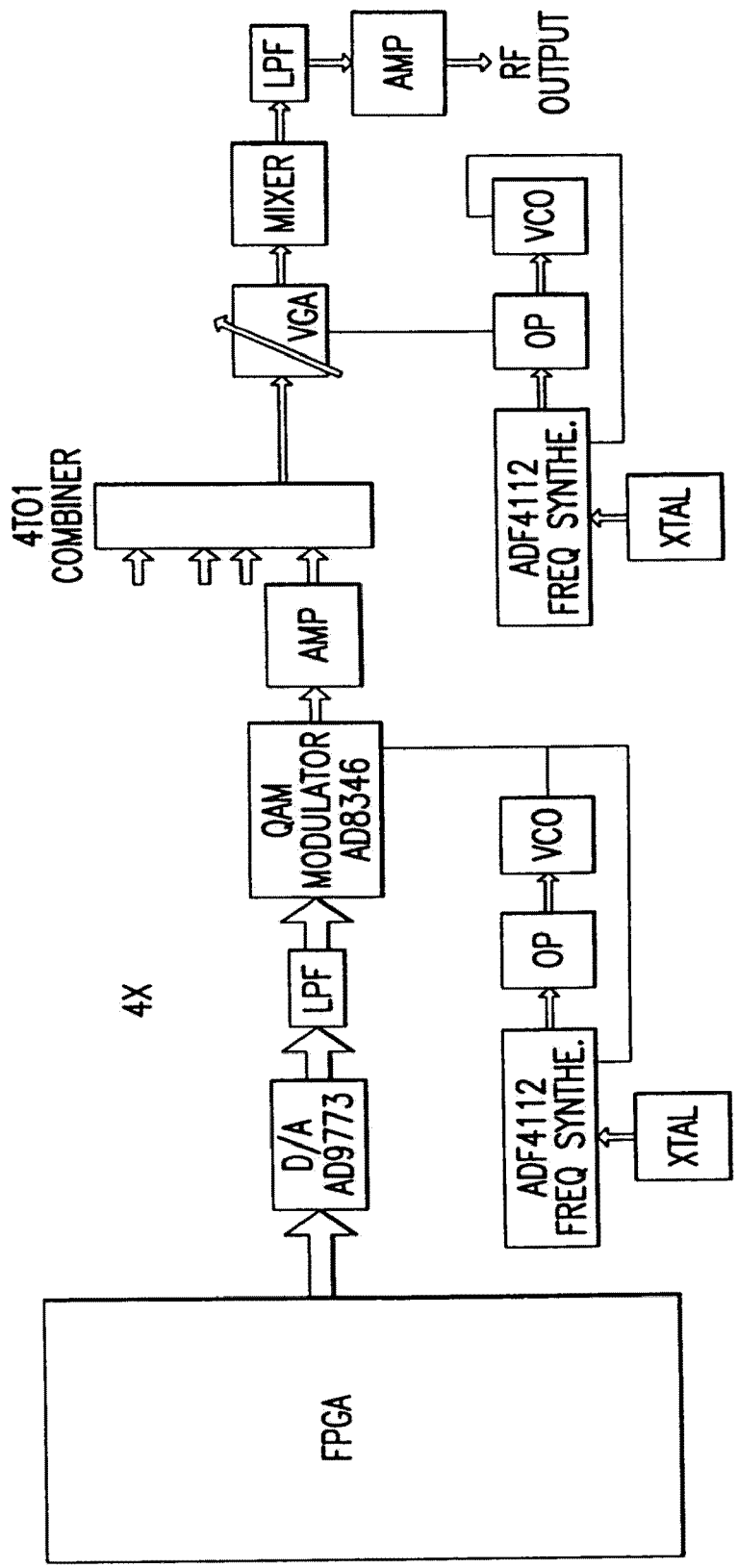
FIG. 27 is a block diagram of a QAM synthesizer analog module on one card.

The analog QAM synthesizer and RF conversion portion is shown in FIG. 27. The analog QAM synthesizer accepts FEC encoded and digital filtered data from an FPGA and generates QAM modulated HFC RF signals.

The FPGA digital processed data first passes to the DAC to generate base-band I and Q analog signal, after proper filtering then quadrature modulated into 1 GHz to 2 GHz RF signal. With gain control and down-conversion, the final QAM modulated HFC RF signal from 50 MHz to 860 MHz is delivered to the combiner to deliver 128 QAM signals.

FPGA groups 4 QAM channel data together and delivers the data to D/A converter AD9773 that can support more than 4 QAM channels data. Quadrature modulator AD8346 will modulate the 4 QAM channel signals together as a band at RF from 1 GHz to 2 GHz range. Four such quadrature modulators outputs will be combined together for the RF down conversion. So one RF down conversion will handle 4 bands signals, total 4×4=16 QAM channel. All the 8 down conversion blade outputs will be combined for different clusters, total 128 QAMs.

The low phase noise LO generation circuits used for the QAM modulators and the down-conversion mixers are of critical importance to guarantee the 1024QAM performance.

Figure 28:
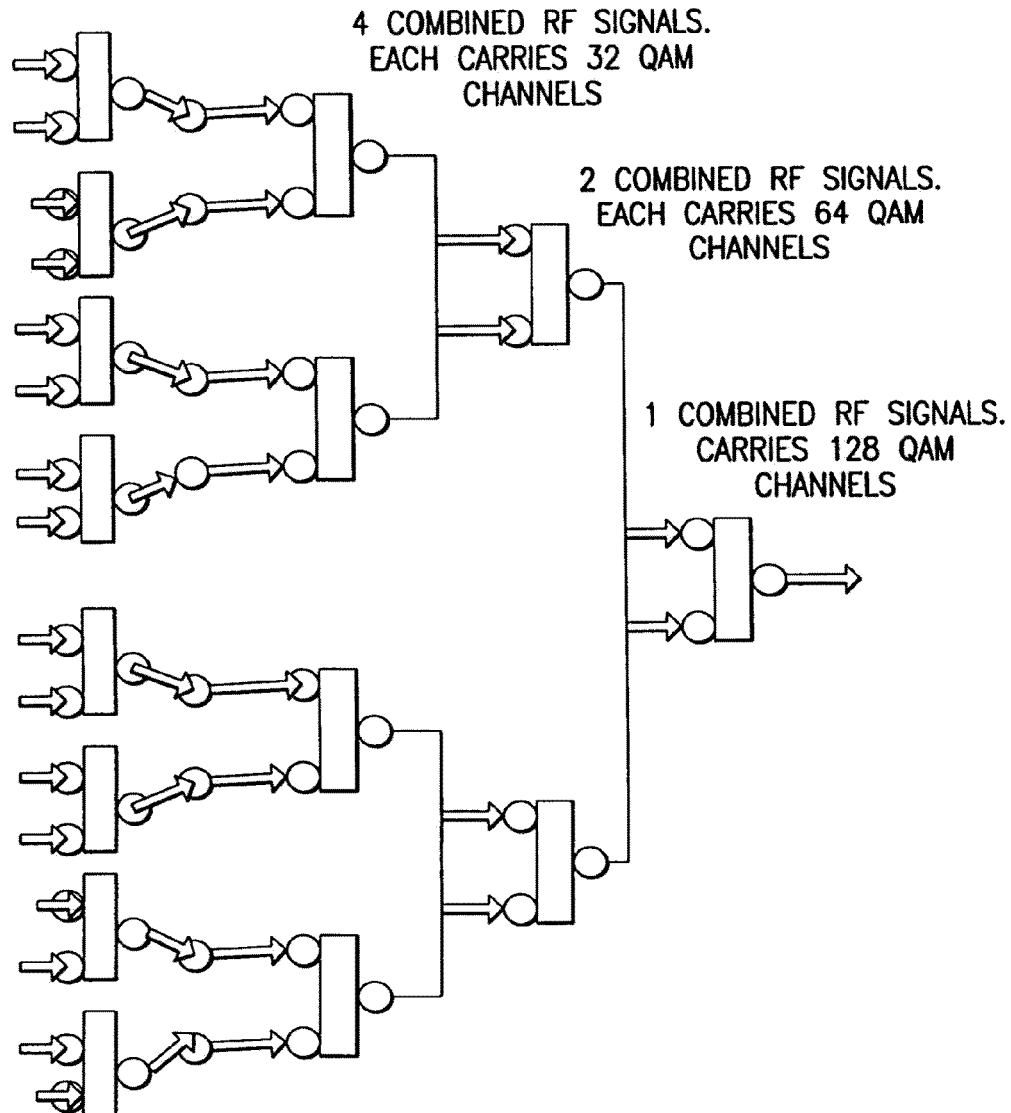
FIG. 28 is a block diagram of a combiner.

Eight RF output from the 8 QAM modulator daughters are combined into different groups for different clusters. FIG. 28 shows the block diagram of the combiner portion. A 20 dB directive coupler is used to deliver the chosen RF signal from the combiner connector to a QAM receiver cable modem for the associated modulator calibration and transmitter performance monitoring.

Controller Unit

The Controller 800 manages the switching set up of information pathways from the Input unit 400, Storage unit 300 and gigaQAM unit 200. It constructs valid Program Specific Information (PSI) and System Information (SI) for the output multiplexes created at the gigaQAM unit.

The Controller 800 may run several functions described within the Mini-Server 500 depending upon configuration.

Mini-Server Unit (Multiple Functions)

The MiniServer Unit 500 executes one or more selected headend functions. Depending upon loading requirements one or more MiniServer Units may be required. The following functions can be run on the MiniServer Unit 500: (1) MiniBox Management and Control—functions pertaining to configuration, initialization, dynamic control, statistics gathering, alarm collection, and billing and accounting interfaces. (2) Retrovue™ Application—all functions pertaining to handling the remote control of the storage server, broadcast-on-demand, and video-on-demand application. In the first generation the On-Screen Display is generated within the MiniBox. In the second generation the On-Screen Display is generated within the MiniServer unit 500. (3) MiniServer Application—execution of applications in a headend server rather than the MiniBox. The MiniBox becomes a graphics display device, and all On-Screen Display screens are generated by the MiniServer Application and transmitted downstream within the MPEG transport stream. The MiniServer implements the full application functionality. In this configuration the primary functions within the MiniBox are display processing, video and interaction, and conditional access decoding.

Out-of-Band CMTS Unit

The CMTS unit 600 is a 1 RU unit that provides a 100 BT WAN interface and a DOCSIS 1.1 and 2.0 HFC interface. In addition to the normal requirements for a DOCSIS CMTS the CMTS unit 600 also supports the Digital Set-top Box Gateway (DSG) application layer interface for forwarding of multicast out-of-band traffic between the video headend and the settop box. The CMTS unit 600 also supports any video specific modes mandated by the DOCSIS standard, such as the potential requirement for maintaining active registered status with a modem that has lost connectivity in the return path.

The MiniBox is a small-footprint economical unit that enables personal digital TV service for the subscriber. The MiniBox provides a high quality analog interface to the TV for audio/video output and interacts with the remote control to provide interactive control of the personal-TV interface, program guide, pause, restart, jump-to-program-beginning, etc. The MiniBox communicates over a return channel with the Server 500. The Server 500 implements real time controls such as channel-switching, pause, restart, etc. Through the MiniBox the subscriber can access both live broadcast digital channels, time-shifted programming and stored video files.

For basic service the MiniBox can be used to access digital channels without advanced broadcast time-shifting and video-on-demand functionality.

The MiniBox contains a lightweight, in terms of memory and processor requirements, application that interacts with the Server. The MiniBox application paradigm is targeted for low-cost and long-life hardware. The initial application contains electronic program guide and MiniBox configuration, and access to the Retrovue application server in the headend for controlling channel-change and time-shift channel viewing options.

Flexible interactive applications are enabled through interaction with an Application Server. The Application Server can run in the MiniServer or in the Controller depending upon configuration.

The first generation system provides remote control of virtual-PVR storage for the time-shifted personal TV operation. Subsequent generations of the present invention will support offload of interactive applications processing from the MiniBox via the headend MiniServer unit.

When operating in Retrovue™ mode each subscriber's digital channel stream is encrypted with unique keys. Content is not switched to the subscriber unless the subscriber is authorized.

System Interfaces

The present invention supports multiple external and internal interfaces, and the ability to carry multiple conditional access systems. Video-to-Input Interface includes video that is not Ethernet encapsulated is captured via ASI interfaces to external video processing units.

The Input-to-Storage interface is Gigabit Ethernet. The primary flow over the WAN interface is Ethernet encapsulated MPEG transport streams. MPEG transport streams may be encapsulated in raw Ethernet, or may be encapsulated via IP, UDP, and RTP depending on system configuration options.

The format of the stream is IP-encapsulated MPEG. The MPEG stream is frame-asynchronous, e.g. the arrival time of the encapsulated MPEG frames is decoupled from the actual output timing, i.e. the Program Clock Reference (PCR) is not synchronized with the Ethernet frame timing. Downstream units are responsible to insert sufficient buffering to accommodate end-to-end jitter and also recalculate PCR (and insert null frames when needed).

The LAN interface is 10/100 BT Ethernet. It connects to system equipment such as the Controller Unit, MiniServer Unit 500, CMTS 600, Simulcrypt conditional access generators, network managers, and billing and provisioning Servers.

It should be noted that 100 BT is also used to interconnect units for management and control functions. Though not shown in the diagram, actually each module contains a single 100 BT interface, and interconnectivity is achieved via an external switching hub.

The gigaQAM unit 200 has an HFC Digital Video Interface which is connected directly to the HFC network. The traffic stream is digital video DVB standard MPEG transport streams. MPEG frames are transported via one-way downstream n*6 Mhz (or m*8 Mhz) QAM channels output from the gigaQAM Modulator. No analog traffic is generated.

The primary HFC out-of-band interface is DOCSIS. The CMTS provides the DOCSIS interface to the HFC.

A second out-of-band interface is based upon DAVIC. An Aloha style two way MAC/PHY may be used for communications with DAVIC-based settop boxes. More details of the DAVIC OOB interface are described in the OOB module description below.

The storage to gigaQAM interface is 10 GIGE, with 5.2 Gbps of embedded MPEG traffic at full capacity. The interface carries MPEG frames including program streams, program tables, and frame-tags. The encapsulated MPEG stream is asynchronous with respect to the output clock. Frames from multiple program streams and multiple transport streams are clumped in variable size bundles. Individual program streams are differentiated by Ethernet multicast addressing. Each program stream is encapsulated within Ethernet frames addressed to an Ethernet multicast address unique to that program stream.

The Controller/MiniServer-to-Storage/gigaQAM/Input Interface from the server to other Units is 100 BT. Configuration, diagnosis, and real-time control functions are performed over this interface. A typical installation will utilize an external switching hub to interconnect the server module with the other modules.

The management function uses this interface to provision each unit, download software, collect management statistics, and collect alarms.

The Retrovue set-top box channel-change function uses this interface. Upon receipt of the channel-change control from the set-top, the Controller issues to the Storage unit a command to map a new program stream to the specific set-top, identified as a stream-destination associated with a specific QAM output transport stream.

The MiniServer function uses this interface. There are two modes. In the settop-based application mode the Real Time Control Protocol is used to communicate between the MiniServer and the Retrovue application in the settop box. In the applications thin-client mode On Screen Display (OSD) is generated by applications within the MiniServer and sent to the MiniBox via the Ethernet interface to the Storage Unit or gigaQAM processor Unit, depending on configuration options.

Conditional Access

Conditional Access (CA) is compatible with DVB standards for carriage of Entitlement Management Messages (EMM) and Entitlement Control Messages (ECM). Present invention is compatible with the DVB Simulcrypt interface and can support $3^{rd}$ party conditional access systems if selected by cable operators.

The following describes a novel conditional access scheme which uses standard interfaces and protocol elements, but which leverages the two-way communications environment for strong authentication and authorization functions.

Conditional Access enables the operator to authorize subscriber access to digital program streams. In recent times the requirement has expanded to Digital Rights Management and copy protection. The present invention offers a cryptographically strong CA solution augmented with physical mechanisms to enhance security.

A fundamental requirement for strong security is a two-way communications path. One-way systems open security holes that are difficult and costly to detect and repair.

Conditional access is compatible with DVB standards. Standard MPEG protocol elements—Entitlement management Messages (EMM) and Entitlement Control Messages (ECM)—carry entitlement and control messages to manage the encryption of program streams. For systems with concurrent multi-vendor conditional access systems DVB-standard Simulcrypt EMM/ECM protocol extensions and headend interfaces are used. Multiple methods are allowed for encrypting the MPEG digital program streams—DVB scrambling standard, DES standard, and the Motorola-proprietary Digicipher-II DES.

Figure 29:
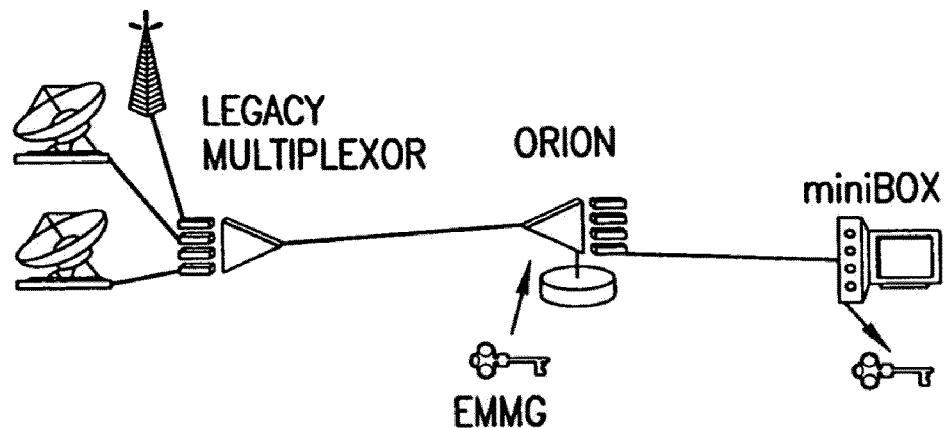
FIG. 29 illustrates conditional access to the head end.
Figure 30:
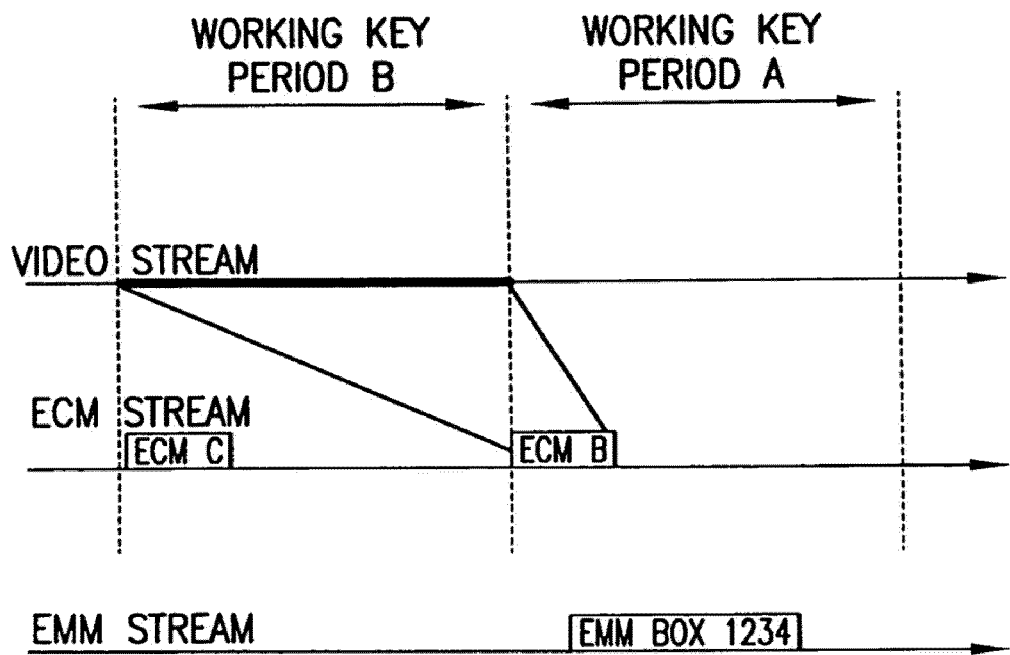
FIG. 30 illustrates controlled access streams.

The conditional access system of FIG. 29 uses a typical three-layer system for protection of the content. Three streams of information, the content stream, entitlement control stream (ECM), and entitlement management (EMM) are depicted in FIG. 30.

The content stream is divided into working periods each of which is scrambled using a different working key. The working key for the next period is delivered ahead of its period and is synchronized using the scrambling control bits in the MPEG header that indicate either an odd or even period key is used.

The ECM stream contained working keys for the content stream. Each ECM packet is encrypted using a service key. Only authorized boxes have the service key. The ECM packet also contains among other information the time period during which the service key is valid and is authenticated so that ECMs can only be provided by a valid headend system. ECM packets are provided in-band along with the content for which they provide keys.

The EMM stream contains service keys that enable the decryption of the ECM stream. Each EMM is encrypted using a key that is unique to the set top box to which it is sent. This enables the individual authorization of boxes. The EMM stream can be delivered in-band or out-of-band to the set top. Since service keys periodically expire EMMs containing new service keys are sent at a low data rate to individual set top boxes. Like ECMs, EMMs are authenticated using a digital signature to ensure they originate at a valid headend.

Figure 31:
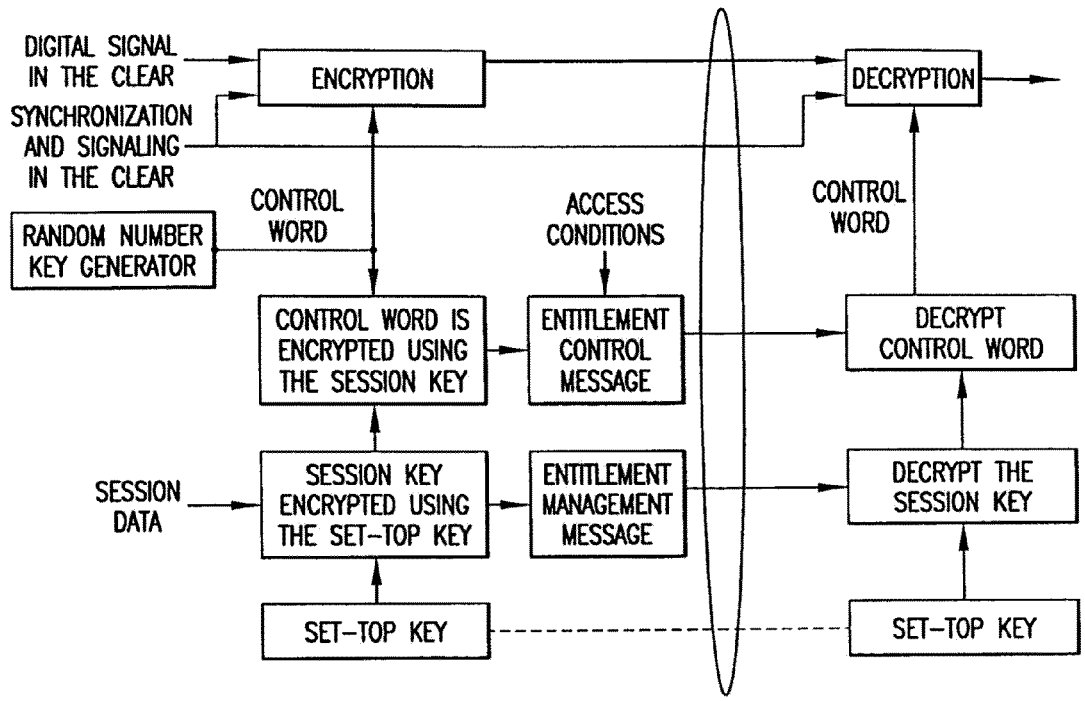
FIG. 31 shows three-level processing of service keys and control keys.
Figure 32:
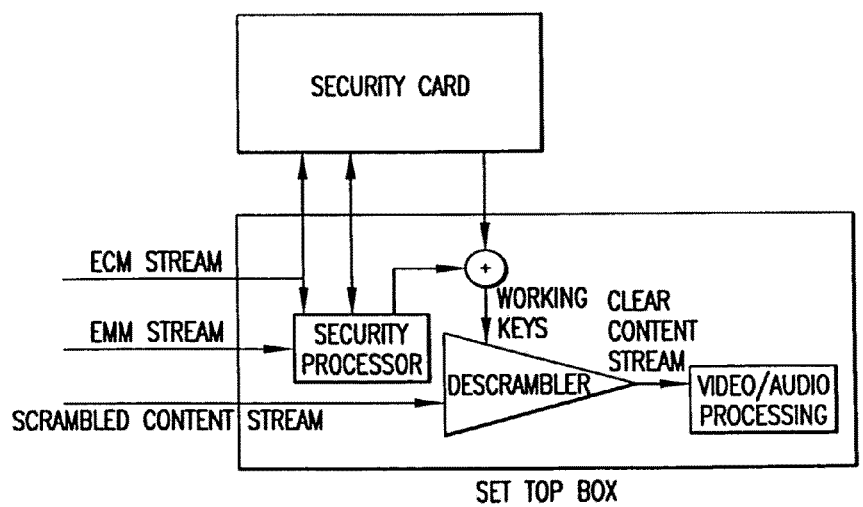
FIG. 32 shows a security card.

FIG. 31 outlines the three-level processing of service keys (EMM) and control keys (ECM). The security card in the set top box provides a means to upgrade system security should the current key distribution method be compromised. In addition it can provide other features like pre-authorized viewing and entitlement portability. FIG. 32 outlines the role of the security card. Notice that the security card is not required for initial deployment as the security processor can perform ECM to Working Key transformations. However, when mandated, the security card can augment this functionality to allow a security upgrade.

Communications between the security card and the set top box are encrypted and authenticated to prevent piracy.

The MiniBox implements the logic necessary for decoding keys for access rights carried in Entitlement Management Messages (EMM) and decoding keys for individual digital channels carried in Entitlement Control Messages (ECM). The MiniBox also contains three descrambling algorithms—DVB scrambling standard, DES encryption standard, and DigiCipher II proprietary encryption. The choice of decryption algorithm is a configuration option. In addition transactions with the secure processor and smart card interface are encrypted using a public key algorithm.

The MiniBox contains an onboard security processor that is protected from physical access by subscribers and clone manufacturers by an electronically and physically secure manufacturing technique. The interface between the security processor and the Broadcom 71xx chip is not protected with a public key mechanism. The security processor contains private keys that correspond to the manufactured public keys for the MiniBox. These public keys are not accessible by 71xx software. The interface between the security processor and the 71 xx chip consists of a shared buffer in which EMM and ECM message elements are placed for decryption. The security processor returns the decrypted control words that are subsequently programmed by software into registers for MPEG decoding.

An option exists for installation of a smart card—it is expected that this option will only be used if the operator chooses to disable the public key that is used for operation without a smart card, the factory default. The smart card is manufactured to be specific to the serial number of the unit and contains a random number that is combined with one of the unique private keys manufactured within the security processor to generate a new working public and private key.

In the headend an important element of the Conditional Access system is the Entitlement Management Message Generator (EMMG). The EMMG is located at the point the digital channel is encrypted or scrambled. Simulcrypt defines the standard interface in the headend and the method for carrying both EMM/ECM key streams embedded within the MPEG transport stream.

To facilitate easy integration with simulcrypt Conditional Access (CA) systems that emphasize encryption based on content rather than delivery address, Conditional Access in the Input Concentrator can scramble input channels before storage. This reduces the individual number of EMM streams that are created to authorize users. Since encryption prior to storage is possible it is also likely that certain pre-encrypted content can be stored and replayed without any scrambling in the headend or server.

Figure 33:
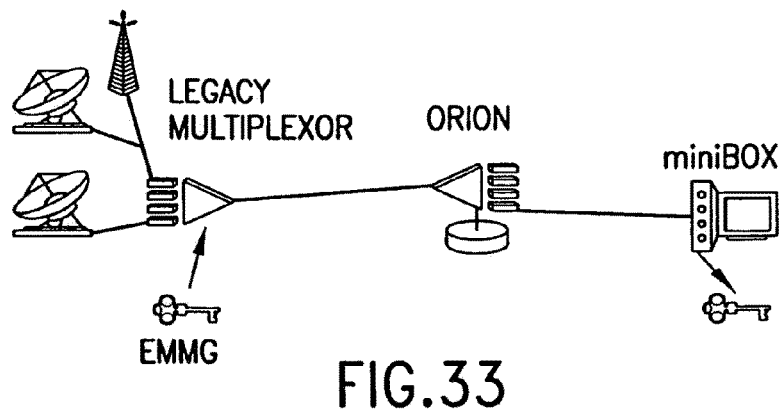
FIG. 33 depicts encrypted conditional access.

In certain cases it may be desired to support DigiCipher-II. In this case, as shown in FIG. 33, the EMMG is collocated with proprietary DigiCipher-II equipment further upstream as show in FIG. 9. It is preferable however to utilize conditional access so that each subscriber can be given his own unique EMM/ECM keys, strongest security.

The Conditional access solution enables the following services: (1) Broadcast TV, IPPV, Order-Ahead PPV, NVOD and Data Broadcasting; (2) Pre-encrypted VOD; (3) Variable pricing of PPV and VOD prior to show-time; (4) Real-time session-based encryption for VOD; (5) SVOD; (6) IPPV use of store-and-forward credit; (7) Subscription upgrade from EPG; (8) Rapid entitlement of any service to subscriber; (9) Geographic, spot, and personal viewing blackouts of any channel or event.

A fully secure system requires a method to prevent cloning set-top units. A major advantage of the present two-way system design is that this possibility can be completely eliminated, while with one-way systems, cloning remains a security weak spot unless great care is taken. To prevent cloning and other reasons that are described elsewhere, the system uses a Trusted Agent approach.

This arrangement is familiar to those using the Internet. When engaging in purchasing something over the Internet, you are generally asked to transmit your credit card number for payment. When this occurs during your transaction your computer will, if possible, be shifted to operate in what is called the "secure mode".

The secure mode in the Internet is based uses sites with called Trusted Agents using certified software, together with Certificates that vouch that the site is in fact the one that it claims to be. The Certificates pass authority around based on each agent certifying another. All communications that transpire in the secure mode are encrypted using a public key authentication.

The individual Servers will be connected to one or more Trusted Agent sites via the Internet to store backup information on every MiniBox in the system. This may be done either at a central site with backup facilities elsewhere, or as a distributed function among the Servers themselves.

(1) The serial number and public key for the set-top's physical unit; (2) The serial number and public key presently authorized for the set-top's Smart Card; (3) The presently connected Server address; (4) Billing information, including (A) Payment status, (B) Program viewing authorizations, (C) Customer address and other billing information, and (D) Customer number; (5) An optional Internet address.

These communications will be minimal, low-data rate, and usually run as background programs. The sorts of communications would include checking for duplicate box or Smart Card numbers in different systems, and customers moving from one site to another. This allow easy movement of customers from system to system and it serves as a deterrent to anyone who might otherwise be tempted to counterfeit a set-top or Smart Card and try to use the devices in another cable system. As these units can be sold in stores there is the possibility of theft. But, anyone using a stolen unit would be spotted very quickly.

After a customer purchases a MiniBox from their competitive electronic store, they call a call center and provide the operator with their credit card number, for service, and a 10 digit alphanumeric serial number of their new MiniBox and a 12 digit alphanumeric serial number printed on their Smart Card.

The database is quickly checked. The manufacturer of the MiniBox would have entered this data via a CDROM or over the Internet to a Trusted Agent. The data transmitted by the manufacturer would include the serial number and the associated code for the box and the card.

When the MiniBox is first set up a message in the clear addressed to the MiniServer sends only the MiniServer serial number. The Trusted Agent checks this, and a reply message sent in encrypted form in the public key of the MiniBox.

The base system will evolve. The following outlines several possible extensions to the base system.

Further Extensions Of The Invention

The following interface extensions are possible: (1) GigE interface becomes n*GigE and 10 GigE; (2) GigE interface becomes 802.17 RPR and Sonet; (3) 10 GigE interface to gigaQAM becomes multiple ASI input interfaces; (4) QAM/ RF output interface in gigaQAM becomes multiple ASI output interfaces (gigaMUX); (5) Multiple Ethernet-based MPEG framing formats—internal tagged storage-to-processor, IETF standards for support of other devices.

In the MiniBox family DOCSIS is supported in two ways: (1) A MiniBox with a DOCSIS 2.0 return channel; (2) MiniBox with an Ethernet return channel; (3) The Ethernet return channel connects to a DOCSIS cable modem over an in-home Ethernet, or equivalent, network; (4) A variant of the Ethernet-MiniBox is for the in-home network to be CableHome compliant The MicroBox is a smaller and less-expensive set top box that leverages the MiniServer. It contains virtually a zero-footprint RTOS and application environment. The MicroBox is designed for future migration into a television or other consumer video enabled device.

Additional products derivable from the baseline include the following: (1) 10 Gbit/12×1 Gbit Managed Ethernet Hub; (2) Satellite-to-QAM down-converter (modulator with a satellite receiver front-end); (3) Standalone storage streaming server for other vendor downstream ASI/Ethernet-to-QAM modulator devices.

Standalone storage streaming server for other markets such as fiber and DSL.

Several elements of the Design involve aggregation of inputs together or distribution of a single data stream to several processing elements. Since data rates are in the 1 to 10 Gigabit range a similar Gigabit switching element is utilized in the INPUT, STORAGE and gigaQAM units.

Figure 34:
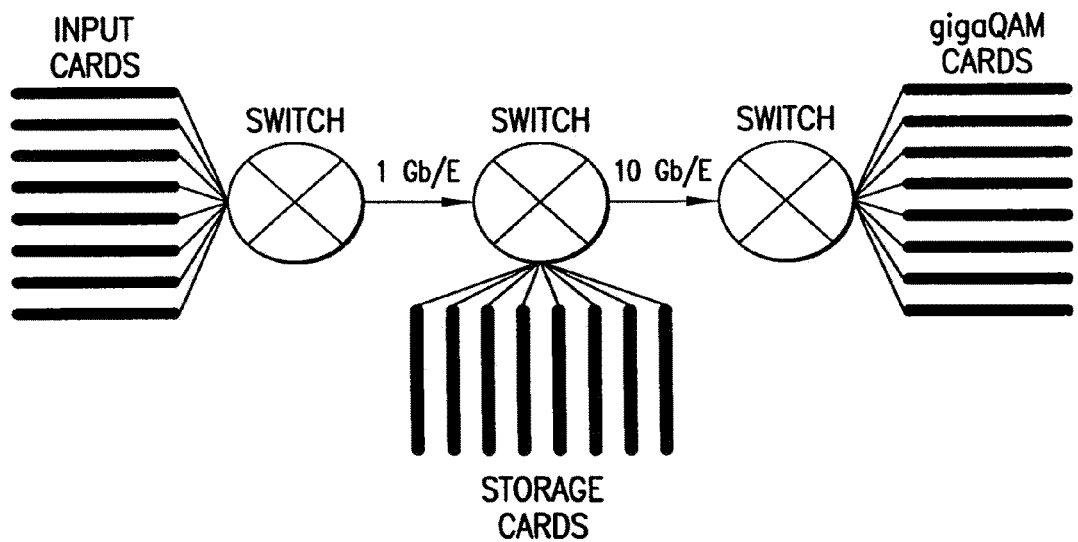
FIG. 34 shows aggregation and distribution over QUAM channels.
Figure 35:
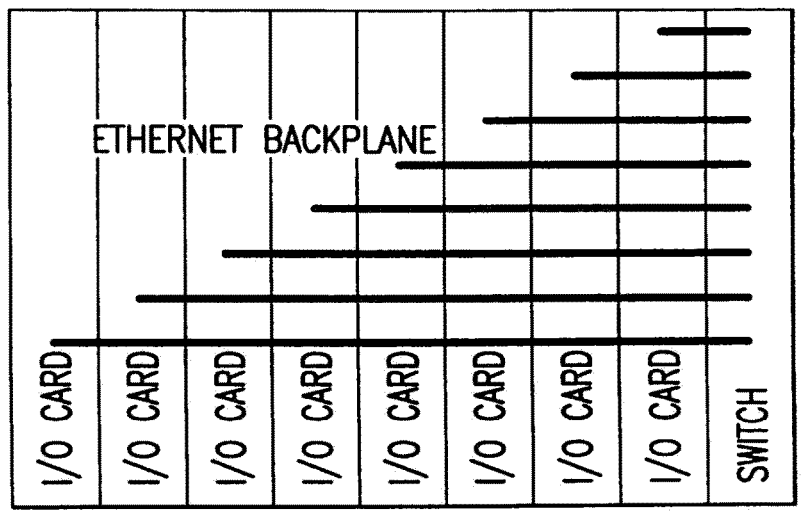
FIG. 35 shows a star Ethernet backplane.

The core-switching component shared by the devices is depicted in FIG. 34 This element is based on a 12×1 gigabit+ 1×10 gigabit switching device that operates at wire speed. The switching element is capable of routing Ethernet packets according to a mapping table.

The compact PCI (cPCI) backplane and chassis components allow a unit to be constructed with readily available parts that contains 10 slots for processing cards. Eight of the slots are connected to a switching slot via gigabit Ethernet carried over the backplane. FIG. 11 depicts the configuration of the backplane. The switching element is the card at the center of this star configuration.

For a system with a redundant switching element this arrangement can be extended with a dual star backplane with each I/O card attached to a pair of switching element cards.

Algorithms for Packet Scheduling and PCR Correction

Two of the key operations that the multiplexer must perform to produce a valid MPEG-2 Multi-Program Transport Stream (MPTS) from MPEG-2 Single-Program Transport Streams (SPTS) are Packet Scheduling and PCR Correction. Packet Scheduling involves the timing the placement of output packets in the transport multiplex to meet the rate requirements for stream. PCR correction involves generation of timestamps in the output stream.

The PCR is a timing field placed at intervals of no greater than 100 mS apart in MPEG-2 transport packets. This field is a 42-bit sample of the 27 MHz clock used when encoding the program. A decoder used this field to construct a clock signal that has the same frequency as the original clock used during encoding. The decoder uses this for the following purposes: (1) Synchronization of the rate of consumption of data with the production rate of data; (2) A reference for the synchronization of elementary streams; and (3) Other system level purposes, notably the generation of a clock controlling chroma sub-carrier.

Figure 36:
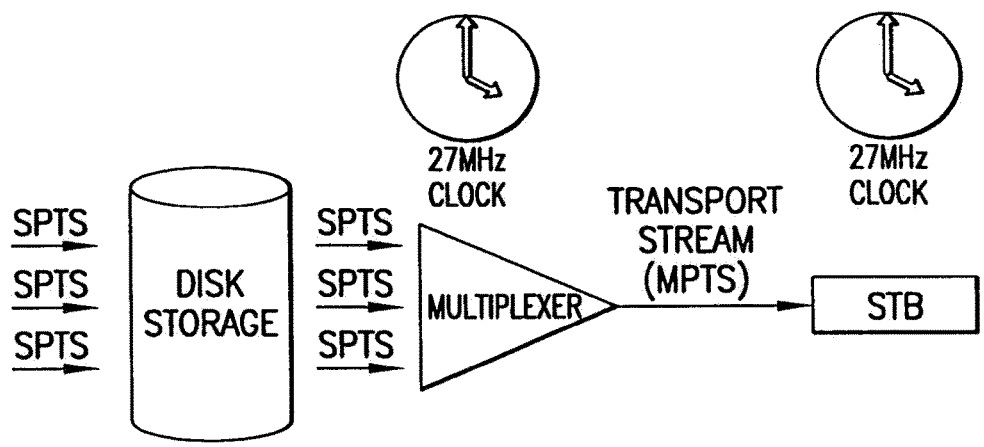
FIG. 36 shows clock synchronization between multiplexer and set-top box.
Figure 37:
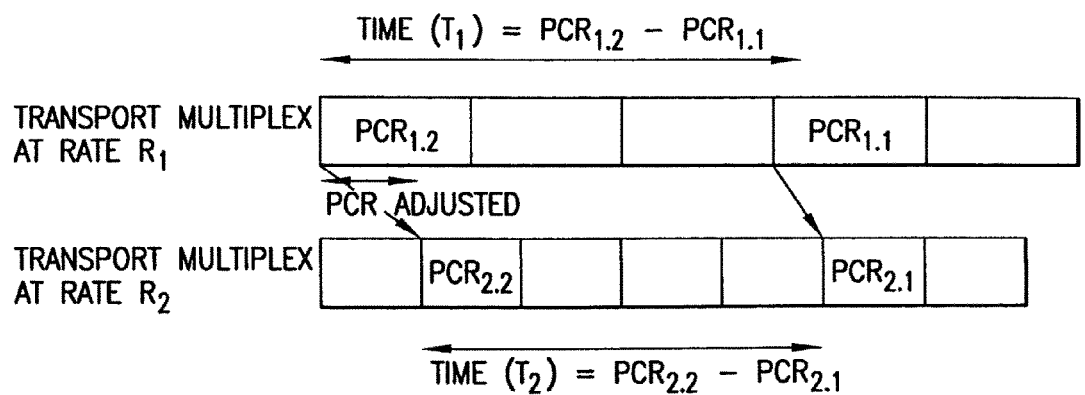
FIG. 37 illustrates PCR correction.

The problem facing the multiplexer, as shown in FIG. 36, is to correct the PCR transmitted to account for differences in data rate of the output transport stream versus the input transport stream. In FIG. 37 an input Transport Stream is depicted running at a clock rate that is slower that the clock rate of the output Transport Stream. For example an input Transport stream from a satellite might be received at 27 Mb/S and be remultiplexed by the multiplexer for use within a cable system at 28 Mb/S.

The value of PCR2, 2 must therefore be adjusted so that the time between PCR timestamps is kept the same (i.e. $T_1 = T_2$.)

Notice that two elements of the correction are required, a shift of the time value representing the fact that the output packet is not output at precisely the same time as the input packet arrives due to a phase difference between incoming and outgoing packets and also perturbation of the packets position in the stream due to other packets multiplexed in the output stream. In addition the time value of the PCR is adjusted because the length of time to transmit a packet at rate R2 is less than the time to transmit a packet at rate R1.

A PCR discontinuity is a jump in the PCR timestamp value. It is signaled by a bit in the MPEG header. Since the delta value applied to PCRs should remain the same the Multiplexer should continue to apply the correction required for a rate change between the original input multiplex and the output multiplex.

Between two packets bearing a PCR in a program stream MPEG-2 defines the data rate must be piecewise constant. Thus the number of bits and the PCR timestamps in a stream can be used to determine the expected delivery rate of a segment of a stream between two PCR timestamped packets. Within a time interval defined by the smallest PCR to PCR difference we must schedule output packets at the appropriate rate, preferably uniformly distributing packets over this interval.

Figure 38:
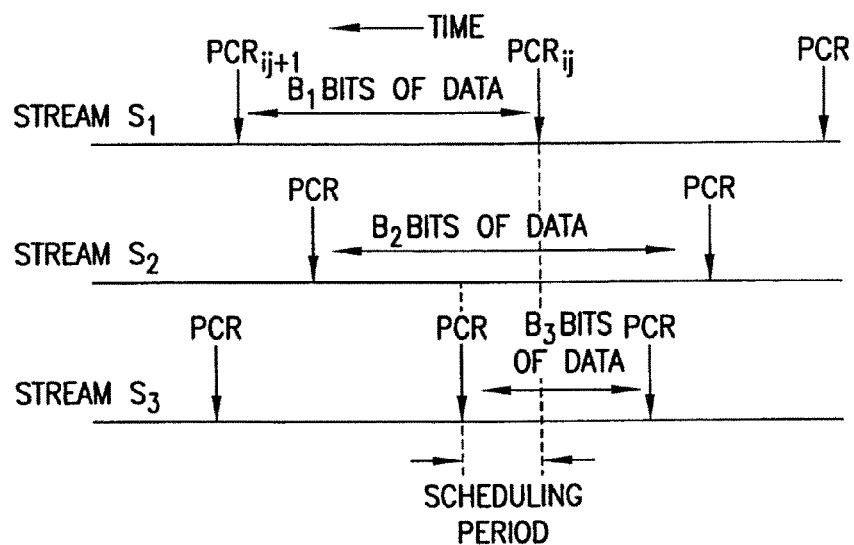
FIG. 38 illustrates scheduling period.

Ideally the multiplexed multi-program transport stream created from several input single program transport multiplexes should have packets uniformly distributed within a time period and with null packets created at appropriate intervals to bring up the transport stream data rate to the required level. Within an arbitrary time interval the combined data rates will not exactly match the exact rate required because data is only available in 188 byte packets. The diagram in FIG. 38 shows time represented on the X-axis, but with varying amounts of data represented between PCR timestamps of a stream. This shows the scheduling period between two PCR timestamps. The period is between the closest timestamps across all the streams that make up the multiplex. For each stream the bit rate Ri is constant between adjacent PCR timestamps. Therefore for Si the rate is:

$$R_i = \frac{D_i}{PCR_{i,j+1} - PCR_{i,j}}$$

Where $B_i$ represents the number of bits between PCR timestamped packets in stream i and $PCR_{i,j}$ and $PCR_{ij+j}$ represent the clock sample in adjacent PCR timestamped packets. In practical systems the rate information will change in a couple of ways:

| Constant Bit Rate (CBR) | $R_i$ varies little from an average (±5%). Average bit rates around 4 Mb/S. |
|---|---|
| Variable Bit Rate (VBR) | $R_i$ varies depending on scene complexity (±200%) but still has an average value. Average bit rates around 3.25 Mb/S. |

Figure 39:
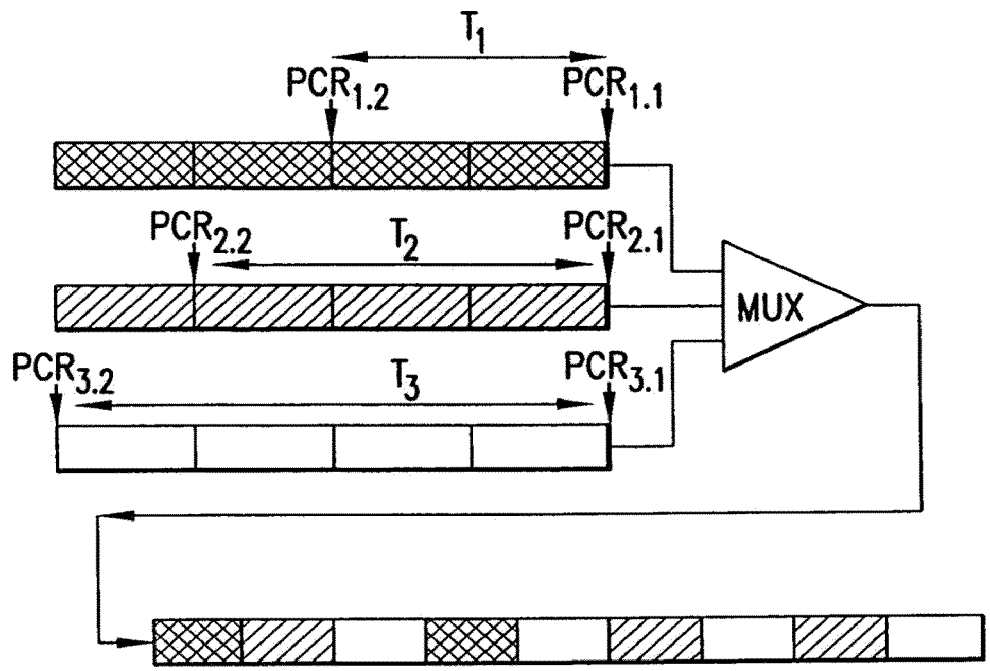
FIG. 39 illustrates output multiplex scheduling.

FIG. 39 depicts several single program transport streams in FIFOs being multiplexed into an output transport multiplex. Note that the FIFO must be long enough to contain two PCR timestamps for a stream. MPEG-2 rules state that the maximum distance between PCR timestamps shall be 100 mS.
$PCR_{i,j}$ PCR time for timestamp j within stream i
$F_i$ Bits present in FIFO for stream i
$T_i$ Time between PCR timestamps ($PCR_{i,j+1}$-$PCR_{i,j}$)
$D_i$ Data bits between PCR timestamps
$R_i$ Rate in packets per second of stream i ($D_i/T_i$)

Assuming that the peak data rate of each stream never exceeds some value P, (for example 4 Mb/S) then the peak output data rate is the number of streams (N) multiplied by the P (E.g. 10 streams at 4 Mb/S=40 Mb/S.) However, the actual data rate at any time might be lower than the peak rate and therefore the sum of the data streams would be slightly lower than the peak rate (N*P). The output Transport Multiplex must have a fixed data rate (typically 38.8 Mb/S for 256 QAM channels). Null packets must therefore be generated with a rate of:

$$R_{null} = \text{OutputTransportRate} - \Sigma R_i$$

Where $R_i$ is the rate in effect for each stream during the scheduling period. Note that this can potentially change at the end of every scheduling period as illustrated in FIG. 38. $R_{null}$ can be thought of as a virtual stream of null packets to be multiplexed uniformly with packets from the other streams.

The FIFO Fullness algorithm simulates real-time data arrival rates for each stream by computing a value P for each input FIFO that represents the number of bits waiting to be output from the FIFO. When the number of bits exceeds a whole transport packet then that input FIFO is selected for output. During the time period $T_{output\_pkt}$ that it takes to output a transport packet at the output transport rate a certain number of bits will arrive at the input FIFO according to the rate for that stream. If no FIFO contains enough data to output a whole transport packet then a Null transport packet is generated. Note that by creating Null packets when required that $R_{null}$ does not need to be calculated explicitly.

For the next time period in which output is scheduled:

Compute input bits per stream for $T_{output\_pkt}=B_i$
(Bits_per_packet*$R_i$/Transport_Rate)

Load a vector F with B ($P_i=B_i$)
Set T a time value representing the PCR value at the start of the period.
Select the stream i with the largest value of P.
If P>=1504 bits (188 byte transport packet) then output the packet from stream i. Decrement the value of F for stream i. If F<1504 then output a null packet.
For every element of the vector F, increment the value of F with the number of bits that would enter the FIFO during the output time period Bi
Increment T by the number of 27 MHz clock ticks represented by the time taken to output a single packet at the Output Transport Rate.
Return to Step 4 until T is >=the PCR value at the end of the period.
A pseudo-code version of this algorithm is:

```
int B[NSTREAMS];        // input FIFO bytes per output time
period
for (each stream i){
    // compute bits entering FIFO during 1 packet of output
    B[i] = BITSPERPACKET * R[i] / TRANSPORTRATE;
}
```

```
int F[NSTREAMS+1];      // Predicted bits in input FIFO for stream
if ( INITIALIZE ) {
    for ( i=0; i<NSTREAMS; i++) {
        F[i] = rate[i];
    }
}
else {
    // retain F from previous period
}
int currentPCR = initialPCR;         // PCR time for this packet
int selectedStream=0, selectedP=0; // stream selected for
output
while ( currentPCR < finalPCR) {
    // Find fullest FIFO
    selectedF = F[0];
    selectedStream = 0;
    for (i=1; i<NSTREAMS; i++) {
        if ( F[i] > selectedF ) {
            selectedStream = i;
            selectedP = F[i];
        }
    }
    if ( selectedF < BITSPERPACKET) {
        // No FIFO has enough bits, output a NULL packets;
        OutputNull( );
    }
    else {
        // Output from fullest FIFO
        OutputFIFO(selectedF);
        // subtract 1 packets worth of bits from FIFO
        F[selectedStream] -= BITSPERPACKET;
    }
    // Increment predicted bits for next round
    for (i=0; i<NSTREAMS; i++) {
        F[i] += B[i];
    }
    currentPCR += PCRTICKSPERPACKET;
}
```

Note that the computations are performed on perfect values of PCR clock and Output QAM rate and final adjustment of the PCR following scheduling is required. The algorithm outlined above will also require adjustment for integer round off error when computing the output rates Bi when the ratio of the input rate to output rate is not a whole number. Further null packet generation is also possibly required to match real QAM output rate to the value used in scheduling.

The real input FIFO supplying data for each single program transport stream should be kept full from data retrieved from disk. A per-stream flow control mechanism is required to assure that enough data is available when needed, but too much data is never delivered. Mechanisms to do this include: Flow control feedback to the disk controller/subsystem. Buffer fullness measurements based upon an observed average data stream rate.

MPEG-2 rules indicate that when a PCR discontinuity is indicated the data rate between the PCR with the discontinuity indicator set and the previous PCR remains the same as the rate for the previous segment. To simplify explanation of the scheduling algorithm this feature has not been included in the pseudo-code described above.

The theoretical System Time Clock used at the MPEG-2 encoder and at the decoder is 27 MHz. Given perfect clocks the decoder should consume data at exactly the same rate that the encoder creates data. However, instead of perfect, independent clocks it is more practical to keep clocks between the producer and consumer synchronized at an arbitrary rate near to the required 27 MHz rate using the PCR mechanism.

In theory a similar problem between the original encoder and the multiplexer exists as exists between the multiplexer and the set top box. Namely that the multiplexer will send out data to the set top box faster than data is arriving. In practice the allowable clock difference is 1620 Hz (27,000,000±810) and at this rate difference it would take many days to consume the buffer capacity built into the Storage/Multiplexer system.

When computations on scheduling packets are done they using theoretical input rates of 27 MHz and theoretical output rates of 38.8 MHz without regard to the actual input rate or output rate. Since the output rate may vary slightly from this rate it is left to the final stage of processing and PCR correction to occasionally insert a null packet to account for any long-term under-run from data supplied by the scheduler. It is assumed that a long-term over-run of data cannot occur, as the clock will run slightly faster than it's theoretical perfect rate.

Head-End Interconnection Protocols

Figure 40:
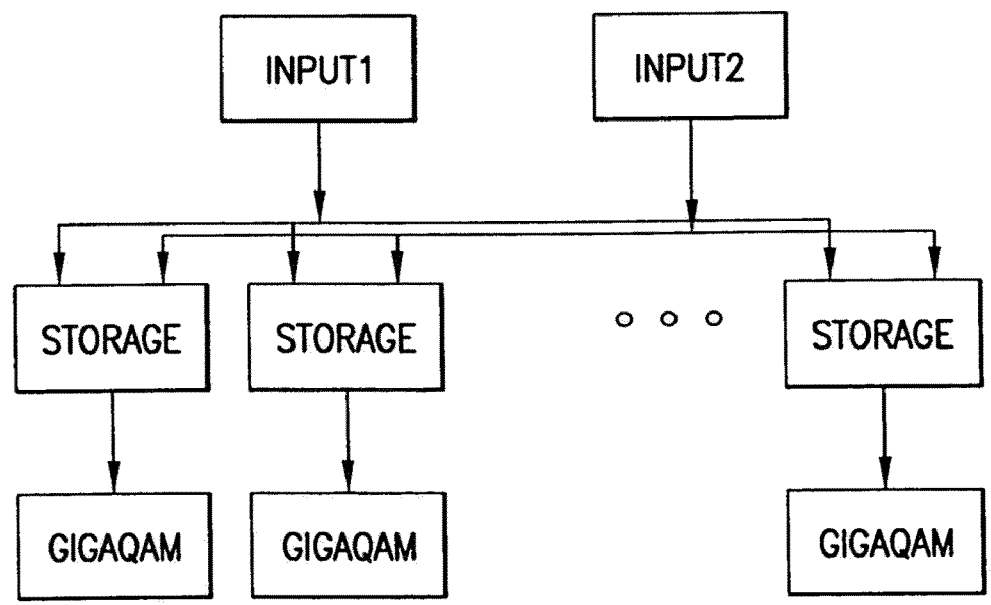
FIG. 40 illustrates system components using gigabit Ethernet.

The components depicted in FIG. 40 constitute a complete system for the network PVR system RetroVue. Components are interconnected via 1 and 10 gigabit Ethernet links. The INPUT unit captures MPEG-2 transports streams on ASI and DHEI interfaces and encapsulates them for transmission over 1 gigabit Ethernet to the STORAGE. Multiple INPUT units can transmit to multiple the STORAGE units. The STORAGE unit transmits data over 10 Gigabit Ethernet to the GIGAQAM unit for MPEG-2 remultiplexing, and transcoding into RF output.

The BCM-5632 and other switching chips provide a good technology for logical backplanes because of their greater than wire-speed switching speed and large-table address filtering features. Such chips enable creative utilization of layer two addressing to "route" and replicate packets, multicast, to multiple ports, cards and modules. Such backplanes are usually self contained within platforms, but can be logically extended across multiple platforms. In the multi-platform configuration, because of the novel and creative use of addresses, care must be taken to either isolate the inter-platform traffic from other "data" traffic, layer two and layer three, or the addressing has to be designed to be externally consistent with global addressing standards and usage. Note: "route" as used in this document is used to describe that packet processing function which inspects a layer two address of a packet received from an input port, and, based upon an address filter table, decides on which output port or ports the packet needs to be forwarded. Such chips enable routing of packets based upon IEEE 802 48 bit destination addressing, both unicast and multicast. Thus any algorithm which utilizes the filtering logic of such chips must translate information that affects routing into 48 bit IEEE 802 addresses.

In IEEE 802, layer 2, and Ethernet are used interchangeably through the document. Technically IEEE 802 is the correct descriptor for the addressing. Ethernet is the correct descriptor for the MAC layer functionality of the hub switching chip.

To setup and manage the address and filtering tables of the switching chip a controller application is required. The normal dynamic learning and dynamic aging functions of the switching chip will not be usable in these applications without dynamic configuration and intervention from the controller.

Filtering can be implemented for both layer two unicast addresses and layer two multicast addresses. The advantage of multicast addresses is that the hub switch chip can replicate the packet to multiple destinations.

In video, single program transport stream (SPTS) applications the normal use of the switching chip would be to route and replicate packets based upon unique per-stream IEEE 802 addressing. It is assumed that each packet contains MPEG frames from no more than one SPTS (thus no further demultiplexing and remultiplexing is required within the SPTS packet). In a backbone distribution scenario, if a single stream were to be replicated to multiple destinations, then multicast addressing would be used. For a single destination distribution unicast addressing can be used. It is also acceptable, though inefficient, to achieve multicasting by flooding, replicating, packets with different unicast addresses.

A SPTS has one or more PIDs that are logically associated together as a single program stream, e.g. audio+video. Section 18.3 below describes a novel use of addressing, as time-markers, to spread SPTS packet chains across multiple storage disks, even variable size. The address table within the switching chip has sufficient capacity to support the large number of addresses. This addressing mechanism must be contained within the logical disk storage platform.

In distributing SPTS packet streams to downstream EdgeQAM and EdgeMux devices, the preferred form of addressing is layer two unicast and multicast addressing. While it is possible to create structured addressing which maps to specific cards and QAM transport streams, such use is not recommended because it requires the upstream traffic generators, e.g. the node which de-spools video files and cached video from disk, to have configuration knowledge of the destination device, and also prevents the use of multicast replication, e.g. where one stream goes to multiple output QAM ports in order to feed multiple fiber nodes. If unique unstructured addressing is used, then the SPTS can be delivered to any type of device, and over any type of intermediate layer two switching network. Definition EdgeQAM: a device which accepts video input from one or more ethernet and/or ASI input ports, provides multiplexing functions, builds one or more transport streams, modulates each transport stream, and delivers the transport stream over one or more RF output interfaces.

Definition EdgeMux: a device which accepts video input from one or more ethernet and/or ASI input ports, provides multiplexing functions, builds one or more transport streams, and delivers the transport stream over one or more ASI or ethernet output interfaces.

IETF standards do exist for carriage of embedded MPEG SPTS transport streams within IP networks. They are being utilized initially between VOD vendors and EdgeQAM and EdgeMUX vendors. The two standardized forms are: (1) UDP/IP encapsulation, and (2) RTP/UDP/IP encapsulation. A third form seems worth standardizing: (3) Raw Ethernet encapsulation.

In the historic design of MPEG systems, the MPEG PID was considered necessary and sufficient for addressing. This was feasible because the implementation architectures were star-topology networks. A physical or logical (Sonet, 6 Mhz QAM/QPSK) channel was used to encapsulate all packets. Indeed, in a multiple program transport stream, within a specific channel wrapper, all PIDs are unique.

In converged IP and Ethernet systems the MPEG PID is no longer unique. Even worse, the PID, which is data not header from the perspective of the transport layer, cannot be used as input to the routing function that is extant in layer two and layer three switching and routing infrastructures.

Several addressing attributes can be considered in identifying and switching/routing single program streams: (1) IP Source address; (2) UDP source port; (3) Ethernet Source addressIP Destination address, unicast or multicast; (4) UDP Destination port; (5) Ethernet Destination address, unicast or multicast; (6) MPEG PID.

In a simple world, one standard would be defined. In the real world flexibility is required to accommodate a variety of formats.

One of the more common forms of generating unique SPTS addresses will be at the IP layer—the 4-tuple <IP Source Address, IP Destination Address, UDP source port, UDP destination port> will unambiguously identify a SPTS. In such addressing schemes the layer two addressing may not help at all, e.g. all packets from all SPTS streams may be addressed from one Ethernet Source Address and delivered to one Ethernet Destination Address. If such packets are to be processed by a switching hub backplane, they will need to be reencapsulated into ethernet packets with a destination address that is uniquely associated with the above 4-tuple. This requirement suggests a wire-speed input classification function that inspects the 4-tuple and outputs a unique ethernet address via a classification-mapping table. The filter function of the switching hub backplane can then be configured to filter and deliver all packets of a specific SPTS stream to a specific port or group of ports.

For IP layer addressing a common convergence standard is MPLS. An IP router is capable of classifying traffic based upon the above 4-tuple and delivering the packets to specific MPLS labeled tunnels between routers. However the MPLS encapsulation does not typically extend to end devices—so neither the source nor destination end device will necessarily see the MPLS tunneling layer. However, there are devices that do receive packets from MPLS tunnels, such as the Cisco video router.

It is possible for the layer two header of a SPTS stream to be defined in a way to assist the filtering and routing function. A source can transmit a SPTS stream with an IP multicast address. IP defines a mapping between the IP multicast address and a layer two multicast address, the bottom 23 bits of the 28 bit IP multicast address are mapped to a bit-by-bit-identical ethernet multicast address. Because of the partial mapping there can be 32 IP multicast addresses which map to a single ethernet multicast address. IP multicast addresses will be unique—i.e. each SPTS will be carried with a separate but unique IP multicast address. If the network and application administrator assures no overlap of IP addresses, i.e. does not vary the upper 32 bits, then each SPTS has a unique layer two multicast address. In this configuration the switching hub has sufficient information to enable it to route and replicate packets at wire speed. Note: because of the high-order 32 bit truncation problem for the IP to IEEE 802 address mapping, it is possible in converged-services networks that packets may be routed and received from multicast addresses that are not meant to be received. Such packets will occupy link bandwidth during transport, and switching bandwidth across the bus. The module that receives such packets will need to provide a final filtering function to reject those packets that should not be received, by inspecting the IP address at a minimum, and the 4-tuple at the maximum.

Other addressing variants are certainly possible. A system can be conceived which operates purely at layer two. A source can be conceived that originates SPTS streams with unique layer two multicast addresses, but only unique to the originator. In this configuration the destination will have to inspect the source address to disambiguate two separate SPTS streams received with the same destination address. Likely however such a system will have a dynamic address resolution protocol that assures uniqueness across multiple sources. Alternately the multicast address space can be administratively partitioned statically so that no address space overlap occurs between originators. In either case, address resolution protocol or static configuration of unique addresses, the layer two switching environment can uniquely route packets across backbones and internal hub switching fabrics to their intended destination. The three different units have both preferred protocols for communication with each other and compatibility protocols with the equivalent units from other manufacturers.

In all encapsulations similar techniques are used to pack MPEG-2 transport packets of length 188 bytes into standard Ethernet or 802.3 packets with a maximum payload of 1500 or 1492 bytes respectively. An MPEG Single Program Transport Stream (SPTS) contains a collection of PID addressed transport packets and up to seven 188 packets are encapsulated within the same Ethernet frame.

The following table outlines the requirements of the various devices components for processing different protocols.

| COMPONENT | INPUT PROTOCOL | OUTPUT PROTOCOL |
|---|---|---|
| INPUT | ASI, DHEI | TSE |
|  |  | DAE |
|  |  | SIE IP SPTS |
| STORAGE | TSE | DAE |
|  |  | SIE |
|  |  | IP SPTS |
| GIGAQAM | DAE | RF SPECTRUM |
|  | SIE |  |
|  | IP SPTS |  |

Figure 41:
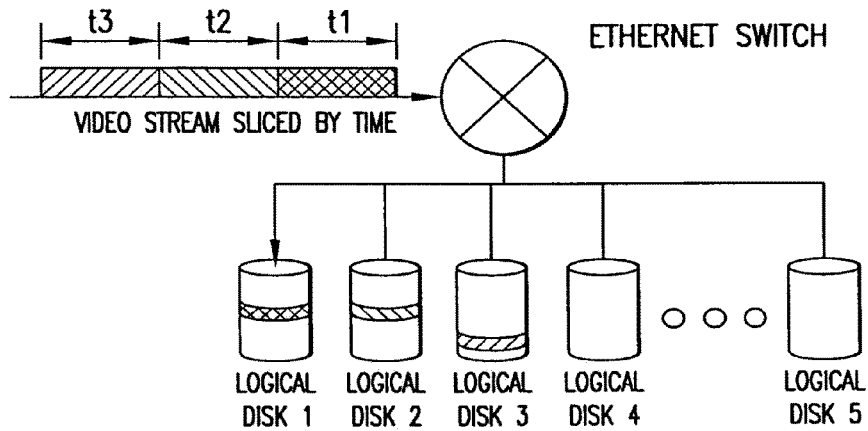
FIG. 41 illustrates time slicing input stream.

A single program transport stream, consisting of packets identified with several PIDs encapsulated with a destination Ethernet address that is composed of two elements: Stream Identifier is a system value used to uniquely identify an SPTS and therefore the disk based circular buffer that will store the stream. Time Slice Identifier, as shown in FIG. 41, is a value that identifies the point in time at which a given collection of packets arrived. Each time slice is stored on a different logical disk within the STORE.

Figure 42:
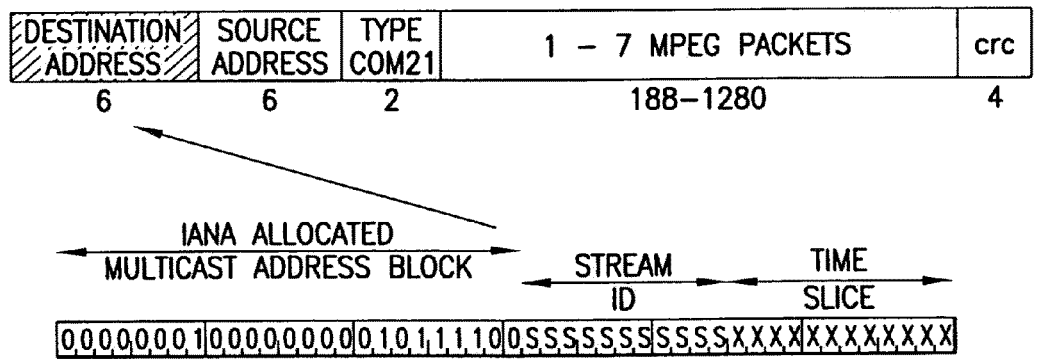
FIG. 42 illustrates destination Ethernet address composition.

The Ethernet frame is formulated with the following structure shown in FIG. 42. Notice for this internal Ethernet packet the type is can also be made unique to allow these frames to be identified as non-IP frames (type 0800.) The Ethernet source address can be used to identify the unique stream identifier, the ASI port of ingress or the daughterboard aggregating ASI inputs into the Ethernet stream.

Figure 43:
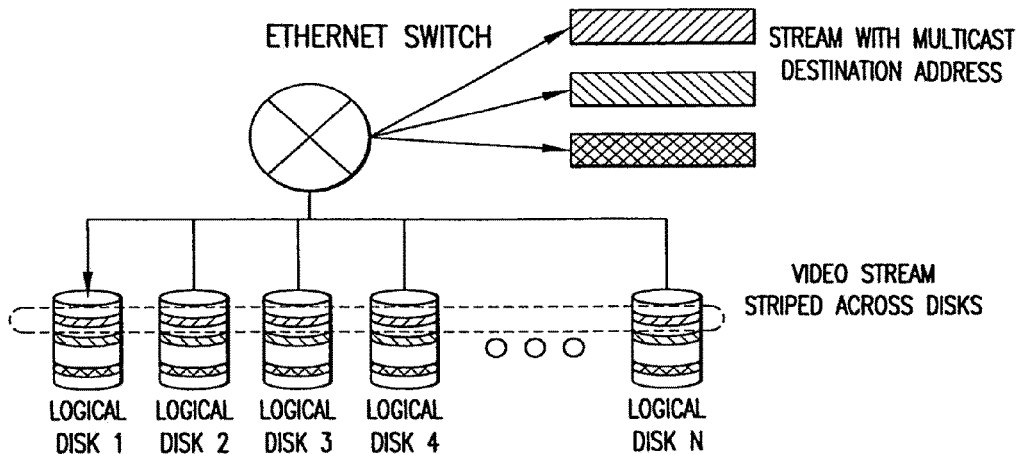
FIG. 43 is an example of storage unit to gigaQAM streams.
Figure 44:
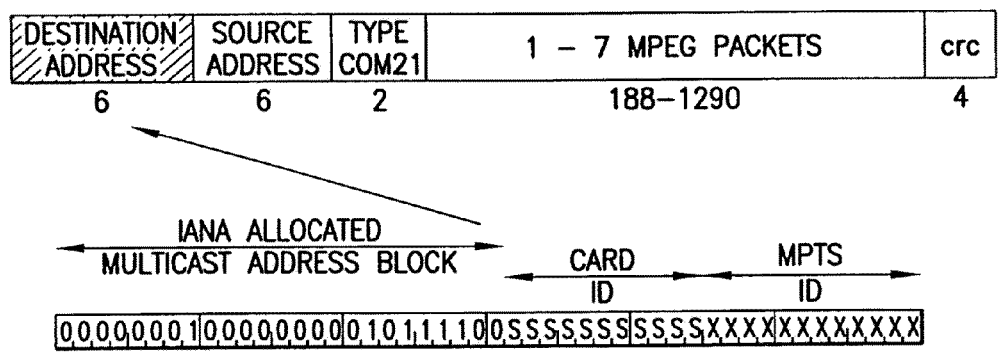
FIG. 44 shows multicast SPTS.

The Destination Addressed Ethernet SPTS protocol, as shown in FIG. 43, utilizes a conventional addressing scheme in which the destination Ethernet addresses identify a stream. Each SPTS is identified with a unique multicast destination address. Multicast Destination addresses are used to route an SPTS to more than one device. This protocol is used between the STORAGE device and the gigaQAM with multiple source disks each with a different Ethernet source address sending slices of a video stream to daughterboard of the gigaQAM device. The destination Ethernet address is encoded as shown in FIG. 44 to identify the daughterboard and the Multi-Program Transport Stream in which the video stream is to be multiplexed. Note that streams can be differentiated by the Ethernet type field. In the gigaQAM card the MPTS Id portion of the Ethernet address is used to demultiplex the Ethernet packet further. The Card Id portion of the address is used to route the packet through the switch to the appropriate gigaQAM card.

Figure 45:
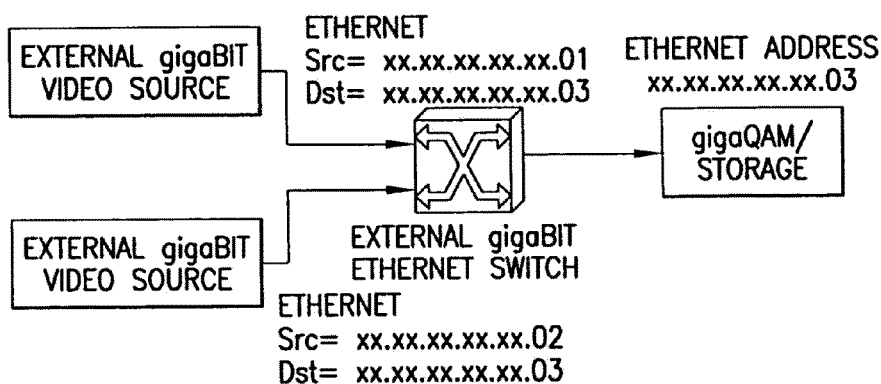
FIG. 45 shows an external SPTS through Ethernet.
Figure 46:
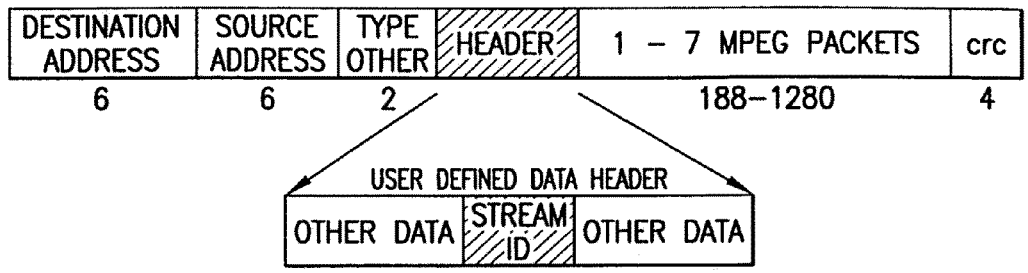
FIG. 46 is an example source based stream identification.

Ethernet packets, as shown in FIG. 45, from external sources may not comply with the destination addressing scheme, due to lack of knowledge of the internal structure of the system. In this case it is likely that a combination of the source address and an identifier contained within the Ethernet payload will uniquely identify the video SPTS. An example Ethernet frame structure for carriage of transport packets is shown in FIG. 46. However, this is only one of many possible structures and devices that receive data in this form must be parameterizable to extract the stream identifier. Note that packets using this method can be differentiated by the Ethernet type.

Figure 47:
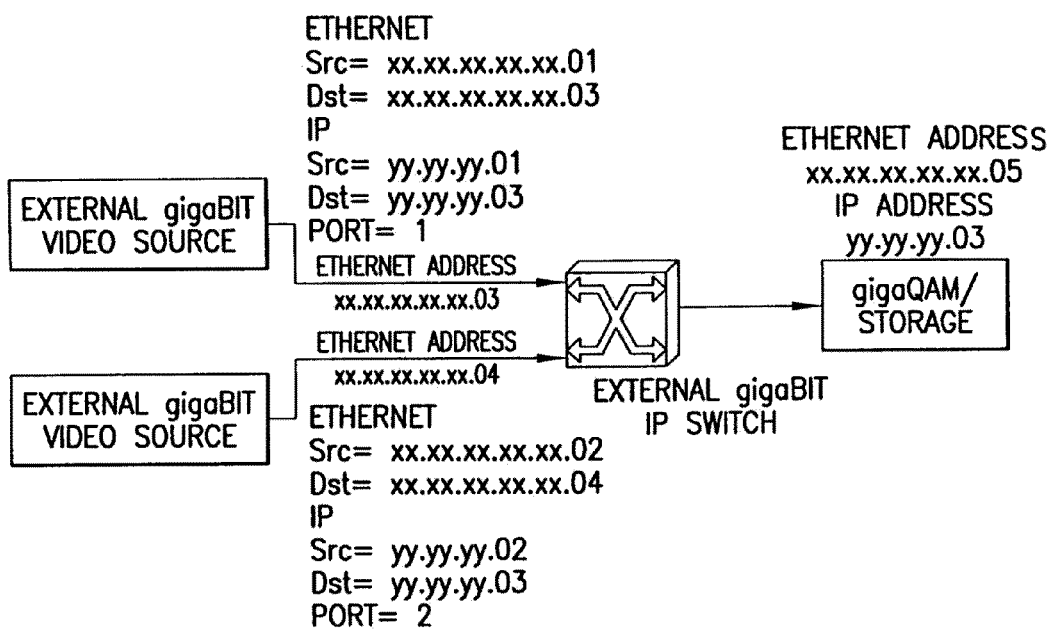
FIG. 47 illustrates IP encapsulated MPEG SPTS.
Figure 48:
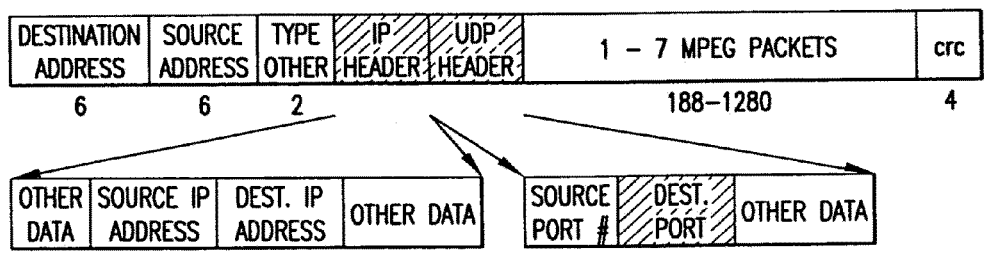
FIG. 48 shows stream identification within IP packets.

To facilitate carriage of MPEG SPTSs through general purpose networks it is likely that groups of MPEG transport packets will be encapsulated in IP/UDP packets, as shown in FIG. 47. None of the existing Requests for Comments (RFCs) RFC 2250, 2343 address carriage of transport packets only carriage of packetized elementary streams (PES), this omission makes sense when only IP to IP device communication is considered but is not useful for interworking with conventional synchronous cable and satellite networks. The protocol format required is likely to have the structure of FIG. 48, where stream identifier is mapped onto either UDP port number or a header within the application packet.

The input unit 400 is likely to be interfaced with external video servers and directly to edge QAM devices as it provided an economical ASI/DHEI to gigabit Ethernet transcoding device. It should therefore support all of the above protocols.

The STORAGE device is partially dependant on the ability of INPUT device to provide a time sliced stream it should therefore only implement the Time Slice Ethernet protocol for input purposes but should support all other protocols to external edge QAM devices, although the preferred output protocol is Destination Addressed Ethernet SPTS.

The gigaQAM device is likely to have to interface with a variety of video and data server equipment and must support a variety of protocols. With 10 Gb/S input very little processing is feasible before switching to internal multiplexing/QAM cards. The preferred input in the Destination Addressed Ethernet SPTS described above.

Figure 49:
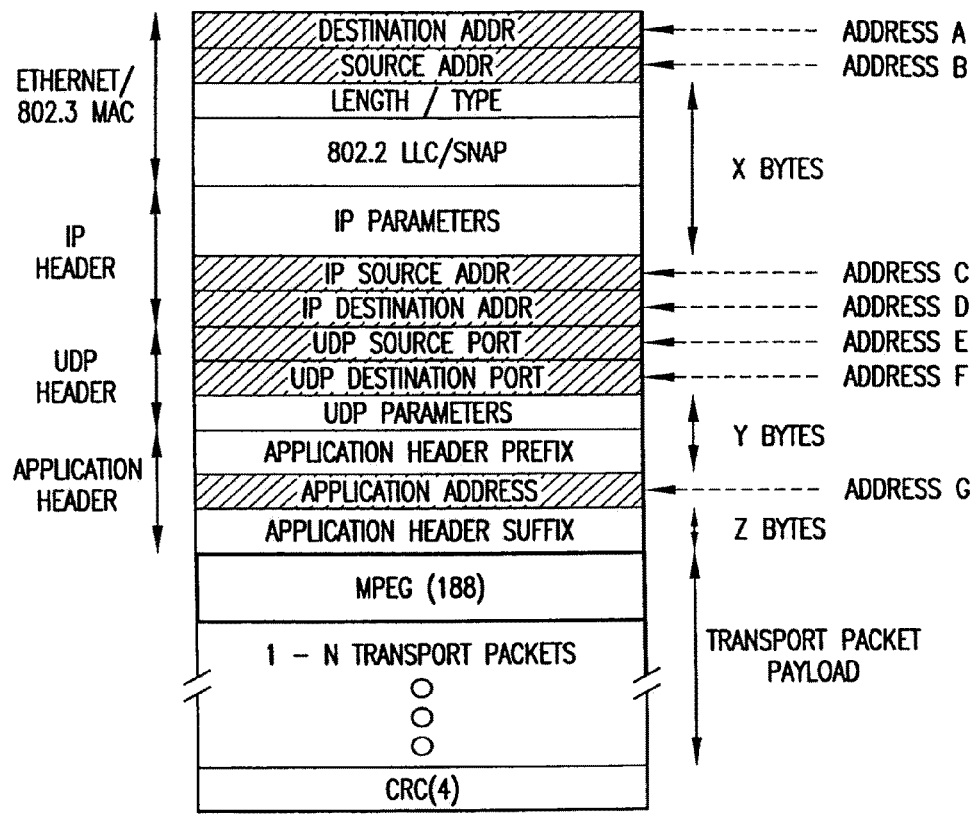
FIG. 49 illustrates addressing in various encapsulations.

All of the above protocol descriptions are an attempt to map a layer 4 stream address onto elements of the underlying layer 2 Ethernet and IP layer 3 addressing schemes. This is done to take advantage of switching silicon available for these protocols. The following parameters show how this can be done in a fairly generic way by FPGA and network processing elements. In FIG. 49 the items labeled as Address A—Address G represent positions where an stream id, card id and MPTS id could be positioned in an Ethernet packet. The values X bytes—Z bytes represent fixed gaps between the locations where addresses must be encoded. This assumes that 1-7 MPEG transport packets are encapsulated contiguously in the remainder of the transport packet. Some difficulties in characterizing a generic encapsulation method are: (1) IP 16-bit identification fields that must be incremented with each successive packet; (2) IP and UDP header checksums that must be computed when after the address is inserted; (3) Fixed values to place in the X, Y, and Z parts of the packet; and (4) Unknown parameters that must be computed in the application header.

VoD Using Storage Unit Interconnection

Due to the requirements that the Storage unit be capable of deriving 1280 streams from a single stored channel and to do so using inexpensive disk drives the Storage unit has available far more disk space than can be utilized in delivering the simple Retrovue service. The additional space cannot be utilized for streaming output services that must be guaranteed to be available but can be utilized for services such as VoD in which service can be denied if resources are not available.

Figure 50:
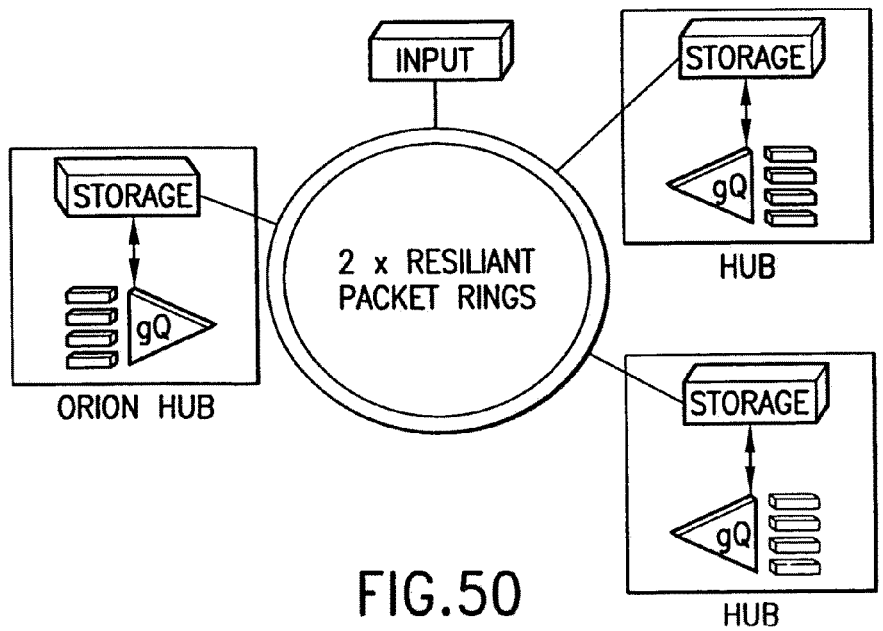
FIG. 50 shows storage units connected via RPR ring.

In order to make available the additional disk space the following interconnection between Storage units is allowed. FIG. 50 shows interconnection via IEEE 802.17 Resilient Packet Ring, but it is also possible to interconnect systems using a GIGE interface to an Ethernet switching infrastructure. Interconnection in this fashion will also require a reliable file transfer protocol, unicast and/or multicast, for transfer of video files between Storage units.

Server Unit

The server is a generic platform that can run the management application, Retrovue Application, OOB application, and/or MiniServer application. One or more servers may be configured in a given system depending upon traffic loading and capacity.

The Server is a 3 RU server based on an Intel Pentium hardware platform, with memory and fans. The optional OOB module is installed in one of the PCI interface connectors.

The Server has the following external interfaces: (1) 110/220 Power, on-board power supply; (2) LEDs for system status monitoring; (3) A 10/100 BT connector for access to: (a) management network, (b) server modules management control; (c) out-of-band network to the home, e.g. external CMTS; (d) pare RF connectors, when OOB module installed.

The server contains a Linux kernel, TCP/IP stacks, SNMP stack, embedded HTML server, primary management interface, OOB DAVIC MAC subset, when OOB hardware module is installed, and the application. The server module implements the following software functions: (1) Be the headend endpoint for point to point communications to all MiniBoxes, 1:N bi-directional; (2) via ethernet to external OOB communications infrastructure, or (3) via internal interface to internal OOB module; (4) Remote control protocol and associated application Channel change; (5) Pause, Rewind, Forward, Restart; (6) Control of all MPEG streaming functions; (7) PID assignments routing to specific QAM transport streams; (8) Generation/forwarding of OOB downstream elements; (9) Conditional Access (CA) messages including entitlements; (10) System Information (SI) messages; (11) Electronic Program Guide (EPG) messages; (12) Emergency alert System (EAS) messages; (13) Other generic messages; (14) File transfer interface with hierarchical VOD system elements for transferring VOD files into Server; also functions for deleting or modifying stored VOD files; (15) Management interface to redirect stream (pre-encrypted) to management station, for viewing of output quality; (16) Cable labs DSG protocol and associated MIB, possible adaptations for DVB; and (17) Interface with one or more external Simulcrypt CA systems.

The server has an option for installation of one or more OOB RF cards. These cards implement the PHY layer of the OOB protocol. The OOB MAC is implemented in software within the server. The OOB MAC and PHY implementation contains all registration, ranging, authentication, and networking functions needed for communicating with STBs.

The OOB implementation is based upon the following assumptions: (1) Is compatible with hardware capability of Broadcom 7100 hardware (DAVIC); (2) Low upstream bit rate (300-600 bps average) (3) Collisions and retransmissions handled with upper layer protocol mechanisms; (4) Only a single IP/MAC address on the network side; (5) No bridging or routing forwarding functions—all traffic is forwarded to the host; (6) Potential elimination of scheduled-TDMA traffic modes, all upstream traffic is contention based, and bit-rate is low; (7) No traffic filtering or prioritization functions; (8) Simplified DAVIC OOB protocol, for compatibility with Broadcom 7100.

It is also possible to install the OOB function without any other server functions. In this case the OOB implementation is expanded to include the following additional functions: (1) O(1000) MAC and IP address learning table; (2) Bridging function for learning, filtering, and forwarding traffic between OOB HFC RF and 100 BT port; and (3) No classification functions.

The server is a typical Pentium-4 845D chipset powered PC unit. It provides one 10/100BaseT Ethernet interface to control different modules through a 10/100BaseT hub. It also provides 6 PCI slots for possible up to 6 OOB PCI cards plug-in. The 6 OOB PCI cards support total 24 upstream burst receivers and 6 OOB down stream transmitters.

Figure 51:
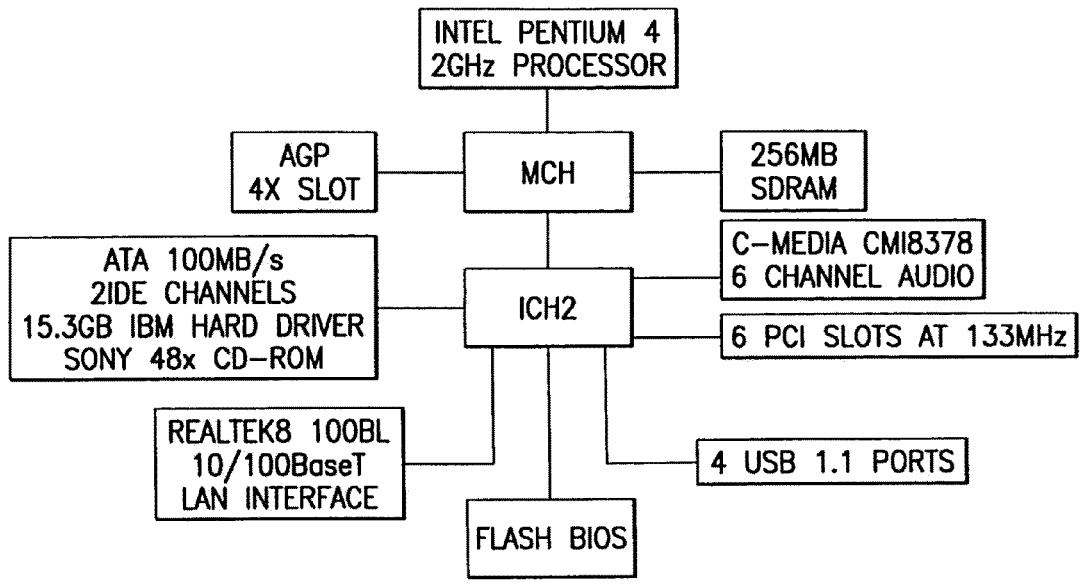
FIG. 51 is a block diagram of server mother board.

The server motherboard block diagram is shown in FIG. 51. The motherboard VC17, as shown in FIG. 51, made by FIC can directly used as our controller unit motherboard.

The controller unit will be 3 RU for supporting OOB PCI cards. The preferred mechanism for MiniBox communication is through a DOCSIS return path. However an economical return path can be implemented using a DAVIC style mechanism.

This section describes the design of an OOB system which utilizes DAVIC PHY layer and an Aloha style MAC layer. The implementation consists of the OOB Forward Data Channel (FDC) transmitter and OOB Reverse Data Channel (RDC) Receiver. The OOB Transmitter and Receiver card is installed in the Server Unit.

Head-End OOB Burst Receivers And Transmitter PCI

Figure 52:
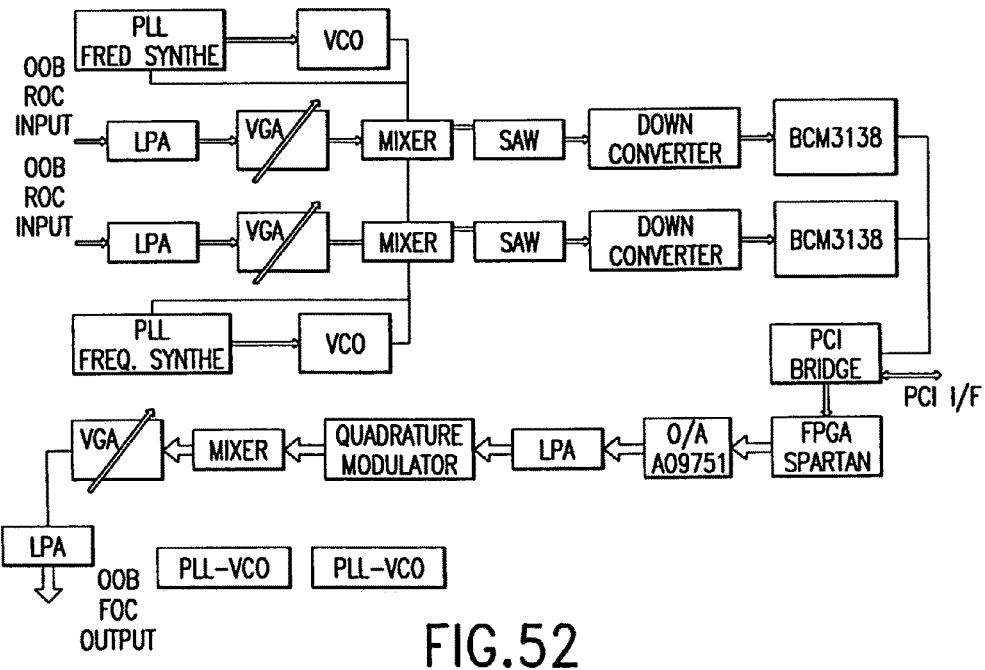
FIG. 52 shows a head-end OOB burst receivers and transmitter PCI card.

The head-end OOB PCI card is implemented for 4 head-end OOB burst receivers and one headend OOB transmitter. FIG. 52 shows the block diagram of the head end OOB PCI card.

One PCI Card with four head-end OOB Burst Receivers and one head-end OOB Transmitter is implemented. But MAC layer is not included. It is expected that the host CPU will do the MAC processing and interface to the OOB card via PCI interface.

If the DAVIC MAC dedicated hardware implementation is required, additional one microprocessor, one FPGA and some memory can be added or a MAC IC can be added. If necessary two such cards can be used for one complete system.

Heandend OOB Transmitter Requirement: Support DVS-167 (DAVIC): data rate 1.544 Mb/s (1 MHz band) or 3.088 Mb/s (2 MHz band), Differential QPSK, Frequency range 70 MHz~130 MHz., frequency step size 250 kHz. RS code (55, 53,T=1) over GF(256) 8-bit symbol. Framing Signaling Link Extended Super-frame SL_ESF Interleaving: Convolutional (55, 5) Support DVS-178 GI: Data rate 2.048 Mb/s (1.8 MHz band); Differential QPSK for 90-degree phase invariance, Frequency range 72.75 MHz, 75.25 MHz, or 104.2 MHz, RS code (96, 94 T=1) over GF(256) 8-bit symbol. Locked to MPEG2-TS, two FEC blocks per MPEG packet. Interleaving: Convolutional (96, 8)

Similar implementation for the In-Band QAM transmitter is used for the Headend OOB Transmitter. HE needs to do QPSK modulator with differential coding and roll-off 0.3 or 0.5, RS encoder, randomizer and convolutional interleaver. FPGA for the channel FEC encoding can either support DAVIC or DCII format.

BCM7100 OOB FDC Receiver supports: DAVIC: de-randomizer, RS decoder (55,53),output stream with appropriate DAVIC controls, interfacing with the on-chip DAVIC MAC. DCII: RS (96,94), Output clock, data and sync signals to the on-chip transport demux.

BCM7100 supports the following OOB burst modulator: Starvue, 4/16-QAM, burst FEC, 1 kb burst FIFO. Programmable randomizer, programmable RS encoder, programmable preamble prepend, programmable symbol mapper, programmable pre-equalizer. Roll-off Nyquist factor 0.25 or 0.5. It meets the DAVIC and DCII requirement: DVS-167 (DAVIC): Data rate 256 Kb/s(200 kHz), 1.544 Mb/s (1 MHz band) or 3.088 Mb/s (2 MHz band), Differential QPSK, Frequency range 8 MHz~26.5 MHz., Frequency step size 50 kHz. Power Level: 25 dBmV~53 dBmV, DVS-178 GI: Data rate 256 Kb/s/s (192 KHz band); Differential QPSK for 90-degree phase invariance, Frequency range 8.096~40.160 MHz, Frequency step size 192 KHz. Power level: 24 dBmV~60 dBmV. BCM3138 dual burst receiver with external ADCs are used for the burs demodulator and decoder.

The burst receiver FPGA implementation can be done with lower cost, but quite some effort is required.

The implementation does not include a dedicated complete DAVIC or DOCSIS MAC layer. Based on head-end video service system architecture the following MAC elements are supported: (1) Ranging and (2) Contention. The host CPU will do the necessary MAC processing and interface the application and MAC with the OOB card via PCI interface, If a complete DAVIC 1.2 MAC layer dedicated hardware implementation is required, additional one microprocessor, one FPGA and some memory can be added or a MAC IC can be added. The above head-end OOB burst receivers and transmitter PCI implementation is scaleable.

The preferred return path mechanism for MiniBox return path messages is via a DOCSIS compliant return path. A standard single rack unit Phoenix CMTS implements this unit.

Two extensions to the base Phoenix system are implemented for present invention. (1) a Cablelabs standard for efficient multicasting of OOB data over DOCSIS —Digital Settop Gateway (DSG); and (2) a Cablelabs extension for support of one-way DOCSIS settop boxes—i.e. continued operation in the case of a lost return path. The CMTS may or may not be shared for other services such as data and voice. The determination of which services and devices are handled by each CMTS are configuration options under the control of the operator. When necessary two such cards that support 8 OOB burst receivers and two OOB transmitters can be used for a complete system.

MiniBox Hardware

The MiniBox is a low cost, high performance set top box with a very small form factor –5.5"x6.0"x1.2". The core of the MiniBox is the Broadcom BCM7100. The MiniBox contains a smartcard interface for support of multiple conditional access schemes. A tamperproof design is also implemented which prevents access to video signals in the clear. DAVIC/DVB OOB is supported for the return channel. For the video and audio interface, the MiniBox provides high quality Super-VHS (S-video) with stereo audio L/R outputs for TV, a composite video output is also available for a second TV or VCR. Other options, like digital audio SPDIF and component video RGB outputs are possible. On-Screen Display eliminates the need for a front panel. 5 LEDs are used to indicate the basic functionality, like Power ON, IR receive status, In-Band down stream lock, Out of Band Forward Data Channel reception lock and OOB reverse data channel Transmission. An External power transformer provides a single DC input to the MiniBox.

The software for the MiniBox is a sturdy environment with features for handling all hardware interfaces, graphics, video, conditional access, and communications with the server. Unlike other overweight designs, the function of the MiniBox is optimized for local I/O handling and video processing, but is not a general computer workstation environment for MSO and user applications that becomes obsolete in a short time. The MiniBox is also not a residential gateway.

The following elements are contained within the software environment: Real time kernel—board support package, multitasking, peripherals. Slim middleware environment—application development interface, screen and I/O handling, networking environment, for communications to server)

Conditional access module (coordinates function with secure hardware co-processor. Electronic Program Guide, database and user interface. application environment, remote control interface, popups, etc.

Figure 53:
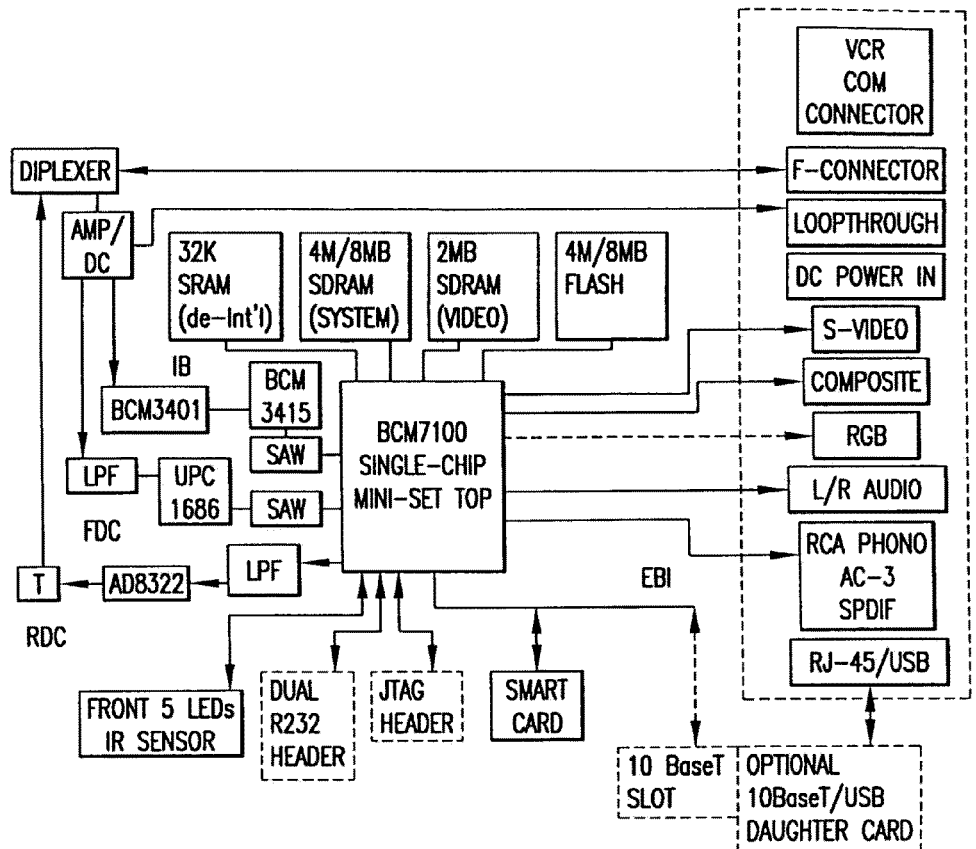
FIG. 53 is a block diagram of a minibox.

The block diagram of the MiniBox is shown in FIG. 53. The BCM7100 single chip is used as both the communications engine and the MPEG video processing engine.

The RF interface portion accepts a downstream In-Band QAM signal from 60 MHz to 900 MHz with level from −15 dBmV to +15 dBmV. The silicon tuner iC BCM3415 is used for the RF to IF downconversion.

The communication engine supports QAM demodulation and channel FEC decoding according to Annex A/C (DVB down stream QAM) for 8 MHz bandwidth channel and Annex B (DOCSIS QAM) for 6 MHz bandwidth channel. The MPEG-2 transport stream received by the QAM demodulator/FEC decoder is delivered to the on chip MPEG video-processing engine.

OOB Forward Data Channel accepts RF signal with frequency from 70 MHz to 130 MHz via a down converter IC. Both DVS-178 and DVS-167 OOB Forward Data channel standards are supported.

OOB Reverse Data channel supports DAVIC and DOCSIS return channel QPSK and 16QAM modulation and programmable FEC burst profiles. The OOB Reverse Data Channel frequency ranges from 5 MHz to 65 MHz with signal level from +24 dBmV to +60 dBmV. The on-chip DAVIC MAC handles the OOB data for all the possible interactive control and applications.

For the video and audio interface, the MiniBox provides high quality Super-VHS (S-video) with stereo audio L/R outputs for TV, a composite video output is also available for second TV or VCR. Other options, like digital audio SPDIF and component video RGB outputs are possible. The smart card together with protected tamper resistance hardware design controls the secure conditional access.

Additional On-Screen Display replaces the front panel of the set-top box, but additional 5 LEDs are used to indicate the basic functionality, like Power ON, IR receive status, In-Band down stream lock, Out of Band Forward Data Channel reception lock and OOB reverse data channel Transmission.

External power transformer provides a single DC input to the MiniBox for all the required on-board power supply.

The MiniBox RTOS is ThreadX. ThreadX is chosen in order to maximize the option for source code maintenance at the hardware layer. ThreadX provides utilizes the board support package and provides a core set of multitasking and hardware abstraction services.

The MiniBox middleware is OpenTV (or equivalent). OpenTV is chosen because of its support of an adequate graphics set, compatibility with multiple conditional access solutions, availability of a C-based application development environment for development of simple applications, a networking software environment, and availability of core applications and services like the Electronic Program Guide user interface.

Features which need to be developed atop this core RTOS and middleware are: one or more 3rd party conditional access software modules. The choice of software module will be based upon the conditional access solution chosen. In all cases it is expected that the vendor will port his stack (if not already available) into the MiniBox environment and make it available as object code.

A conditional access software module. We will develop the code ourselves. This stack will communicate with a secure hardware processor via both a smartcard interface (when smartcard installed) and via an internal interface to our on-board secure conditional access silicon.

Remote-Control application—handle all interaction with the remote control including popup menus, navigation, and communications with the server via the Remote Control Protocol.

The remote control is an infrared transmitter device that doubles as a TV controller and a MiniBox controller. In some cases the operator will desire a universal remote control with mappings from universal buttons to functions. It is anticipated that the functions required to operate a system are contained on most universal controls.

The following describes a control specific to present invention. A specific set of buttons is described including mechanical function. If the operator wishes to instead use a universal remote then the buttons of the universal remote are mapped accordingly.

The Remote Control contains a battery, infrared transmitter and LED, and a handful of buttons. Some buttons are multi-function, with the function at any instant of time being dependent on the current interactive state of the user interface (only the TV or Box receiver knows the state). Some buttons are in-out pushbuttons (IOP), some are left-right rocker buttons (LRR), some are up-down rocker buttons (UDR), and some are left-right-up-down rocker buttons (LRUDR). LRR and UDR are two buttons in one physical assembly. LRUDR is four buttons in one physical assembly.

The remote control will contain a small microprocessor (or equivalent) that is used in programming the remote control for various brands of TVs (e.g. so the volume control buttons and TV-power buttons will work for the TV). The remote contains an extensive table of infrared control codes protocols and sequences. The specific user interface discipline for programming the RC to control the infrared interface of a specific TV is TBD.

The following table defines the Remote Control (RC) buttons:

| BUTTON | TYPE | FUNCTION |
|---|---|---|
| POWER TV | IOP | POWER ON-OFF TV |
| POWER MINI BOX | IOP | POWER ON-OFF BOX |
| TV/VIDEO | IOP | TOGGLE STATEFUL VIDEO-SELECT MODE OF TV (RF->VIDEO->VIDEO2) |
| 0-9 DIGITS | IOP | DIGIT INPUT |
| ENTER/RETURN | IOP | TERMINATE CHANNEL INPUT BEFORE TIME OUT; ALSO DOUBLE AS RETURN TO PREVIOUS CHANNEL |
| CHANNEL UP-DOWN | UDR | CHANGE CHANNEL TO NEXT CHANNEL IN SEQUENCE; IF INTERACTIVE PROGRAM GUIDE IS SHOWING, THE FUNCTION IS PAGE UP/PAGE DOWN |
| VOLUME UP-DOWN | UDR | INCREASE/DECREASE VOLUME OF TV |
| MUTE | UDR | MUTE/UNMUTE SOUND OF TV |
| DISPLAY | IOP | DISPLAY OR REMOVE INFORMATION BOX WITH INFORMATION RELEVANT TO CURRENT STATE, E.G., INFORMATION ABOUT CURRENT PROGRAM |

-continued

| BUTTON | TYPE | FUNCTION |
| --- | --- | --- |
| CLR | IOP | CONTEXT SENSITIVE, CLEAR DISPLAY, RESTORING FULL VIDEO, INITIATE A DELETE OPERATION, E.G., EDITING OF A PROGRAM-GUIDE PLAYLIST |
| MENU | IOP | DISPLAY INTERACTIVE SCREEN WITH NAVIGATABLE MENU |
| DO-IT | IOP | PERFORM CURRENT OPERATION |
| GUIDE | IOP | DISPLAY OR REMOVE, A MENU OF PROGRAM CONTENT VS. TIME |
| LEFT-RIGHT UP-DOWN CURSOR CONTROL | LRUDR | SINGLE-POSITION CURSOR MOVEMENT IN THE CONTEXT OF THE INTERACTIVE DISPLAY CURRENTLY SHOWING |
| PAUSE | IOP | PAUSE/UNPAUSE THE VIDEO |
| PLAY | IOP | UNPAUSE PAUSED VIDEO |
| SKIP-FORWARD SKIP-BACKWARD | LRR | SKIP FORWARD OR SKIP BACKWARD 15 MINUTES OR EQUIVALENT. |
| JUMP-TO-END | IOP | JUMP TO END OF PROGRAM OR LIVE, IF PROGRAM IS STILL BEING BROADCAST AND NOT AT PROGRAM END. SUCCESSIVE DEPRESSIONS WILL JUMP FORWARD TO END OF PROGRAMS NEXT IN SEQUENCE. |
| JUMP-TO-BEGINNING | IOP | JUMP TO BEGINNING OF PROGRAM OR LIVE, IF PROGRAM IS ONLINE. SUCCESSIVE DEPRESSIONS WILL JUMP BACKWARD TO END OF PROGRAMS PREVIOUSLY IN SEQUENCE, IF THEY STILL ARE ONLINE |

The following user interface mechanisms, or equivalent, are needed in support of the Remote Control: (1) pop-up channel information (e.g. when doing channel-up/channel-down), channel name and program time and program description.
 time-bar—a horizontal bar which shows time epoch, start time, end time, time-hash marks (e.g. every 15 minutes), and current play-out position-in-time. Both broadcast channels and VOD programs have time-bars (e.g. a VOD timeline begins at 0:00).
 sounds, e.g. key-click-feedback, invalid-operation (e.g. jump-forward when already at the end)
Pop-Up status panel for long-latency operations, e.g. Two-dimensional program guide, with navigational controls.
 Menu based navigation—cursors, pg-up/pg-down, select.
 Hourglass display indicating a relatively long operation is being performed.
One protocol implication has been identified. The requirement to show a time-bar with accurate resolution (e.g. to within one second) implies that a protocol mechanism is required to communicate the current time status of programs between the headend and the Box. The following design accomplishes the objectives: (1) The Box maintains a table of program start time and program end time. This table is populated by the out-of-band protocol interface. (2) The PCR contained within the MPEG stream enables the Box to compute the offset of the stream in time from the beginning of the program. (3) The absolute-time clock of the Box is synchronized with the time values contained within the MPEG stream through a TBD mechanism.

The objectives of the remote control protocol (RCP) are to provide remote control of the box such that the box can, in the shortest time; (1) Tune to other active broadcast channels, not personal channels; (2) Activate and tune to other personal channels; and (3) Present good human factors A/V experience to the controlling user.

The present invention has advantages over the prior art. Unique constraints of the present invention include: (1) Real-time storage of all digital programs to enable viewing control functions such as jump back, jump forward, and pause. Single-button return to start of program. (2) Two-way DOCSIS or DAVIC/DVB system, cable return path enabled. Each TV set has its own virtual channel between it and the headend. (3) Discovery that a two-way cable system cluster size, determined by noise constraints, allows each TV set to have access to sufficient bandwidth for a unique dynamically allocated digital TV channel. (4) The content of each signal is individually protected against theft. (5) synchronous Gigabit and 10 Gigabit Ethernet is used for transmission of digitized video between headend components, and certain elements in the system contain processing capabilities to restore video synchronization.

DEFINITIONS

1. Broadcast channel—an A/V stream bundle which is active and is viewable by one or more TVs. Such a stream is not being controlled by a remote control.

2. Personal channel—an A/V stream that may or may not be active and which is viewable by only one TV. Such a stream is controlled by a remote control.

3. MPEG stream synch—that moment in time in which sufficient Audio and Video frames have been received in order to consider the stream "in-synch" and capable of being played out to the user.

4. A/V PID group—a group of PIDs that are used to reconstruct a real time audio/video stream.

Signaling Tools

Two-way OOB channel (DVB, DOCSIS, other) One-way MPEG stream channel (PIDs in 6 Mhz channelization)

Design Considerations

The OOB and MPEG INB channels have different bandwidths and latency characteristics.

An end-to-end request/ack protocol must incur the combined latency of queuing, upstream scheduling, Server queuing, request processing, and downstream queuing and delivery—all mitigated by congestion. There is a significant probability that the INB stream will be in-synch before the arrival of the ACK.

Delays may be introduced for obtaining the conditional access information (defer the issue for this draft).

Options for Switching to a New A/V Stream

1. Wait the complete Request/ACK cycle before looking for A/V stream synch (pessimistic). 2. Wait a fixed timeout before looking for A/V stream synch (optimistic). 3. Switch to a unique idle A/V PID group, and immediately begin looking for A/V stream synch (just-in-time) Note: 1 and 2 are the only options if the PID remains constant from channel to channel change.

General

1. If broadcast streams are active, a user may switch to an existing broadcast stream, and MPEG stream synch operation can immediately begin. 2. The first control function on a broadcast stream (e.g. pause, rewind) has the potential for switching to a personal-stream (if not already personal-stream). 3. There are more PIDs than streams in the address space, so a convention can be defined for PID switching (or the client can announce the next PIDs it intends to use out of a PID pool available to the client). 4. The Server will switch the A/V stream in a synchronized fashion, and then will ACK the request. However because the stream is being switched to a new PID the client can camp on the new A/V PID combo immediately. The ACK is needed for transmission and error cases.

1. HFC MPEG QAM downstream one-way—1-2 ms 2. OOB (DOCSIS, DVB) round trip—20-30 ms 3. Internal Server round trip—5 ms 4. Congestion variance—1-2 sec (above MAC-layer timeout and retransmit)

MiniBOX Procedure for Handling a Channel Change

Figure 54:
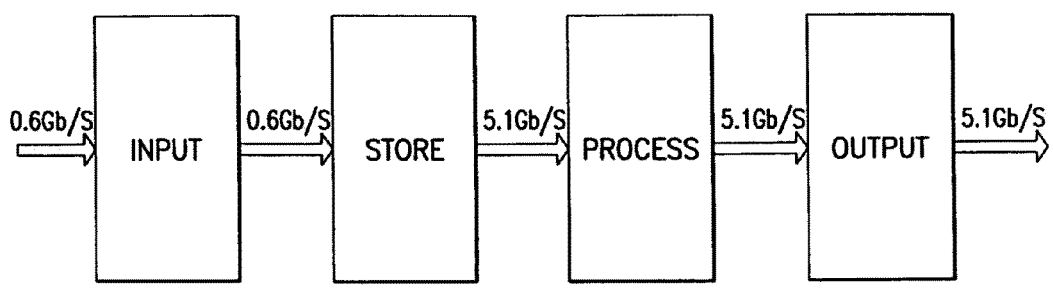
FIG. 54 illustrates functional processing elements.

1. Disable AV 2. Send channel change request to Server 3. Switch to new A/V PID combo (may require ACK response) 4. Receive i-frames (via interrupts) and audio frames Enable A/V hardware The following is provided as an abstract reference definition of the stream processing elements required for processing MPEG program streams into output Transport streams. An MPEG stream processing system has the following functional MPEG stream processing elements (150 broadcast programs, 1280 personal programs) shown in FIG. 54.

The flow of audio/video information through the stream processing components is depicted and the following sections outline the processing that is expected to take place at each step.

MPEG2 transport stream capture: (1) 1000 Mb/S Ethernet—primary; (2) 3 (@250 Mbps per port)-15 (@40 Mbps per port) ASI ports—secondary; (3) DHEI ports—secondary; (4) Sonet—secondary; (5) 802.17 RPR—secondary (primary future).

(1) Buffering for storage (2) Transport stream PSI processing (3) SI processing (DVB or DVS-???) (4) Program metadata computation (a) Rewind/Fast Forward preparation (b) Variable bit rate metadata (c) Television program identification and tagging.

Protocol Transcoding (E.g. MPEG2->MPEG4)

Concurrency Requirement is 150 Streams at 4 mbps Average Per Stream

Store: (1) Write 150 MPEG2 broadcast streams into storage (each program stream is demultiplexed from the aggregate transport streams arriving via the input interface(s)) (2) Maintain a 2 hour circular buffer for broadcast (3) Store 150 MPEG2 files for Video-on-demand (not broadcast); (4) Read 1280 MPEG2 broadcast streams and/or files out of storage; (5) Operation mode is asynchronous (but must be able to process faster than the synchronized downstream output rate—buffers are used to absorb the timing variances); (6) Stream output is frame asynchronous Process: (1) Stream arrival is frame asynchronous; (2) Multiplex N programs per output channel; (3) Statistical multiplexing of VBR streams; (4) Rate transcoding (bit rate change); (5) Protocol transcoding (E.g. MPEG2->MPEG4); (6) Encryption; (7) Combination with external data; (8) PSI generation for output multiplexes; (9) SI generation (for inband); (10) Program guide generation (for inband); and (11) Auxiliary data stream.

Authorizations

Interactive Applications: Set top firmware updates; Stream arrival is asynchronous; Null packet generation; PCR correction; Stream output is frame synchronous.

Stream input is frame synchronous (serial/parallel interface); QAM modulation; FEC computation and insertion; 128 6 Mhz channels (10 program streams per channel); (future) 96 8 Mhz channels (10-15 streams per channel, depending upon MPEG resolution); Output is frame synchronous (over RF)

APPENDIX-Protocols Reference (1) MPEG (many specifications); (2) Cablelabs Digital Settop Gateway protocol; (3) File Transfer Protocol (FTP); (4) Multicast File Transfer Protocol; (5) IETF MPEG-in-IP/Ethernet encapsulation (WAN); (6) SNMP V2/V3; (7) DAVIC/DVB (for Host OOB RF Module); (8) Server-to-Input/Storage/Processor/Output protocol; (9) Remote Control Protocol

(10) SNMP MIB definitions;

DOCSIS 2.0 for OOB CMTS

Latency Characteristics

Latency Assessment

The present invention is a network-based Broadcast-on-Demand (BOD) service with time-shifting functionality. A network-based disk array is used to implement the solution. This note studies the latency properties of the solution and describes user interface techniques possible for services.

The latency and bandwidth characteristics of a network-based disk array with multiple active users (up to 1280) are different than a disk for a single-user PVR. In network-based arrays latency for origination of video streams can be in the 10's of seconds for a fully loaded system, and average bandwidth-per-user needs to be constrained to approximately 4 Mbps. In a single user PVR latency is in the 10's of milliseconds and local bandwidth (disk-to-display) is (essentially) unlimited.

The following table describes the latency budget for starting a new network-based stream at a specific point-in-time as a function of number of active users (assuming a fully loaded system, 1280 streams maximum, 23 disks, track length of approximately 0.8 seconds of real time audio/video data per stream at 4 Mbps constant bit rate encoding): See Table on Active Users User Interface Techniques Given the above stream-initiation latency budget, the following user interface techniques are possible: A tradeoff can be made on startup latency vs. the precision of the starting time for stream initiation. For example, if a user interface operation requires starting at a specific time, then the maximum stream initiation latency must be anticipated (0-20 seconds). Or, if the user interface operation allows a less precise time (fast forward 15 minutes), then near-zero latency is possible (start time selection ranges plus or minus 0-20 seconds, depending on current queuing). A basic service can be defined which enables a user to watch broadcast and stored video in either real-time mode or time-shifted mode. In real-time mode multiple users will receive duplicate copies of a common stream. Time shifting mode (also called Personal-TV mode) will be entered when the user invokes the control to rewind back to the beginning.

Another service is Pause and Restart. The Pause does not take effect visually until a request/ack response is received from the Server. While the request is pending PAUSING message is displayed. This is so that the Server can halt its streaming buffer operation and not lose any image data. An alternative design is for the Server to replenish the data lost (streamed out) from the computed pause time back into the front end of the buffer. In this latter design the restart time is as the Max SIDL time because of the latency required to retrieve the data from storage.

Another service is immediate Rewind and Forward. No fast-image display is played out. Instead a clock or seconds-rewound indicator is presented. No pre-processing and duplicate storage mechanism (see below) is implemented.

Another service is jump-forward and jump-backward (e.g. in 15 minute increments). In this service the stream can be initiated nearly immediately (with SIDL variance in the point of time where the stream is initiated).

Over time the latency budget will continue to be reduced. Also a future version of the system is can perform re-encoding processing in order to derive fast forward and fast rewind streams. With these enhancements the user interface can approach the functionality of local PVR and local disk storage.

Glossary

Analog Signal: A method of signal transmission in which information is relayed by continuously altering the waveform of the electromagnetic current. The characteristics quantity representing information may at any instant assume any value within a continuous interval.

ASI: Asynchronous Serial Interface. A high speed interface used to carry synchronous MPEG transport streams.

ATSC: Advanced Television Systems Committee. Establishes voluntary technical standards for advanced television systems, including digital high definition television (HDTV).

Blackout: Blackout restrictions can block viewers in a certain geographic area, or viewers who fit other criteria defined by the broadcaster, from watching certain programs.

Broadcast-on-Demand (BOD): a network-based service in which broadcast video channels are only broadcast on the final HFC segment if one or more subscribers request the channel.

Chaining: Chaining is a method of transferring subscriber entitlements from an old viewing card to a new card during card changeovers.

CM: Cable Modem. The subscriber equipment which provides two-way connectivity between the subscriber premises (Ethernet, USB, wireless, . . . ) and the internetworking backbone.

CMTS: Cable Modem Termination System, a headend component of the cable return path technology used in the DOCSIS standard. The CMTS provides a two way forwarding path for Ethernet data plus Quality of Service features for sharing the bandwidth between subscribers.

Compression System: Responsible for compressing and multiplexing the video/audio/data bit streams, together with the authorization stream. The multiplexed data stream is then transmitted to the satellite, cable, or digital terrestrial headend.

Conditional Access Service ID: The identifier for a conditional access event. A single conditional access event can be divided into blocks with different types of access restriction (e.g., the first 5 minutes clear and purchasable; next 10 minutes scrambled and purchasable; the rest of the show scrambled).

Conditional Access: The security technology used to control the access to broadcast information, including video and audio, interactive services, etc. Access is restricted to authorized subscribers through the transmission of encrypted signals and the programmable regulation of their decryption by a system such as viewing cards.

Control Word: The key used in the encryption or decryption of a data stream.

Crypto-period: A crypto-period is a regular time interval during which a control word is valid. A crypto-period is typically only a few seconds long. Also called a Key Period.

Data Services: Data services provided over cable frequently include Internet and e-mail access, and can include delivery of a wide range of non-video information to subscribers. DAVIC (Digital audio video council): The DVB-RC standard for cable return path, expected to be widely used in markets where DVB standards apply.

Digital Signal: A discretely timed signal in which information is represented by a finite number of defined discrete values that its characteristic quantities may take in time.

DAVIC: See DVB.

Digital Channel: A group of MPEG streams consisting of elemental streams for audio and video. Multiple digital channels can be carried in a single Transport Stream.

DOCSIS (Data over cable service interface specification): A standard for standalone cable modem communications, usually used with Internet or PCs, developed for the U.S. market.

DVB: Digital Video Broadcasting. A European project that has defined transmission standards for digital broadcasting systems using satellite (DVB-S), cable (DVB-C) and terrestrial (DVB-T) media. The standards are created by the EP-DVB group and approved by the ITU. Specifies modulation, error correction, etc. An earlier set of return channel specifications (OOB and INB) was originally released under an organization called DAVIC.

Electronic Program Guide: An on-screen guide to programs and services available to subscribers. The electronic program guide is a software application which runs inside the digital set-top box and is controlled by the use of a specially designed remote control. It allows the subscriber to view program schedule information, store favorite channels, 'book' programs for later viewing, purchase current and future pay-per-view events, read messages from the subscriber management system, and adjust set-top box settings.

Entitlement Control Message Generator: System component responsible for generating entitlement control messages and control words from conditional access information on the current programs; updating the entitlement control message and control word every crypto-period; and delivering them to the multiplexer.

Entitlement Control Message (ECM): A packet that contains information the viewing card needs to determine the control word (or seed) that decrypts the picture.

Entitlement Management Message Generator: The component of the conditional access headend that delivers entitlements to the multiplexers. Acting on commands from the subscriber management system, it creates entitlement management messages for broadcast to the viewing cards or for relaying to cable operators. It then forwards the entitlement management messages to the multiplexers. The Entitlement Management Message Generator includes the subscriber database, which is a subset of the information held in the subscriber management system database.

Entitlement Management Message (EMM): A packet containing private conditional access information that specifies the authorization levels or the services of specific decoders. Entitlement management messages deliver viewing authorizations to the subscriber's card.

Grooming: A processing function applied to the compressed MPEG audio/video stream in which the rate is adjusted higher or lower by decompressing and reprocessing the video. A synonym is rate shaping.

In-band channels (INB): In-band channels or frequencies are those that contain content broadcast to subscribers. This can be audio, video, data, or other content. INA: Interactive Network Adapter. A headend component of the cable return path technology used in the DAVIC standard.

IP: Internet Protocol.

IP Telephony: The ability to provide local telephone services via the cable infrastructure.

MAC: Media access control—all protocol procedures for communicating at layer two between adjacent entities connected to a common media.

Macrovision: Copy protection system that allows consumers to view, but not record, programs that are distributed via digital STBs. The system adds a copy protection waveform to the video signal that is transparent on original program viewing, but causes copies made on VCRs to be degraded to the extent that they no longer have entertainment value. Middleware: The layer of software that supports the user interface and interactive applications in the set-top box, and isolates the application from the particular hardware of a set-top box platform.

MPEG: Moving Pictures Experts Group. The name of the ISO/IEC working group that sets up the international standards for digital television source coding.

MPEG-2: Industry standard for video and audio source coding using compression and multiplexing techniques to minimize video signal bit-rate in preparation for broadcasting. Supersedes the MPEG-1 standard. The standard is split into layers and profiles defining bit-rates and picture resolutions.

MPTS: Multi Program Transport Stream. See SPTS.

MSO: Multiple Service Operator. A cable operator with several headends, perhaps across many geographic regions.

Module: Point-of-deployment modules are removable conditional access devices that would make it possible for one set-top box to be used in many cable markets. All hardware and software required for the conditional access system is included inside this removable module rather than built into the set-top box.

MTA: Media Terminal Adapter. A function which provides voice over IP service to one or more telephony ports. The MTA may be standalone or embedded within a cable modem.

On Screen Display (OSD): the display of graphics and text generated by applications within the set top box platform. OSD may be superimposed on video or may replace the video and occupy the whole screen. OSD may be translucent (video showing through regions with no text or graphics) or may be opaque (no video showing).

OOB Channels: Out-of-band channels are channels that are not used for broadcasting content to subscribers. The ability to broadcast entitlement information in OOB channels ensures that subscriber cards receive this information even if the set-top box is tuned to an analog signal.

OpenCable: A CableLabs® project aimed at obtaining a new generation of interoperable set-top boxes for the U.S. market, to enable a new range of interactive services to be provided to cable subscribers.

OpenCAS: A committee that is defining conditional access standards for the U.S. market. Its work has been submitted for review and approval to SCTE/DVS (Society of Cable Television Engineers/Digital Video Subcommittee).

Out-of-band Channels (OOB): upstream and downstream channels that carry signaling information and interactive traffic. OOB channels are concurrent with In-band channels (INB) but use separate frequencies.

PHY—Physical layer interface, e.g. QAM or QPSK. All physical and logical elements required for transport of a serial bit stream across a common media, e.g. HFC.

Program Clock Reference (PCR): A time stamp in the Transport Stream from which decoder timing is derived.

PSIP: Program and System Information Protocol. ATSC term for the metadata used to describe events. Similar to DVB SI.

QAM: Quadrature Amplitude Modulation. A method of modulating digital signals that uses combined techniques of phase modulation and amplitude modulation. It is particularly suited to cable networks.

Rate Shaping: See grooming.

Report Back: An automatic function that reports IPPV purchases to the EMM Generator, via a telephone or cable modem connection.

Security Server: A computer that attaches a digital signature to each conditional access packet before that packet can be broadcast, and provides scrambling control words. The signature is used to verify the validity of the packet.

Session-based Encryption: The ability to encrypt video-on-demand content per viewing session rather than per stream or in real-time. This enables cable operators to protect content, providing decryption rights to only a single viewer. The viewer can pause and resume viewing, if the video-on-demand Server supports such functionality.

Set-top Box: The receiver unit, with an internal decoder, which sits on top of the television set and is connected to the television set. It receives and demultiplexes the incoming satellite signal and decrypts it when provided a control word by the viewing card.

SI: Service Information (DVB term). Data used by the electronic program guide to display information about programs. Typically includes time of broadcast, title, etc. The ATSC is equivalent is PSIP (Program and System Information Protocol).

Simulcrypt: The co-existence of multiple conditional access systems on a single transmission service. In other words, using Simulcrypt, a cable operator can provide the same programming to two or more subscriber populations.

SONET: Synchronous Optical NETwork. A fiber-optic transmission system for high-speed digital traffic. Employed by telephone companies and common carriers, SONET speeds range from 51 megabits to multiple gigabits per second. SONET is an intelligent system that provides advanced network management and a standard optical interface.

SPTS: Single Program Transport Stream. See MPTS.

Subscriber Management System: A system that handles the maintenance, billing, control and general supervision of subscribers to conditional access technology viewing services provided through cable and satellite broadcasting.

Transcoding: Conversion of the compressed MPEG stream from one format to a different format, e.g. MPEG 2 to MPEG4.

Verifier: Conditional access software module embedded in a set-top box which handles the logical interface to the viewing card and passes entitlement control messages, entitlement management messages, and other conditional access and subscriber information to the card.

Video-on-demand: A method of providing video services to viewers under their control, permitting them to choose what they want to view and when. Video-on-demand often includes the ability to pause viewing and resume, even tuning to other channels before resuming viewing of the video-on-demand event.

Viewing Card: A credit-card sized programmable card. A conditional access security device in the subscriber's home, it receives and records entitlements from the broadcaster headend and checks these against the incoming program information in the entitlement control messages. If the subscriber is authorized by the to view the current program, the card provides the control word to the set-top box. (Also known generally as a smart card or subscriber access card.)

It will be apparent to those skilled in the art that various modifications can be made to the method and apparatus for viewer control of digital TV program start time of the instant invention without departing from the scope or spirit of the invention, and it is intended that the present invention cover modifications and variations of the method and apparatus for viewer control of digital TV program start time provided they come within the scope of the appended claims and their equivalents.

We claim:

1. A method of producing low-cost video storage and delivery system that manages jitter in a cost effective manner, the method including:
   at a storage unit,
      receiving a plurality of Ethernet encapsulated blocks of MPEG transport packets that belong to a program stream, and storing at least part of the packets in storage locations across a plurality of disks that correspond to arrival times of the packets that belong to the program stream;
      retrieving the packets from the storage locations across the plurality of disks and sending the Ethernet encapsulated packets to an EdgeQAM unit at times based on the storage locations that correspond to the arrival times of the packets at the storage unit;
   at the EdgeQAM unit,
      receiving the Ethernet encapsulated packets, buffering at least the MPEG transport packets, and finding in the MPEG transport packets a plurality of PCR time stamps;
      using a first reference clock of the EdgeQAM, scheduling the MPEG transport packets for transmission at times relative to the PCR time stamps and the first reference clock, without recovering an encoder clock used to generate the PCR time stamps; and
      transmitting the MPEG transport packets via a QAM channel to a receiving device.

2. The method of the preceding claim, further including transcoding the PCR time stamps from a first time base of the encoder clock that operated at a first frequency to the second time base of a second reference clock operates at a second frequency that is substantially different from the first frequency and that matches a frequency requirement of the QAM channel.

3. The method of claim 1, wherein said storage unit receives said transport streams via a Gigabit Ethernet interface.

4. The method of claim 1, wherein said EdgeQAM unit includes receiving single program transport streams and generating multi program transport stream.

5. The method of claim 1, wherein said EdgeQAM unit can provide up to 128 QAM channels.

6. The method of claim 1, wherein the received Ethernet encapsulated packets arrive asynchronously at the EdgeQAM unit.

7. The method of claim 1, wherein the PCR time stamped transport packets are synchronously sent out of the said EdgeQAM unit to said receiving device.

8. A system for managing jitter in a cost effective manner and producing low-cost video storage and delivery of program data, that operates on MPEG transport packets from in which an encoder has occasionally inserted a program clock reference (PCR) timing field, the system including:
   a storage unit including
      at least one processor,
      a storage medium coupled to the processor that includes a plurality of disks,
      a receive-and-store module running on the processor adapted to store at least part of Ethernet encapsulated blocks of MPEG transport packets to the storage medium at locations based upon the arrival times of the Ethernet encapsulated packets at the storage medium,
      an Ethernet adapter coupled to the processor, and
      a retrieve-and-send module running on the processor adapted to retrieve the packets from storage locations within the storage medium based upon the arrival times of the Ethernet encapsulated packets, and to transmit the retrieved Ethernet encapsulated packets across the Ethernet adapter;
   an EdgeQAM unit including
      at least one processor,
      a packet buffer coupled to the processor,
      an Ethernet adapter coupled to the processor and in communication with the storage unit to receive the Ethernet encapsulated packets,
      a QAM transceiver coupled to the processor and to a network,
      a packet scheduler module running on the processor adapted to find PCR time stamps in the MPEG transport packets within the Ethernet encapsulated packets, and to transmit the MPEG transport packets across the QAM transceiver at times corresponding to the PCR time stamps.

9. The system of claim 8, wherein the EdgeQAM further includes a transcoder coupled to the processor that adjusts the PCR time stamps from a first time base corresponding to an encoder that applied the PCR time stamps to a second time base corresponding to a frequency at which the QAM transceiver operates.

10. The system of claim 8, wherein the EdgeQAM further includes a multiplexer that combines a plurality of single program transport streams into one or more MPEG multi program transport streams.

* * * * *